(12) United States Patent
Morita et al.

(10) Patent No.: US 7,315,511 B2
(45) Date of Patent: Jan. 1, 2008

(54) TRANSMITTER, SONET/SDH TRANSMITTER, AND TRANSMISSION SYSTEM

(75) Inventors: Hirotaka Morita, Kawasaki (JP); Yoshinobu Takagi, Kawasaki (JP); Takuya Miyashita, Kawasaki (JP); Chiyoko Komatsu, Kawasaki (JP)

(73) Assignee: Fujitsu limited, Kawasaki (JP)

( * ) Notice: Subject to any disclaimer, the term of this patent is extended or adjusted under 35 U.S.C. 154(b) by 822 days.

(21) Appl. No.: 10/107,282

(22) Filed: Mar. 26, 2002

(65) Prior Publication Data

US 2003/0076857 A1 Apr. 24, 2003

(30) Foreign Application Priority Data

Oct. 24, 2001 (JP) ............................. 2001-326790

(51) Int. Cl.
*G01R 31/08* (2006.01)
(52) U.S. Cl. ...................... 370/227; 370/353; 370/466
(58) Field of Classification Search ............... 370/227, 370/353, 354
See application file for complete search history.

(56) References Cited

U.S. PATENT DOCUMENTS

| 5,504,856 | A | * | 4/1996 | Sasaoka ........................ 714/3 |
| 5,757,769 | A | * | 5/1998 | Ikawa ......................... 370/228 |
| 5,870,382 | A |   | 2/1999 | Tounai et al. |
| 5,901,137 | A | * | 5/1999 | Nakabayashi .............. 370/222 |
| 6,144,633 | A | * | 11/2000 | Ikeda et al. ................. 370/217 |
| 6,188,667 | B1 | * | 2/2001 | Roberts et al. ............. 370/219 |
| 6,731,876 | B1 |   | 5/2004 | Okamoto et al. |
| 6,947,427 | B1 |   | 9/2005 | Rokugo et al. |
| 7,167,443 | B1 | * | 1/2007 | Dantu et al. ................. 370/218 |
| 2002/0063916 | A1 | * | 5/2002 | Chiu et al. ................... 359/110 |
| 2005/0141415 | A1 | * | 6/2005 | Broberg et al. ............. 370/223 |

FOREIGN PATENT DOCUMENTS

| JP | 09-74412 | 3/1997 |
| JP | 11-308279 | 11/1999 |
| JP | 2000-092124 | 3/2000 |
| JP | 2001-103091 | 4/2001 |

OTHER PUBLICATIONS

Japanese Patent Office Notice of Rejection dated Apr. 11, 2006, 2006 for corresponding Japanese Application 2001-326790.

* cited by examiner

*Primary Examiner*—Wing Chan
*Assistant Examiner*—Brian Roberts
(74) *Attorney, Agent, or Firm*—Katten Muchin Rosenman LLP

(57) ABSTRACT

Disclosed herein is a SONET/SDH transmitter provided in a transmission system in which a SONET/SDH network and an IP network are connected with optical LAN-IF. The SONET/SDH transmitter has a redundancy transmission line structure consisting of two transmission lines, a K-packet processing section, and a transmitting section. The K-packet processing section is used for generating a specific byte (SONET K1/K2 byte) of data representing transmission-line switching control information about the transmission lines, packetizing the generated data, and outputting a packet. The transmitting section is used for transmitting the packet to the transmitter provided opposite through the transmission lines. This SONET/SDH transmitter further has a redundancy line switching section. The redundancy line switching section is capable of selecting a transmission line, where a transmission signal with information data is transmitted, according to a status in which a packetized specific byte of data from the transmitter opposite is received.

28 Claims, 44 Drawing Sheets

1+1 STRUCTURE

1:N STRUCTURE
(EXAMPLE OF (1:4) STRUCTURE)

FIG. 11

| IP ROUTER<br>SONET/SDH APPARATUS | MANAGEMENT FLAG = 0 | MANAGEMENT FLAG = 1 |
|---|---|---|
| MANAGEMENT FLAG = 0 | NO TRANSMISSION CONTROL RIGHT FOR A K-PACKET (P1) | IP ROUTER HAS A TRANSMISSION CONTROL RIGHT FOR A K-PACKET |
| MANAGEMENT FLAG = 1 | SONET/SDH APPARATUS HAS A TRANSMISSION CONTROL RIGHT FOR A K-PACKET | DECIDE A TRANSMISSION CONTROL RIGHT BY EMPLOYING PRIORITY AND AN MAC ADDRESS (P2) |

43

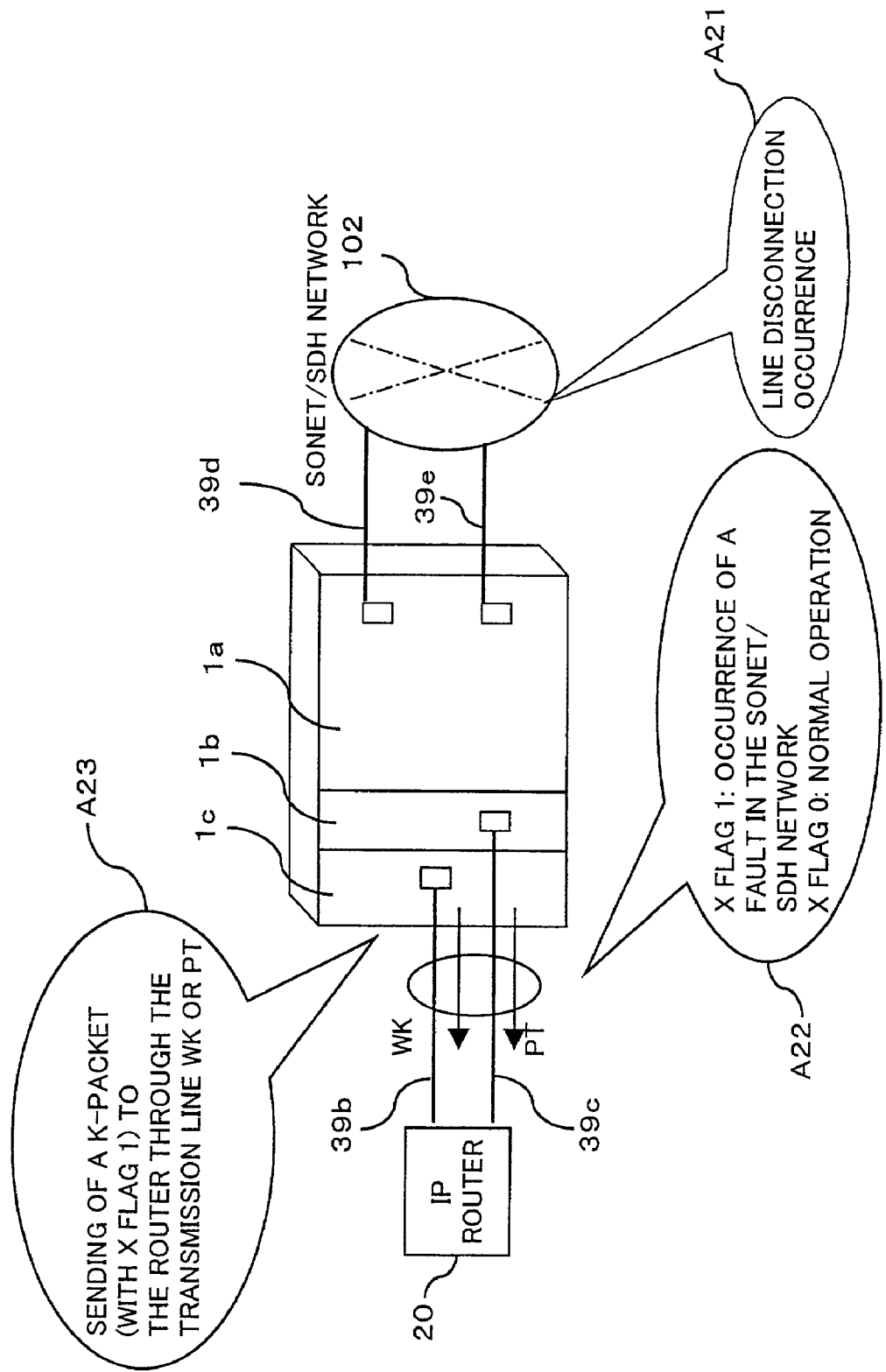

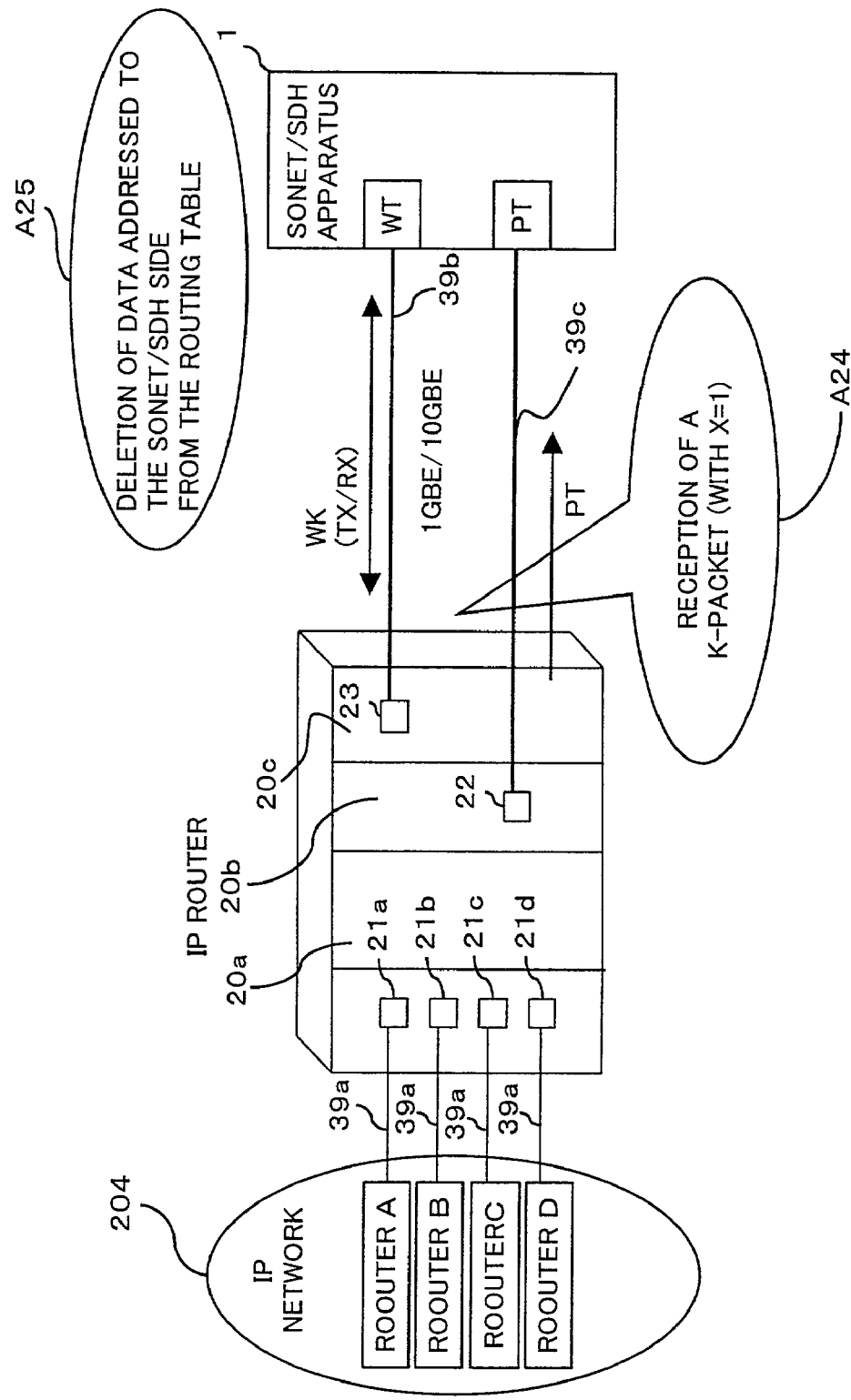

ROUTING TABLE
(BEFORE THE OCCURRENCE OF A FAULT)

| DESTINATION IP ADDRESS | PORT NAME |
|---|---|
| 133.22.250.1 | ROUTER A |
| 133.21.250.1 | ROUTER B |
| 133.20.250.1 | SONET/SDH APPARATUS 1 |
| 133.19.250.1 | SONET/SDH APPARATUS 1 |
| 133.18.250.1 | ROUTER C |
| 133.17.250.1 | ROUTER D |

ROUTING TABLE
(AFTER THE RECEPTION OF X FLAG = 1)

| DESTINATION IP ADDRESS | PORT NAME |
|---|---|
| 133.22.250.1 | ROUTER A |
| 133.21.250.1 | ROUTER B |
|  |  |
|  |  |
| 133.18.250.1 | ROUTER C |
| 133.17.250.1 | ROUTER D |

FIG. 33
RELATED ART

| 15 | 8 | 7 | 4 | 1 | 0 | |
|---|---|---|---|---|---|---|
| TTL | | R I | MODE | PRIORITY (PACKET PRIORITY) | PARITY CHECK | MAC HEADER |

FIG. 38A
RELATED ART

[K1-BYTE] : 0000 0000 (b1–b4 b5–b8)

| K1:b1–b4 | Automatically initiated, External, or State Request |
|---|---|
| 1111 | Lockout of Protection |
| 1110 | Forced Switch |
| 1101 | SF–H |
| 1100 | SF–L |
| 1011 | SD–H |
| 1010 | SD–L |
| 1001 | (not used) |
| 1000 | Manual Switch |
| 0111 | (not used) |
| 0110 | Wait-to-Restore |
| 0101 | (not used) |
| 0100 | Exercise |
| 0011 | (not used) |
| 0010 | Reverse Request |
| 0001 | Do Not Revert |
| 0000 | No Request |

FIG. 38B
RELATED ART

[K2-BYTE] : 0000 0 000 (b1–b4 b5 b6–b8)

FIG. 40A
RELATED ART

| LS ID |
|---|
| Domain ID |
| Function ID |
| Info byte |

FIG. 40B
RELATED ART

| K28.1 |
|---|
| D18.2 |
| D18.2 |
| reserve |

LINK STATUS

LAN-PHY

FIG. 40C
RELATED ART

| LS ID |
|---|
| Domain ID |
| Function ID |
| Info byte |

FIG. 40D
RELATED ART

| K28.1 |
|---|
| D18.2 |
| D18.2 |
| J0 |

← OVERHEAD INFORMATION ABOUT SONET

LINK STATUS

WAN-PHY

FIG. 42A
RELATED ART

| DESTINATION | IP ROUTER |
|---|---|
| LAN C | C |
| LAN B | B |

| DESTINATION | IP ROUTER |
|---|---|
| LAN A | A |
| LAN C | C |

| DESTINATION | IP ROUTER |
|---|---|
| LAN A | A |
| LAN B | B |

| DESTINATION | IP ROUTER |
|---|---|
| LAN C | C |
| LAN B | B |

| DESTINATION | IP ROUTER |
|---|---|
| LAN A | A |
| LAN C | A |

| DESTINATION | IP ROUTER |
|---|---|
| LAN A | A |
| LAN B | A |

242c

TRANSMITTER, SONET/SDH TRANSMITTER, AND TRANSMISSION SYSTEM

BACKGROUND OF THE INVENTION (1) Field of the Invention

The present invention relates generally to the interface between an Internet protocol (IP) network and a synchronous optical network/synchronous digital hierarchy (SONET/SDH) network, and more particularly to a transmitter, a SONET/SDH transmitter, and a transmission system suitable for line protection meeting Ethernet of 1 Gbit/sec and 10 Gbit/sec.

(2) Description of the Related Art

Recently, with the demand for the higher-speed operation of a local area network (LAN), the standard of 1 Gbit/sec Ethernet (hereinafter referred to as 1 Gbps Ethernet or 1 GbE) has spread, and a high-speed LAN optical interface called 10 Gbit/sec Ethernet (hereinafter referred to as 10 Gbps Ethernet or 10 GbE) has been examined as the next generation LAN standard.

In the IP network, a voice over Internet protocol (hereinafter referred to as a VoIP) for transmitting voice by employing IP packets (IP datagrams) is also being used. An IP router employing this VoIP is a device which forwards voice information such as a telephone call, and is being utilized with ever-increasing frequency.

In addition, a core network is positively being introduced that is capable of transmitting high-speed and large-volume data by wavelength division multiplexing (WDM), using optical signals. This core network is equivalent to a large-scale wide area network (WAN) when viewed from the LAN. In the core network, techniques as WAN are employed. The fundamental technique that is employed in the core network is SONET/SDH.

The SONET/SDH is one of the architectures in an optical transmission system and refers to a network in which a great number of SONET/SDH transmitters are interconnected through optical fiber cables (hereinafter referred to as optical fibers) so that they are synchronized with one another. Because of this, a technique for connecting the LAN directly with a SONET/SDH network has been started to enhance the throughput of the entire network, and in future, the connection between the LAN and the SONET/SDH network will be increased.

The SONET/SDH network is requested to have line reliability. In the Bellcore (GR-253) and the International Telecommunication Union-Telecommunication (ITU-T), automatic protection switching (APS) and multiplex section protection (MSP) are recommended as line protection systems.

The APS and MSP are principally stipulated for the line protection of paths multiplexed between transmitters provided opposite each other in a network. For line protection, two or more lines, an active line and a standby line, are provided. The active line is also called the working line. The standby line is also called the protection line. In the following description, "WK" means a working line or a working line side and "PT" means a protection line, a protection line side, or a standby system. For the switching structure, a (1+1) structure and a (1:N) structure (where N represents an integer of 2 or greater) are primarily employed.

FIG. 7A shows the (1+1) structure and FIG. 7B the (1:4) structure. The transmitters 400, 500 shown in FIG. 7A are connected through two transmission lines WK and PT. If a fault occurs at the transmission line WK, the transmission line PT operates as a working line. The transmitters 400, 500 shown in FIG. 7B are connected through four transmission lines WKs and a single transmission line PT. If a fault occurs at one of the four transmission line WKs, the single transmission line PT functions as a working line.

FIG. 31 schematically shows a transmission system that has a redundancy structure. The transmission system shown in the figure is equipped with subscriber networks 201, a SONET/SDH network 102, IP routers (VoIP routers) 231, an IP network (e.g., Internet) 204, and LANs 205.

The subscriber network 201 refers to a telephone network, an integrated services digital network (ISDN), an asymmetric digital subscriber line (ADSL) network, and a network having high-speed digital lines or these subscriber terminals.

The SONET/SDH network 102 is a core network to which the SONET/SDH system is applied, and has optical transmitters 300 that are connected with the IP routers 231. The SONET/SDH network 102 is also equipped with a great variety of line protection functions as the fault healing functions (self-healing functions). Examples of systems having the line protection function are a unidirectional path-switched ring (UPSR), a bidirectional line-switched ring (BLSR), etc. By employing these systems, line switching can be completed within 50 ms, even if a fault occurs.

The IP router 231 transmits IP packets to the SONET/SDH network 210 and also to the IP network 204, and has an Ethernet interface cards to interface with the SONET/SDH transmitter 300 provided with 1 Gbps/10 Gbps Ethernet cards. Note that the expression "1 Gbps/10 Gbps" used herein sometimes means both "1 Gbps and 10 Gbps" and "1 Gbps or 10 Gbps."

This Ethernet standard is stipulated in the Institute of Electrical and Electronics Engineers (IEEE) standard 802.3. In addition, the LAN 205 is a private network provided, for example, in an enterprise, a school, etc. The IP network 202 is a network to which the IP protocol is applied.

In this manner, the transmission system 200 is constructed with the SONET/SDH network 102 as the center. In the part of the transmission system 200 that connects the IP router 231 and the SONET/SDH network 102 together, no packet loss or delay is allowed, because an important IP packet, such as voice data, etc., flows. Therefore, a redundancy structure is required.

Next, a description will be given of the conventional SONET/SDH network 102, IP network 204, and redundancy structure that have been proposed.

(X-1) Configuration employing a Special Reuse Protocol (SRP)

FIG. 32 schematically shows a ring-configured network 210 to which SRP is applied. The ring-configured network 210 shown in the figure includes SRP units 211a, 211b, 211c, and 211d, which are interconnected in ring form. The SRP units 211a, 211b, 211c, and 211d are interconnected through two rings, a counterclockwise ring (inner ring) and a clockwise ring (outer ring).

By employing layer 2, control packets (SRP packets) are transmitted onto the inner ring of the ring-configured network 210, and data packets are transmitted onto the outer ring. Note that the layer 2 used herein means a media access control (MAC) layer.

FIG. 33 shows a format for the SRP packet. The SRP packet shown in the FIG. 33 has a TTL (time to alive) field, a RI (SRP Ring Identifiers) field, a mode field, a priority field, and a parity check field, and also has an MAC (Media Access Control) header attached to the first part thereof. The RI field is a SRP identifier, and the mode field is an identifier for a control packet, a data packet, etc. The priority field represents a packet priority value (0, 1, 2, 3, 4, 5, 6, or 7), and the parity check field represents odd parity.

FIG. 34 shows how transmission in the SRP ring-configured network is performed when a fault occurs. The term "fault" used herein means a transmission line fault due to cutting of an optical fiber, a fault in a device (such as a transmitter, a repeater, etc.) due to an interface card failure, etc., an increase in a bit error rate, etc. If a line disconnection (link cutting, a line disconnection, a communication disconnection, or interruption) occurs due to the occurrence of a fault between the SRP units 211a and 211b shown in FIG. 34, then the SRP units 211a, 211b both send back an optical signal detecting the line disconnection. That is, transmission becomes possible by employing the inner and outer rings.

(X-2) IP Network Redundancy Structure (Virtual Router Redundancy Protocol (VRRP))

The VRRP is a protocol standardized by the Internet Engineering Task Force (IETF) and is applied to a transmission system that has a virtual router section consisting of a plurality of virtual routers. In the VRRP, when a fault occurs in a working router, the fault is detected and the damaged router is quickly switched to a redundant router. An example of a protocol that is applied to the router belonging to the LAN 205 shown in FIG. 31 will be described with reference to FIGS. 35 and 36.

FIG. 35 schematically shows how the virtual router section is operated according to the VRRP when there is no fault. The system shown in the figure is equipped with a WAN 205b, a virtual router section 221 having first and second routers 221a, 221b, and a LAN 205a. The first and second routers 221a, 221b are equipped with interface cards (not shown) having IP addresses A and B, respectively. The virtual router section 221 employs the IP address A of the first router 221a as its IP address. During normal operation, the first router 221a operates as a working router.

FIG. 36 schematically shows how the virtual router section is operated according to the VRRP when a fault occurs. If a fault occurs at the first router 221a shown in FIG. 36, a VRRP packet cannot be transmitted. Because of this, the damaged first router 221a is automatically switched to the second router 221b and therefore communication is continued. When this is occurring, the second router 221b uses the IP address A of the damaged router 221a as its IP address and operates as a working router.

(X-3) Redundancy Structure in the SONET/SDH System

Next, a description will be given of the line protection function. The line protection function is the function of healing a fault, such as a transmission line fault, a device failure, and an increase in a bit error rate, and protecting a line. The SONET/SDH system employs automatic protection switching (APS) and multiplex section protection (MSP) which exhibit the self-healing function by switching. As an example of this self-healing function, a linear (1+1) APS structure (see FIGS. 7A and 7B) and the function thereof will be described with reference to FIG. 37.

FIG. 37 shows the (1+1) APS structure employing the SONET/SDH system. The SONET/SDH units (SONET/SDH transmitters) 230a, 230b shown in the figure are units applied to the SONET/SDH network 102 and are connected opposite each other through optical fibers. The SONET/SDH unit 230a is provided with a pair of interface units 250a, 250b to process a SONET/SDH frame. Similarly, the SONET/SDH unit 230b is provided with a pair of interface units 250c, 250d. The interface units 250a, 250c function as WKs and the interface units 250b, 250d as PTs. The full duplex transmission and reception of optical signals are performed by two systems.

With such a structure, during normal operation, the interface units 250a, 250c are selected as WKs and the interface units 250b, 250d as PTs. A signal that is transmitted by the SONET/SDH unit 230a is split at a distributing section 250e so that the same signals can be transmitted onto parallel optical fibers connected with the interface units 250a, 250b. One of the two same signals received by the interface units 250c, 250d of the SONET/SDH unit 230b is selected at a selecting section 250f and output as a signal on the receiving side.

On the other hand, when a fault occurs at WK, the transmission line is switched quickly from WK to PT to maintain the communication line. Note that a revertive mode can be set so that when a fault at the WK is recovered, the transmission line reverts to the WK again. In addition, a non-revertive mode can be set so that the transmission line does not revert to the WK again.

This switching is performed by employing a K-byte of data. This K-byte of data represents transmission-line switching control information and is employed for the multiple section switching defined in the overhead byte (OHB) field of the SONET/SDH frame. The APS function or MSP function is exhibited by employing the K-byte of data.

Note that the OHB is transmitted and received in transmission cycles (125 μs) for the SONET/SDH frame. When a fault occurs, the completion of switching from a switching command (K-byte) is performed quickly in a short time within 50 ms. The standard of the K-byte of data is defined as 2 bytes of data (K1-byte and K2-byte) contained in the line overhead (LOH) field. The K-byte in the SONET is stipulated in GR-253 and the K-byte in the SDH is stipulated in the G.783 of ITU-T.

FIG. 38A shows a format example of the K1-byte. This K1-byte consists of 8 bits between b1~b8. The first 4-bit part (b1 through b4) represents a request message type. The last 4-bit part (b5 through b8) represents a channel number from which the request message was transmitted.

FIG. 38B shows a format example of the K2-byte. The first 4-bit part (b1 to b4) of the K2-byte data employs the same code as the K1-byte and represents a channel number at which bridge action was performed. The b5 in the K2-byte identifies the (1+1) or (1:N) redundancy structure, and the last 3-bit part (b6 to b8) represents AIS-L (111), etc.

Note that the line switching procedure employing the K1-byte and K2-byte is stipulated in the SONET/SDH system and makes an interconnection between different benders possible. In addition, the code definition of the K-byte varies between various redundancy structures ((1+1) structure/(1:N) structure, bidirectional/unidirectional, and reversible/irreversible).

A conventional method of interconnecting LANs and the SONET/SDH network 102 is realized by a packet-over-SONET (POS) technique.

(X-4) Redundancy Structure in an IP Transmitter (IP Over SONET Unit) on the SONET FIG. 39 shows a SONET/SDH transmitter (with the POS function). A router 231 shown in the figure incorporates a SONET interface and has interface units 231a to 231d. The interface units 231a to 231d are disposed between an IP network 204 and a SONET/SDH network 102. For instance, the interface units 231a, 231b can meet the speeds of 1 Gbps Ethernet and 10 Gbps Ethernet. The interface units 231c, 231d are connected with the SONET/SDH network 102 and can meet both standard OC-192c (optical carrier 192) and standard OC-768c (optical carrier 768). By employing the POS in this technique, an IP packet that is transmitted on the side of a LAN is mapped into a SONET/SDH frame. Note that it is recommended that Ethernet of 10 Gbps be standardized by IEEE standard 802.3ae Task Force.

A major difference between Ethernet of 10 Gbps and Ethernet of 100 Mbps and 1 Gbps is in the following (Y-1) to (Y-3).

(Y-1) Ethernet of 10 Gbps supports only a full duplex transmission system. It does not use a CSMA/CD (carrier sense multiple access with collision detection) system.

(Y-2) For transmission media that are employed in 10 Gbps Ethernet interfaces, only optical fibers are used.

(Y-3) For the transmission media of 10 Gbps Ethernet interfaces, WAN-PHY is stipulated. A stipulation for this WAN-PHY is standardized on the assumption that it is interchangeable with SONET OC-192c/SDH VC-4-64.

FIGS. 40A to 40D show format examples of link status signals, respectively. Shown in FIG. 40A are the elements of a link status. Also shown in FIG. 40B is a protocol. These are all applied to 100 Mbps/1 Gbps Ethernet. The elements and protocol shown in FIGS. 40C and 40D are applied to 10 Gbps Ethernet. That is, for the WAN-PHY of 10 Gbps Ethernet, it is being examined that part of the overhead field of the SONET/SDH frame format is inserted into the information byte. With these formats, the transmitting side performs transmission at predetermined time intervals. For example, the transmitting side inserts an inter-packet gap between two incoming IP packets.

For a redundancy structure in the IP network 204 that is constructed in FIG. 39 by LANs, redundancy based on route-switching information is possible by monitoring a fault between a plurality of routers according to VRRP, and employing a routing protocol such as OSPF, BGP, RIP, etc.

Because of this, the interface unit 231a needs to have a routing table. This routing table is used to route IP packets and manage IP addresses.

The time required for the interface unit 231a to process a fault is about a few seconds to a few minutes until the protocol converges and recovers. That is, a management table of IP addresses is necessary so that a data frame transmitted from the SONET/SDH network 102 can be transmitted to the IP network 204 as IP packets.

Furthermore, if optical fibers, etc., are physically cut, it will take a few seconds to a few minutes for the transmission line to be recovered. If a fault occurs at an optical fiber connected to an IP router near a core system, the influence of the line disconnection will be considerable.

Next, for the existing network with IP routers, a description will be given in the case where there is one transmission line between IP routers and the case where there are two transmission lines, with reference to FIGS. 41 to 44.

(Z-1) Case of one transmission line being between routers:

FIG. 41 shows normal operation of routers when there is one transmission line between the routers. An IP network 204 shown in the figure is equipped with IP routers A, B, and C; LANs A, B, and C connected to the IP routers A, B, and C; and transmission lines 241a, 241b, and 241c.

The LANs A, B, and C are, for example, private networks for enterprises, respectively. Although not shown, each LAN has network terminations (hereinafter referred to as NTs). The IP routers A to C each have a routing table in which IP addresses (destinations) and port (physical port) names are held so that they correspond to each other. Based on the held data, each IP router determines a route and transmits an IP packet 243.

The transmission lines 241a to 241c are capable of transmitting IP packets of 100 Mbit/sec (Mbps) and 1 Gbit/sec (Gbps) by full duplex transmission. Thus, the bandwidth of this IP network 204 is 100 Mbps/1 Gbps×2 (full duplex).

FIGS. 42A to 42C show examples of routing tables when normal operation is performed with one single transmission line. In the routing tables, the left column indicates a destination and the right column an IP router. These routing tables 242a to 242c are generated based on a dynamic routing protocol (an interior protocol (RIP 2, OSPF), an exterior protocol (BGP, EGP), etc.). According to the routing table, an IP packet reaches its destination via determined routes.

In such a structure, an NT within the LAN C shown in FIG. 41 transmits an IP packet 243 addressed to the LAN B. This IP packet 243 has a destination address (DA) and a source address (SA) and is transmitted to the IP router C disposed within the network domain of the LAN C. The IP router B transfers the IP packet 243 to the LAN B, based on the routing table.

FIG. 43 shows how routers are operated when a fault occurs at a single transmission line between the routers. For example, when cutting of an optical fiber occurs at a transmission line 241b shown in FIG. 43, the routing tables 242b and 242c are updated to change a transmission route for an IP packet.

FIGS. 42D to 42F show examples of routing tables when a transmission line fault occurs. Although the contents of the routing table shown in FIG. 42D are not changed, the IP addresses of the IP routers B and C shown in FIGS. 42E and 42F are changed as indicated by arrows.

With such a structure, if an NT within the LAN C transmits an IP packet 243 addressed to the LAN A, this IP packet 243 is transmitted to the IP router C disposed within the network domain of the LAN C. The IP router C transfers the IP packet 243 to the IP router A, based on the routing table 242c. The IP router A transfers the IP packet 243 to the IP router B, based on the routing table 242a. The IP router B transfers the IP packet 243 to the LAN B, based on the routing table 242b.

Next, a description will be given in the case where there are two or more transmission lines between routers, with reference to FIG. 44.

FIG. 44 shows how routers are operated when there are three transmission lines between the routers. The transmission lines 244a, 244b, and 244c shown in the figure are capable of transmitting IP packets of 100 Mbps and 1 Gbps by full duplex transmission and are connected between IP routers A, B, and C. Therefore, the maximum bandwidth that the transmission lines 244a, 244b, and 244c can offer is 100 Mbps/1 Gbps×2 (full duplex)×3 (number of transmission lines).

With such a structure, during normal operation, an IP packet 245 passes through routes determined based on the routing tables that the IP routers A to C have, and reaches its final destination. In addition, the fundamental operation during the occurrence of a fault is the same as the case in which the IP routers A to C are interconnected through a single transmission line. When each of the three transmission lines 244a to 244c consists, for example, of three lines, if a fault occurs at one transmission line the bandwidth equivalent to the bandwidth of the damaged transmission line will be reduced. Only when any of the three transmission lines 244a, 244b, 244c between the routers A to C is cut, the routing tables are updated.

When a fault (a line fault, and a transmitter failure within a network) occurs at a network, the routing tables are updated in the IP network 204 and therefore the time to update the routing tables is required. On the other hand, the SONET/SDH network 102 is capable of switching a transmission line to a redundant transmission line at high speeds when a fault occurs.

The SRP is applied to LAN systems and supports only ring-configured networks and is not suitable for star-configured networks that are employed mainly in Ethernet. Because of this, the SRP is devoid of a wide use.

The VRRP supports only units that operate together with LANs, and cannot be applied to other transmission systems. In addition, it takes a few seconds for a working router to be switched from the occurrence of a fault. This is considerable compared with about 50 ms required for switching in the SONET/SDH system.

On the other hand, changing the existing network structures to add the function of healing a fault when it occurs is not practical due to interruption of service, an increase in cost, etc. Because of this, there have been demanded methods capable of healing a fault independently of the configuration of a network or without changing the network configuration.

In addition, because the routing protocol by IP routers changes a route by a protocol level between routers, the time required for line recovery is considerable (typically on the order of a minute or second). Moreover, since there is a need to overwrite information (routing table) about the routes of the whole network, there is still a problem that it will take time for a fault to be completely recovered.

Furthermore, in the case where the number of lines to transmit IP packets is increased, the transmission bandwidth is reduced when a fault occurs. Because of this, when it is judged that a router cannot transmit an IP packet, it is discarded at that router. Thus, when traffic is heavy, there is a problem that transmission service cannot be offered to users with high reliability.

SUMMARY OF THE INVENTION

The present invention has been made in view of the problems mentioned above. Accordingly, it is a first object of the present invention to provide a transmitter, a SONET/SDH transmitter, and a transmission system which are capable of coping with the occurrence of a transmission line fault or unit failure, also healing transmission quickly when a fault occurs, and ensuring a desired transmission bandwidth and then offering high-reliability transmission services to users, by realizing, in a transmission system (in which a SONET/SDH network with a high-speed LAN optical interfaces (1 Gbps/10 Gbps Ethernet interfaces) is connected with an IP network), a redundancy structure for the transmission lines by 1 Gbps/10 Gbps Ethernet.

A second object of the present invention is to enable a network, which cannot perform high-speed switching originally, such as an IP network, to perform high-speed switching and high-speed fault recovery.

(1) To achieve the aforementioned objects of the present invention, a first transmitter according to the present invention constitutes a transmission system for transmitting and receiving a packetized transmission signal. The transmitter comprises a redundancy transmission line structure comprising a plurality of transmission lines; a generating section for generating a specific byte of data representing transmission-line switching control information about the transmission lines, packetizing the generated specific byte of data, and outputting a packet; a transmitting section for transmitting the packet to the transmitter provided opposite through the transmission lines; and a redundancy switching section capable of selecting a transmission line, where a transmission signal with information data is transmitted, according to a status in which a packetized specific byte of data from the transmitter opposite is received.

With this arrangement, by employing the transmission line (PT) when a fault occurs at the transmission line (WK), packet loss due to a transmission line fault and a transmitter failure can be minimized. In this manner, stable operation of the network becomes possible. In addition, during maintenance, an inspection can be conducted without disconnecting communication.

(2) In addition, in accordance with the present invention, there is provided a synchronous optical network/synchronous digital hierarchy (SONET/SDH) transmitter. The SONET/SDH transmitter has the function of transmitting and receiving transmission-line switching control information obtained in a SONET/SDH network. The SONET/SDH transmitter is connected to an Internet protocol (IP) network and constitutes a transmission system for transmitting and receiving a data packet. The SONET/SDH transmitter comprises a redundancy transmission line structure connected to the IP network and comprising a plurality of transmission lines; a generating section for generating a specific byte of data representing transmission-line switching control information about the transmission lines, packetizing the generated specific byte of data, and outputting a packet; a transmitting section for transmitting the packet to a transmitter provided opposite through the transmission lines; and a redundancy switching section capable of selecting a transmission line, where a transmission signal with information data is transmitted, according to a status in which a packetized specific byte of data from the transmitter opposite is received.

With this arrangement, the IP side, for example, is notified of the status of the SONET/SDH network and is therefore capable of early detecting a fault when it occurs.

(3) The SONET/SDH transmitter may further comprise means for generating the transmission-line switching control information based on information about a fault that has occurred in the SONET/SDH network, then packetizing the generated information, and transmitting a packet to the IP network.

As with the aforementioned case, stable operation of the network becomes possible. During maintenance, an inspection can be conducted without disconnecting communication.

(4) Furthermore, a third transmitter according to the present invention is provided in an IP network and has the function of routing an IP packet and the function of transmitting and receiving a data packet. The third transmitter is also connected to a SONET/SDH network through a SONET/SDH transmitter. The third transmitter comprises an interface section connected with the SONET/SDH transmitter through a redundancy transmission line structure comprising a plurality of transmission lines onto which data packets are transmitted. The interface section has a generating section for generating a first specific byte of data representing transmission-line switching control information about the transmission lines, packetizing the generated specific byte of data, and outputting a packet. The interface section also has a transmitting section for transmitting both a first data packet, which is data output from the generating section and contains information data to be transmitted, and the packetized first specific byte of data when generated, to the SONET/SDH transmitter provided opposite through the transmission lines. The interface section further has a redundancy switching section capable of selecting a transmission line, where a second data packet with information data is transmitted, according to a status in which a packetized second specific byte of data from the SONET/SDH transmitter is received.

With this arrangement, the third transmitter according to the present invention is capable of early detecting a line fault and quickly switching the transmission lines.

(5) A transmission system according to the present invention has transmitters capable of transmitting and receiving a packetized transmission signal. The transmission system has a plurality of transmission lines onto which the transmission signal and a redundant transmission signal, containing the same data as information data contained in the transmission signal, are transmitted. Each of the transmitters comprises a generating section for generating a specific byte of data representing transmission-line switching control information about the transmission lines, packetizing the generated specific byte of data, and outputting a packet; a transmitting section for transmitting the packet to the transmitter provided opposite through the transmission lines; and a redundancy switching section capable of selecting a transmission line, where a transmission signal with information data is transmitted, according to a status in which a packetized specific byte of data from the transmitter opposite is received.

With this arrangement, a specific packet from the transferring unit can be transmitted to the transmitter opposite, and a desired specific packet can be selected from a plurality of specific packets input via the transmission lines. In this manner, switching of the transmission lines (WK and PT) can be performed.

(6) The aforementioned generating section may be constructed so that it generates management data for determining a transmission control right for a specific packet containing the specific byte of data, and control data for controlling the start or stop of a process of switching the transmission lines with respect to the transmitter opposite. This construction can avoid the conflict of specific packets between transmitters supporting line protection.

(7) The aforementioned generating section may be constructed so that it inserts management data, for determining a transmission control right for a specific packet containing the specific byte of data, into the transmission signal and then packetizes the signal. This construction can also prevent the conflict of specific packets between transmitters supporting line protection.

(8) The aforementioned generating section may be constructed so that it inserts management data into a transmissions signal and then packetizes the signal. The generating section may be constructed so that it inserts data, for the priority of a priority transmitter which can preferentially transmits a specific packet, into the transmission signal and then packetizes the signal. This construction can avoid the conflict of specific packets between transmitters supporting line protection.

(9) The aforementioned generating section may be constructed so that it inserts data, for the start or stop of the processing of the specific packet with respect to the transmitter opposite through a plurality of transmission lines, into the transmission signal and packetizes the signal. With a single transmitter, concentrated management can be performed on the transmitter opposite.

(10) The aforementioned generating section may be constructed so that it generates a specific packet according to a protocol in which there is no retransmission control. In this case, processing can be quickly performed.

(11) The aforementioned redundancy switching section may be constructed so that it transmits the specific packet during a packet gap that the transmission signal is not transmitted. With this construction, high-speed line switching becomes possible and the stability of the switching in a network is enhanced.

(12) The aforementioned interface section may have a terminating section for terminating both the data packet and a redundant data packet containing the same data as information data contained in the data packet. In this case, the size of circuitry can be reduced.

(13) The aforementioned interface section may be equipped with a flag data notification section which notifies the generating section of flag data representing information about a fault that has occurred in the SONET/SDH network. The aforementioned generating section may perform the packetization, based on the flag data, and fault information contained in the specific byte of data. In this case, when the occurrence of a fault is detected by employing the K1-byte and K2-byte, the IP router opposite can be notified of the K-packet.

(14) The aforementioned redundancy switching section may be constructed so that it transmits a specific packet during a packet gap that the transmission signal is not transmitted. With this construction, the transmitting side can transmit a specific packet at predetermined time intervals.

(15) Each of the transmitters may be point-to-point connected with the transmitter opposite. Each transmitter may be constructed so that it can transfer a specific packet containing transmission-line switching information about the transmission lines. In this case, the number of line protection structures is increased and stability in the network is further enhanced.

(16) Each transmitter may be equipped with an automatic switching adapter function of switching the transmission lines by employing a specific packet. Users can employ the existing IP router, and between the IP router and the transmitter provided opposite the IP router, a line protection structure can be formed.

(17) The aforementioned interface section may be equipped with a multiplexing/demultiplexing section for multiplexing information data output from the redundancy switching section and then outputting a multiplexed optical signal to a SONET/SDH network, and demultiplexing a multiplexed optical signal output from the SONET/SDH network and then outputting information data. For example, POS (packet over SONET) can formed so that it has a redundancy structure in Ethernet of 1 Gbps.

(18) In the aforementioned transmission system, the transmitters maybe connected through a (1+1) structure or (1:N) structure (where N is an integer of 2 or greater). The transmitters can have the add-drop function.

BRIEF DESCRIPTION OF THE DRAWINGS

The present invention will be described in further detail with reference to the accompanying drawings wherein:

FIG. 11 is a diagram showing examples of set values for a management flag according to the first embodiment of the present invention;

FIG. 14 is a diagram used to explain how a fault in the SONET/SDH network is processed at the side of the SONET/SDH transmitter according to the first embodiment of the present invention;

FIG. 15 is a diagram used to explain how a fault in the SONET/SDH network is processed at the side of the IP router according to the first embodiment of the present invention;

FIG. 33 is a diagram showing a format for a SRP packet;

FIG. 38A is a diagram showing a format example of a K1-byte of data;

FIG. 38B is a diagram showing a format example of a K2-byte of data;

FIGS. 40A to 40D are diagrams used to explain format examples of link status signals, respectively;

FIGS. 42A to 42C are diagrams showing examples of routing tables when normal operation is performed with one single transmission line;

FIGS. 42D to 42F are diagrams showing examples of routing tables when a transmission line fault occurs;

DETAILED DESCRIPTION OF THE PREFERRED EMBODIMENTS

Embodiments of the present invention will hereinafter be described with reference to the drawings.

(A) First Embodiment

Figure 1:
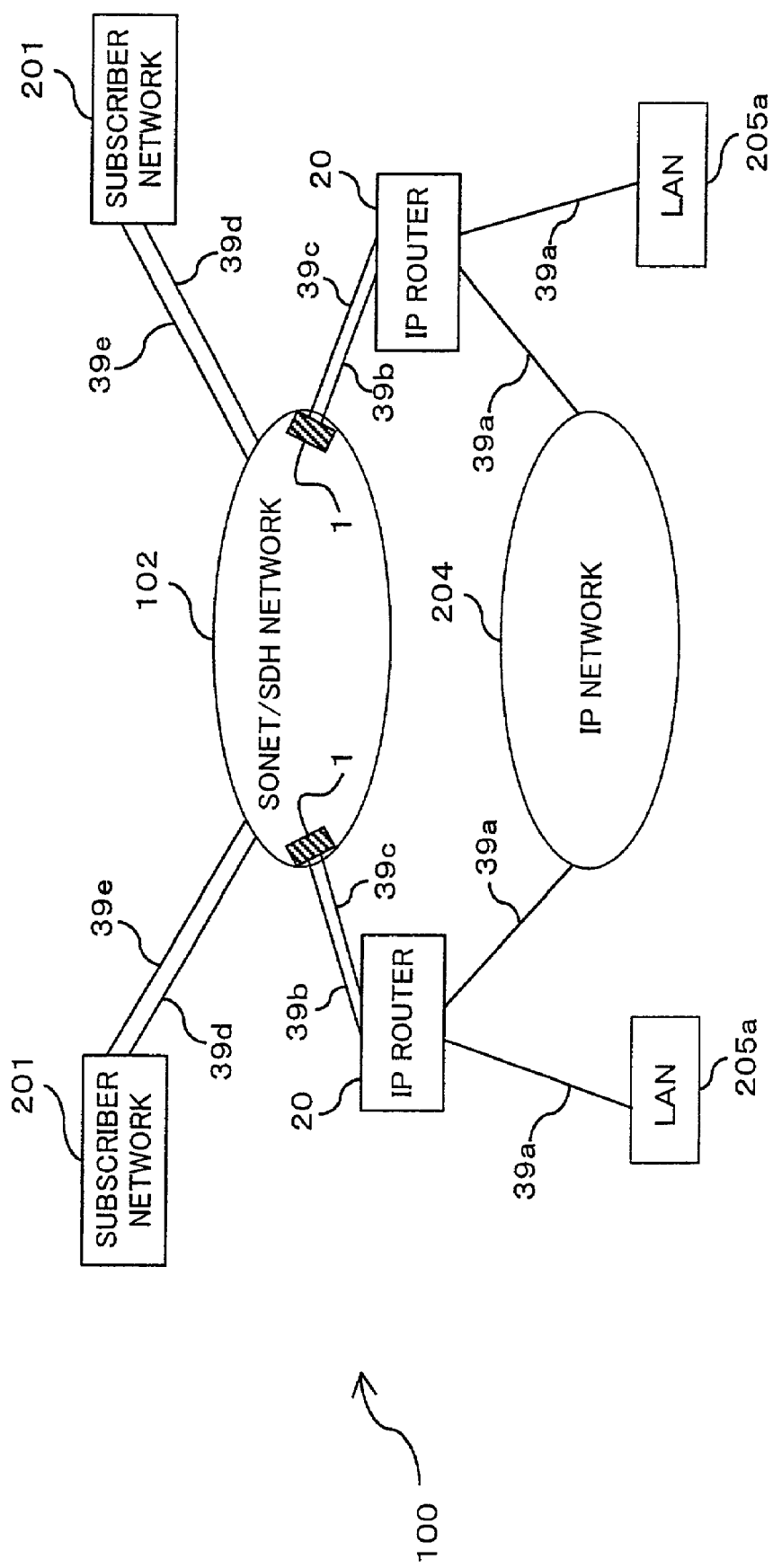
FIG. 1 is a schematic diagram of a transmission system according to a first embodiment of the present invention.

FIG. 1 schematically shows a transmission system according to a first embodiment of the present invention. The transmission system 100 shown in the figure transmits and receives a packetized transmission signal and is equipped with IP routers 20, SONET/SDH apparatus (SO- NET/SDH transmitters with 1 Gbps/10 Gbps Ethernet interfaces) 1, transmission lines (packet transmission lines) 39a to 39c, optical transmission lines 39d, 39e, an IP network (Internet) 204, LANs 205a, subscriber networks 201, and a SONET/SDH network 102.

The transmission system 100 relates primarily to a communication method between the SONET/SDH apparatus 1 and the IP router 20, and transmitters employing the communication method. The IP router 20 and the SONET/SDH apparatus 1 both function as transmitters. Note that the SONET/SDH apparatus 1 may have either a 1 Gbps Ethernet interface or a 10 Gbps Ethernet interface.

The SONET/SDH apparatus 1 has the function of transmitting and receiving transmission-line switching control information obtained in the SONET/SDH network 102. The SONET/SDH apparatus 1 is connected to the IP network 204 and constitutes the transmission system 100 that transmits and receives data packets. The SONET/SDH apparatus 1 is equipped with a SONET/SDH interface card (also called a line card and hereinafter referred to as a SONET/SDH card) for transmitting and receiving a SONET/SDH frame, and 1 Gbps/10 Gbps Ethernet interface cards (also referred to as 1 Gbps/10 Gbps Ethernet cards) for transmitting and receiving an IP packet (IP datagram). The SONET/SDH card is connected with the SONET/SDH network 102. The 1 Gbps/10 Gbps Ethernet cards are connected with the IP router 20.

The IP router 20 is provided in the IP network 204 and has the function of routing IP packets and the function of transmitting and receiving data packets and is a transmitter connected to the SONET/SDH network 102 through the SONET/SDH apparatus 1. The IP router 20 is also connected with the IP network 204, LAN 205a, SONET/SDH apparatus (1 Gbps/10 Gbps Ethernet interfaces) 1 by 1 Gbps/10 Gbps Ethernet.

Figure 7A:
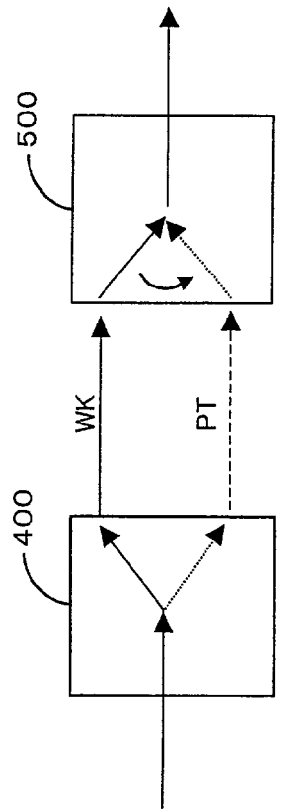
FIG. 7A is a diagram used for explaining a (1+1) switching structure.
Figure 7B:
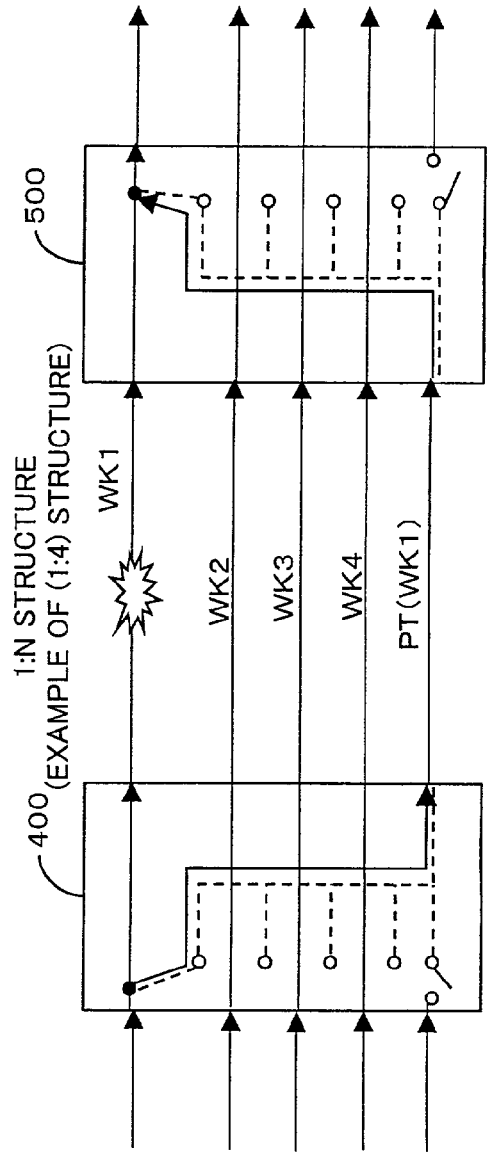
FIG. 7B is a diagram used for explaining a (1:N) switching structure.

The SONET/SDH apparatus (with 1 Gbps/10 Gbps Ethernet interfaces) 1 and the IP router 20 are connected via two or more transmission lines by utilizing the automatic protection switching (APS) function that the SONET system employs, or the multiplex section protection (MSP) function that the SDH system employs. The connection is made with a (1+1) structure or (1:N) structure (where N is an integer of 2 or greater), shown in FIGS. 7A and 7B. The line protection (switching) for two or more transmission lines is performed by employing a K-packet consisting of an IP packet. The details of this K-packet will be described later.

The line protection method and the transmitters will hereinafter be described in order.

(1) Line Protection between IP Router 20 and SONET/SDH apparatus 1

Figure 3:
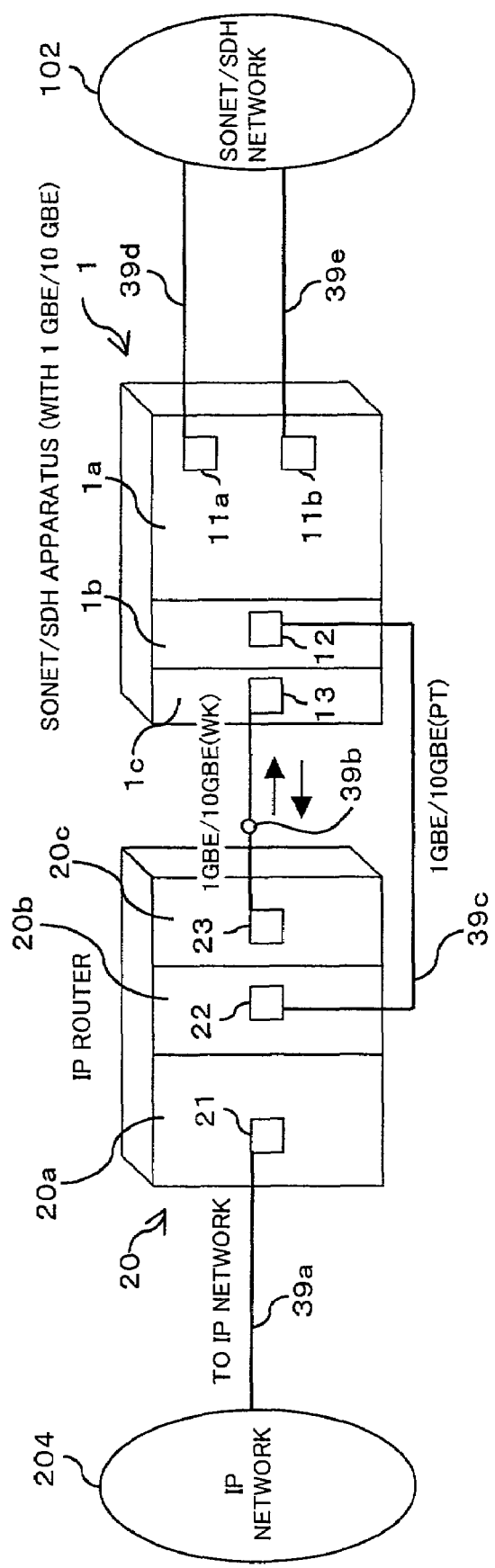
FIG. 3 is a diagram used to explain the line protection between a SONET/SDH transmitter and an IP router according to the first embodiment of the present invention.

FIG. 3 shows the line protection between the SONET/SDH apparatus (with 1 Gbps/10 Gbps Ethernet interfaces) 1 and the IP router 20 according to the first embodiment of the present invention. The IP router 20 and the SONET/SDH apparatus (with 1 Gbps/10 Gbps Ethernet interfaces) 1 are connected by 1 Gbps/10 Gbps Ethernet. The transmission line 39b is connected between ports (physical ports) 23, 13. The transmission line 39c is connected between ports 22, 12.

In FIG. 3, reference numerals 20b, 20c, 20a, 1b, and 1c denote 1 Gbps/10 Gbps Ethernet cards (interface section), respectively. A SONET/SDH card is represented by reference numeral 1a.

The 1 Gbps/10 Gbps Ethernet card 20a of the IP router 20 is connected to the IP network 204. The SONET/SDH card 1a of the SONET/SDH apparatus (with 1 Gbps/10 Gbps Ethernet interfaces) 1 is connected to the SONET/SDH network 102.

The 1 Gbps/10 Gbps Ethernet connection between the IP router 20 and the SONET/SDH apparatus (with 1 Gbps/10 Gbps Ethernet interfaces) 1 has a redundancy structure by the transmission lines 39b, 39c. IP packets with the same information are always transmitted onto the transmission line 39b (WK) and the transmission line 39c (PT) by the IP router 20 and the SONET/SDH apparatus 1. That is, the two transmission lines 39b, 39c function as redundancy transmission lines.

The transmitter on the receiving side selects the better of the two IP packets received via the transmission lines 39b, 39c. In this embodiment, the IP packet from the transmission line 39b (WK) is selected. Thus, the transmitter on the receiving side has the automatic protection switching adapter function of switching the transmission lines WK and PT.

To switch the transmission lines WK and PT, there is provided a new IP packet, called a K-packet (specific packet), for controlling automatic protection switching. The K-packet is transmitted and received between the SONET/SDH apparatus (with 1 Gbps/10 Gbps Ethernet interfaces) 1 and the IP router 20.

The K1-byte and K2-byte (transmission-line switching information) formatted according to the SONET/SDH system, as they are, are inserted into the K-packet. More specifically, the K1-byte and K2-byte are mapped into an IP packet, which is transmitted to its destination. In this manner, the K1-byte and K2-byte can be used in the IP network 204. In addition, various functions can be added by providing various kinds of control information.

Therefore, since the transmission lines WK and PT are switched in the 1 Gbps/10 Gbps Ethernet by an IP packet, network redundancy can be enhanced. The details will be described later.

(2) Transmission System 100

The transmission system 100 in this embodiment has the IP router 20, SONET/SDH apparatus 1, and other transmitters that are capable of transmitting and receiving packetized transmission signals. This transmission system 100 also has, for example, two transmission lines 39b, 39c onto which a transmission signal and a redundant transmission signal, containing the same data as information data contained in the transmission signal, are transmitted. The IP router 20, SONET/SDH apparatus 1, and other transmitters have generating sections, transmitting sections, and redundancy switching sections, respectively. These will hereinafter be described in detail.

(2-1) SONET/SDH Apparatus 1

The functions of the SONET/SDH apparatus (with 1 Gbps/10 Gbps Ethernet interfaces) 1 will further be described with reference to FIG. 3.

The SONET/SDH apparatus (with 1 Gbps/10 Gbps Ethernet interfaces) 1 shown in FIG. 3 has a SONET/SDH card 1a and 1 Gbps/10 Gbps Ethernet cards 1b, 1c. Reference numerals 11a, 11b denote ports, which are connected with the SONET/SDH network 102 via optical fibers (transmission lines 39d, 39e). Reference numerals 12, 13 represent ports, which are connected to the transmission lines 39b, 39c. The SONET/SDH apparatus 1 is connected with the IP router 20 provided opposite the transmitter 1 via the transmission line (WK) 39b and transmission line (PT) 39c.

The SONET/SDH card 1a has the function of supporting the SONET/SDH system. Because of this, the SONET/SDH card 1a has an interface such as OC-3 (STM (synchronous transfer mode)-1, OC-48 (STM-16), etc. This SONET/SDH card 1a transmits and receives SONET/SDH frames; multiplexes and demultiplexes payloads (data field); and performs the function of transmitting data to the transmitter opposite and 1 Gbps/10 Gbps Ethernet cards 1b, 1c.

The 1 Gbps/10 Gbps Ethernet cards 1b, 1c support a system stipulated in IEEE standard 802.3, and primarily have 1 Gbps/10 Gbps Ethernet interfaces. These 1 Gbps/10 Gbps Ethernet cards 1b, 1c transmit and receive an IP packet primarily. The 1 Gbps/10 Gbps Ethernet cards 1b, 1c also have the function of transferring a received IP packet to a transmitter such as IP router 20, etc., or SONET/SDH card 1a. For transmission and reception of a data signal, the 1 Gbps/10 Gbps Ethernet cards 1b, 1c further have the function of interfacing the SONET/SDH interface by employing the POS (packet over SONET) technique.

If the 1 Gbps/10 Gbps Ethernet cards 1b, 1c are employed as PT and WK, the transmission lines can have a redundancy structure. With a K-packet for switching the transmission lines (WK and PT), selection of the WK or PT can be controlled.

While the SONET/SDH apparatus (with 1 Gbps/10 Gbps Ethernet interfaces) 1 has been outlined, the details will be described later.

Next, the IP router 20 will be outlined with reference to FIG. 3.

(2-2) IP Router 20

The IP router 20 has 1 Gbps/10 Gbps Ethernet cards 20a, 20b, and 20c. Reference numerals 21, 22, 23 denote ports, which are connected with transmission lines. In FIG. 3, the port 21 is connected to the IP network 204 via the transmission line 39a. The ports 22, 23 are connected to the 1 Gbps/10 Gbps Ethernet cards 13, 12 of the SONET/SDH apparatus (with 1 Gbps/10 Gbps Ethernet interfaces) 1 opposite via the transmission lines 39b, 39c. In this manner, the transmission line 39b (WK) and the transmission line 39c (PT) form a redundancy structure.

The 1 Gbps/10 Gbps Ethernet card 20a has the fundamental function of transmitting a received IP packet to other transmitters.

The Gbps/10 Gbps Ethernet cards 20b, 20c, in addition to the above function of the 1 Gbps/10 Gbps Ethernet card 20a, can make the transmission lines have a redundancy structure by employing the card 20c as WK and the card 20b as PT.

In addition, with the K-packet for switching the transmission lines (WK and PT), selection of the WK or PT can be controlled.

According to the received status of the packetized K-byte of data from the transmitter 1 opposite, the 1 Gbps/10 Gbps Ethernet card 20a is capable of selectively switching the transmission lines 39b, 39c onto which a transmission signal with information data is transmitted. Thus, the 1 Gbps/10 Gbps Ethernet card 20a functions as a redundancy switching section. Therefore, by employing the transmission line (PT) when a fault occurs at the transmission line (WK), packet loss due to a transmission line fault and a transmitter failure can be minimized. In this manner, stable operation of the network becomes possible. In addition, during maintenance, an inspection can be conducted without disconnecting communication.

Note that the details of the IP router 20 will be described later.

(2-3) Packet Transmission Lines 39a to 39c

Figure 8A:
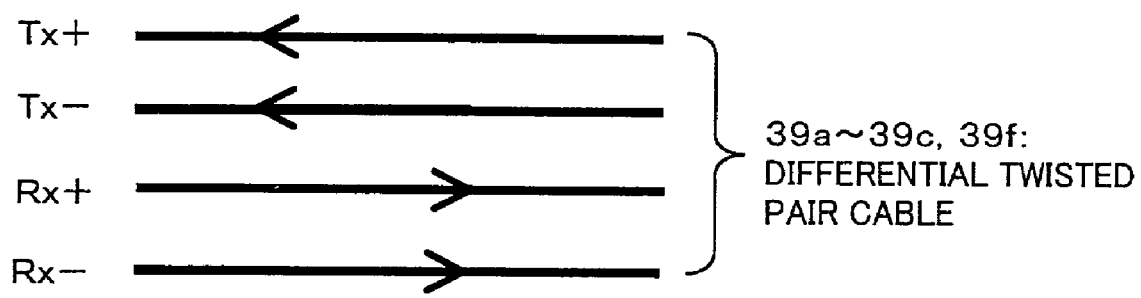
FIG. 8A is a schematic diagram of a differential, twisted pair cable for packet transmission.

The packet transmission lines 39a to 39c (see FIG. 3) connect the IP router 20, IP network 204, and LAN 205a and are able to transmit an IP packet of 1 Gbps or greater. More specifically, FIG. 8A shows a single, twisted pair cable, which consists of two transmission lines TX (differential signal) and two reception lines RX (differential signal).

(2-4) Optical Transmission Lines 39d, 39e

Figure 8B:
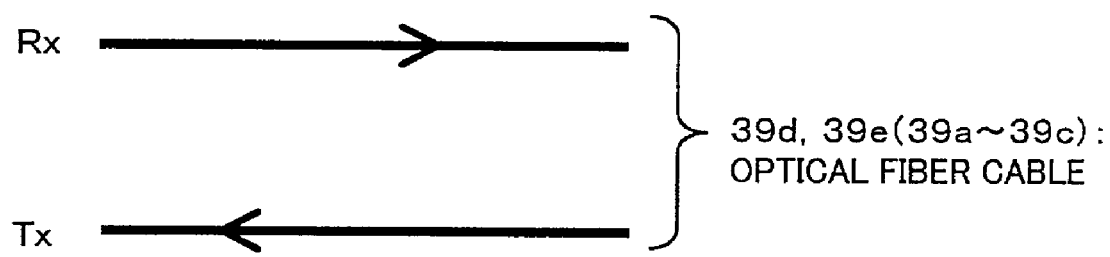
FIG. 8B is a schematic diagram of an optical fiber cable for packet transmission.

The optical transmission lines 39d, 39e are constructed of an optical fiber cable. The optical fiber cable consists of a transmission line TX and a reception line RX, as shown in FIG. 8B. The transmission line TX and the reception line RX are separated individually from each other. In packet transmission lines, the above twisted pair cable and optical fiber cable are chiefly employed.

The standard of Ethernet has an electrical interface and an optical interface. The electrical interface is connected with a cable (which is typically a LAN cable) called an unshielded twist pair (UTP) cable.

An interface for LAN equipment, as is well known, is indicated as "100 BASE-TX," "1000 BASE-TX," etc. The "100," "BASE," and "TX" in the "100 BASE-TX" represent a bandwidth, a transmission system, and an interface, respectively. For instance, bandwidths 10, 100, and 1000 represent 10 Mbps, 100 Mbps, and 1 Gbps (1000 Mbps), respectively. Transmission systems BASE and BROAD represent a base band transmission system and a broadband transmission system, respectively. Interfaces TX and FX represent "electrical (a LAN cable is used)" and "optical (an optical fiber is used)," respectively. "100 BASE-TX", for example, means a LAN cable (differential, twisted pair cable) having a base band transmission system of 100 Mbps. Note that a transmission signal includes both an electrical signal and an optical signal.

The IP router 20 and the SONET/SDH apparatus 1, provided opposite each other via the packet transmission lines 39b, 39c, are point-to-point connected with each other.

(2-5) IP Network 204 and Subscriber Network 201

The IP network 204 (see FIGS. 1 and 3) is a network with Internet protocols, in which a great number of private and public networks are interconnected. Unless otherwise noted, the IP network 204 is assumed to include Internet and the LANs 205a.

The LAN 205a is a private network provided in a building such as an enterprise, a school, etc., and functions as the IP network 204. The LAN 205a, in addition to personal computers (hereinafter referred to as PCs) and portable information terminals, has relay transmitters such as a bridge, a hub, a router, etc. Between these, an IP packet is relayed. The bridge is a transmitter which identifies an MAC address and relays an IP packet. The router is a transmitter that outputs an IP packet, which has a desired IP address, of the packets received by one port, to a port corresponding to its destination.

For an IP packet from the LAN 205a, the IP router 20 selects a route suitable for transfer, from among a great number of routes leading to another IP network 204 and transmits the IP packet onto the selected route.

The subscriber network 201 is a network consisting of a telephone network, an ISDN, an ADSL network, and a high-speed digital line (or user terminals of these). This definition can be variously changed.

(2-6) SONET/SDH Network 102

Figure 2:
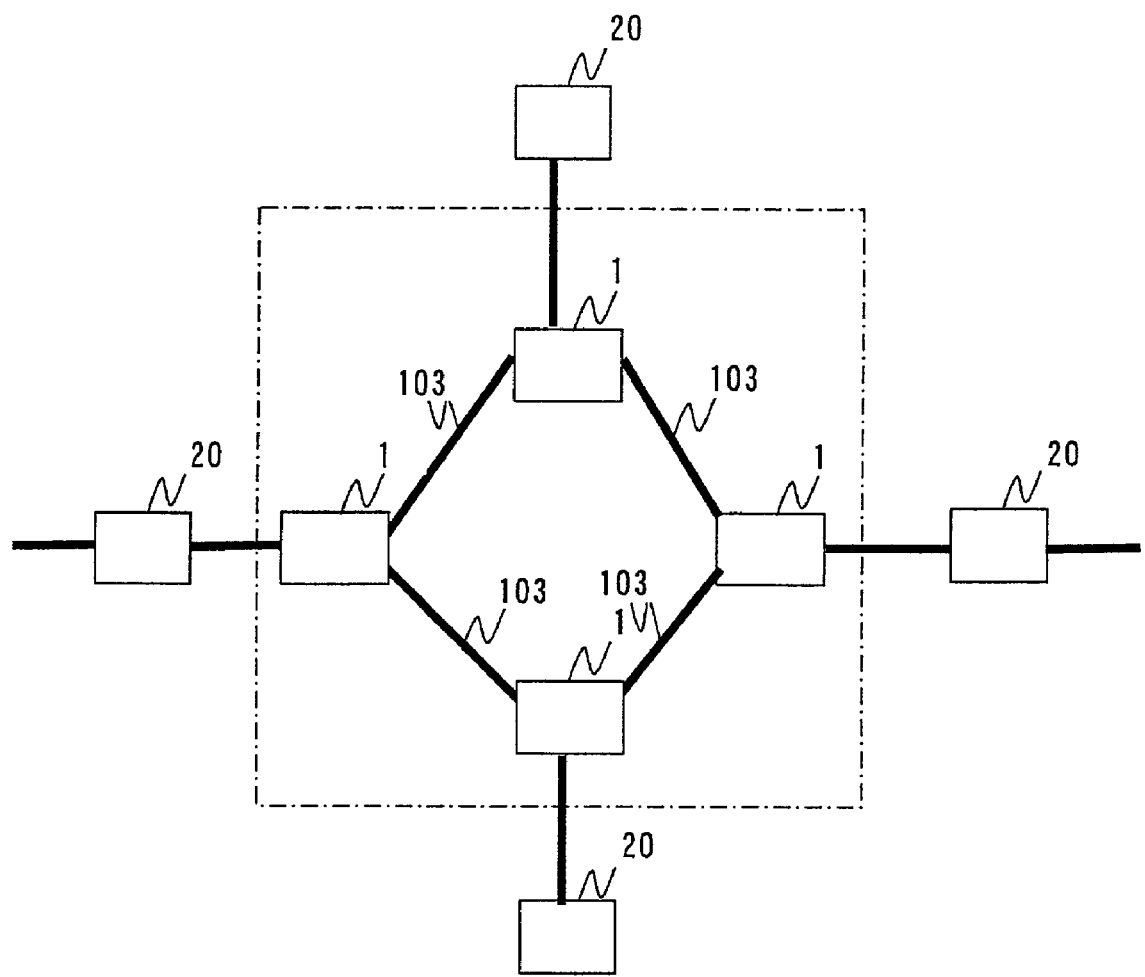
FIG. 2 is a schematic diagram of a SONET/SDH network according to the first embodiment of the present invention.

The SONET/SDH network 102 is a core network to which the SONET/SDH system is applied. The SONET/SDH network 102 transmits a multiplexed signal in which a predetermined number of time slots stipulated in this system are time-multiplexed. In the SONET/SDH network 102, as shown in FIG. 2, a great number of SONET/SDH apparatuses 1 are interconnected via optical transmission lines 103. The SONET/SDH apparatuses 1 are also connected with IP routers 20 through Ethernet interface cards, respectively. In this manner, the network is formed. The constitution of this SONET/SDH network 102 is also true in a second embodiment to be described later. Unless otherwise noted, the transmission system 100 shown in FIG. 1 is the same in the second embodiment that is to be described later.

The above is an outline of the transmission system 100. Next, the K-packet will be described in detail.

(3) K-packet

The K-packet is an IP packet containing a K-byte and a K-packet of data. More specifically, the K-packet is a control packet for performing redundancy transmission-line switching, as described above. This K-packet is generated according to a user datagram protocol/Internet protocol (UDP/IP). The K-packet applies the K1-byte and K2-byte being employed in the SONET/SDH system to the data field according to a user datagram protocol (UDP), and contains additional control information. There are two types of K-packets: K-packet (management) and K-packet (control). The K-packet (management) is a management packet for determining a transmission control right for the K-packet, while the K-packet (control) is a control packet for performing a redundancy switching request.

In addition, a K-packet generating section 5b and a K-packet processing section 44c, which are to be described later, generate the K-packet, using UDP.

(3-1) Transmission Control Right

The transmission control right for the K-packet is a right for the SONET/SDH apparatus (with 1 Gbps/10 Gbps Ethernet interfaces) 1 and IP router 20) to transmit the K-packet (management) and the K-packet (control) spontaneously onto the transmission lines (redundancy structure) therebetween.

The transmitter (IP router 20 or SONET/SDH apparatus 1) that has the transmission control right will send the K-packet (management) and the K-packet (control) to the transmitter opposite (e.g., SONET/SDH transmitter 1 or IP router 20). This transmission control right is determined by a set value written previously to the memory (not shown) of the management unit of each of the transmitters.

Note that the set value can be changed to a desired value. Also, the set value is reflected on the packet header (management flag field to be described later) of the K-packet. When the set value is set, it is 1. On the other hand, when it is not set, it is 0.

By employing the transmission control right, the conflict of K-packets from the IP router 20 and SONET/SDH transmitter 1 can be avoided.

(3-2) Format for K-Packet

The K-packet has a format for UDP/IP (user datagram protocol/Internet protocol) which does not perform retransmission control. One reason why UDP/IP is employed is that UDP/IP does not perform retransmission control in network layers. That is, UDP/IP is suitable for high-speed transfer.

Figure 9:
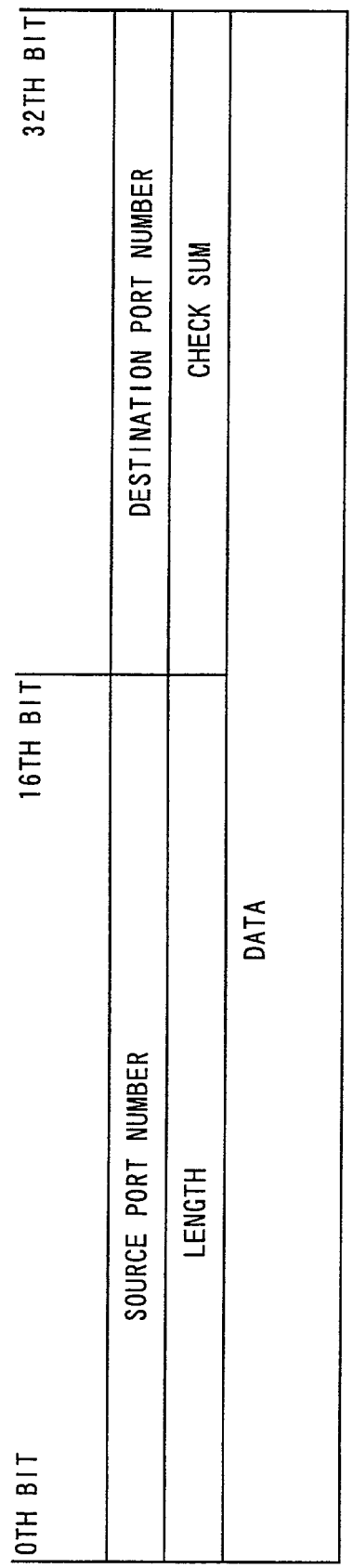
FIG. 9 is a diagram showing a format example of a K-packet according to the first embodiment of the present invention.

FIG. 9 shows a format example of the K-packet according to the first embodiment of the present invention. The format shown in the figure is the UDP format, which has a source port number field, a destination port number field, etc. For example, "65535" is inserted as the port number of the K-packet.

The port number "49152 to 65535" in UDP/IP is a field that user can freely use. UDP is defined by RFC (request for comments) 768. An example of the data field in the K-packet shown in FIG. 9 is shown, for example, in FIG. 10.

Figure 10:
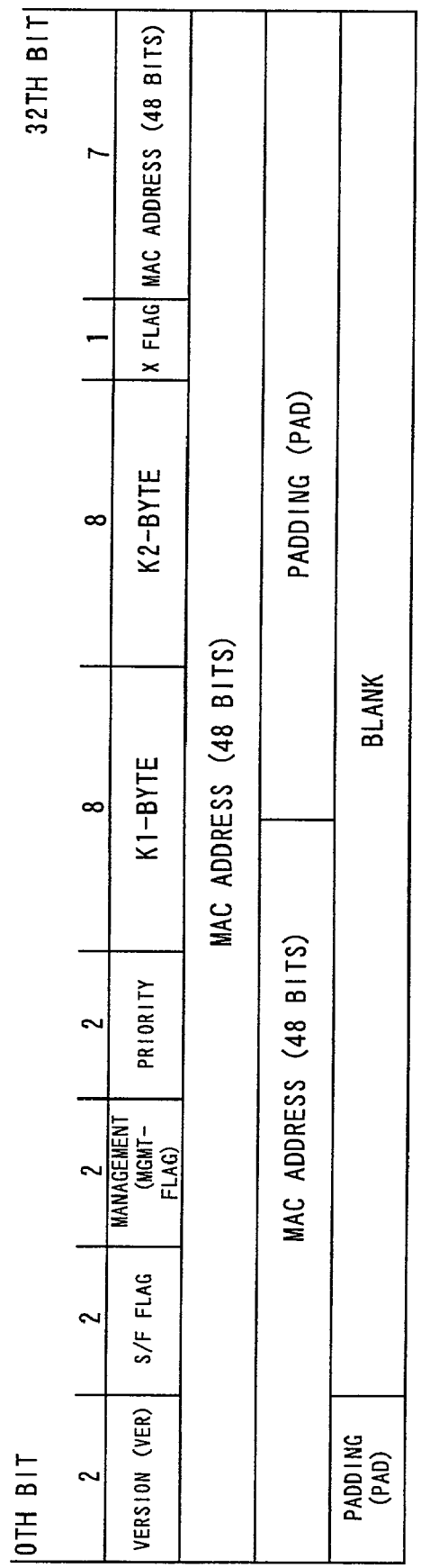
FIG. 10 is a diagram showing an example of the header of the K-packet according to the first embodiment of the present invention.

FIG. 10 shows an example of the header of the K-packet according to the first embodiment of the present invention. The header of the K-packet shown in the figure contains control data and has VER (version), S/R flag, Mgmt-Flag (management flag), priority, K1-byte, K2-byte, X flag, MAC address, and padding (PAD) fields. Note that the numerals shown in FIG. 10 indicate the number of bits of each field.

The "version" field in the header format of the K-packet indicates the version of the K-packet and has a 2-bit number, for example, 01. The S/R flag field is used to decide whether a received K-packet is a K-packet (management) which is data for management, or a K-packet (control) which is control data for switching.

The S/R flag field has the function of discriminating between the K-packet (management) and the K-packet (control). When a certain transmitter receives the K-packet (control), the S/R flag field decides whether or not the transmitter opposite has processed the K-packet. When the S/R flag field is 00 or 01, it represents the K-packet (control). More specifically, when it is 00, it indicates that the transmitter opposite has not processed the K-packet. When it 01, it indicates that the transmitter opposite has processed the K-packet (control).

In this manner, management data for determining the transmission control right for the K-packet containing a K-byte of data is inserted into a transmission signal and packetized.

Thus, a transmitter receiving the K-packet (control) is able to decide by the S/R flag whether or not the transmitter opposite has processed the K-byte. This makes a contribution to shortening the processing. In the case where the S/R flag is 11, it represents the K-packet (management). The transmitter opposite recognizes that it is the management flag for determining the transmission control right.

The management flag represents the transmission control right for the IP router 20 and SONET/SDH apparatus (with 1 Gbps/10 Gbps Ethernet cards) 1. The transmitter with a management flag of 1 has the transmission control right and sends the K-packet (management) and the K-packet (control). The transmitter with a management flag of 0 does not perform sending of the K-packet (management) and spontaneous sending of the K-packet (control). A set value for the transmission control right is reflected on the management flag field (management).

In this manner, the transmission control right for the K-packet is determined and conflict of the K-packets is prevented. These values and number of bits can be changed. Note that a transmitter with a management flag of 0 performs a response process only when it receives the K-packet, and does not perform spontaneous sending.

When both the IP router 20 and the SONET/SDH apparatus 1 set the management flags, examples of the set values are shown in FIG. 11.

FIG. 11 shows examples of set values for the management flag according to the first embodiment of the present invention. The matrix 43 shown in the figure indicates the relationship between a value for the management flag and a process to be performed by a transmitter. The vertical column in the matrix 43 indicates values for the management flag that are given to the SONET/SDH apparatus 1, while the horizontal column indicates values for the management flag that are given to the IP router 20. When the SONET/SDH apparatus 1 and IP router 20 have different values, sending of the K-packet (management) and the K-packet (control) is controlled. Note that the set values shown in FIG. 11 are also true in the second embodiment to be described later.

On the other hand, when the SONET/SDH apparatus 1 and the IP router 20 have a value of 0 for the management flag, both transmitters do not transmit and receive the K-packet. In this case, the selection of WK or PT is decided based on the link statuses of the transmission lines 39b, 39c. For example, when the packet transmission line 39b being operated as WK has no fault, and the packet transmission line 39c being operated as PT has a fault such as cutting, the packet transmission line 39b being operated as WK is determined as WK.

When the two transmitters have a value of 1 for the management flag, both transmitters send the K-packet (management) and the K-packet (control). Therefore, to prevent the conflict of K-packet transmissions between the IP router 20 and the SONET/SDH apparatus (with 1 Gbps/10 Gbps Ethernet) 1, the transmission control right is given to the transmitter in which a value for the priority field of the K-packet (management) is smaller. Therefore, each transmitter constituting the transmission system 100 has both the transmission control right for the K-packet containing a K-byte of data, and data on the priority of a priority transmitter which can send the K-packet preferentially.

In this manner, the conflict between the IP router 20 and the SONET/SDH apparatus 1 is avoided. When the two transmitters have a value of 1 for the management flag, the transmission control right is determined by employing the priority field of the K-packet.

The priority field shown in FIG. 10 indicates the priority of a transmitter having the transmission control right. For example, values 0 through 4 are set. For example, 0 represents that the priority is high, and 4 represents that the priority is low. Note that the IP router 20 and the SONET/SDH apparatus (with 1 Gbps/110 Gbps Ethernet cards) 1 are the same in priority, the transmitter in which a value for the source MAC address is smaller has the transmission control right for the K-packet.

The K1-byte and K2-byte fields in the K-packet format function as flags, respectively. These fields are employed to select the packet transmission lines 39b, 39c between the IP router 20 and the SONET/SDH apparatus (with 1 Gbps/10 Gbps Ethernet cards) 1. The K1-byte represents the type of demand message, the priority, and the channel number that sent the demand message. The K2-byte uses the same code as the K1-byte in a portion thereof and identifies the channel number that performed bride action, or the redundancy structure ((1+1) structure or (1:N) structure).

The X flag field in the K-packet format is used to indicate the transmission state on the side of the SONET/SDH network 102 and indicates the occurrence of a fault at the optical transmission line, transmitter, etc. on the side of the SONET/SDH network 102. When the X flag is 0, it indicates that the SONET/SDH network 102 is in a normal state. When it is 1, it indicates that a fault has occurred in the SONET/SDH network 102. This is valid only when the IP router 20 receives the K-packet (control). Thus, it becomes possible for the IP router 20 to detect a fault on the side of the SONET/SDH network 102 quickly.

The padding field in the K-packet format has adjustment bits or bytes that are added when the length of an IP packet is shorter than 64 bytes.

By employing the K-packet, even in Ethernet, the IP router 20 and the SONET/SDH apparatus 1 can continue to monitor the state of the transmission lines (WK and PT) between the IP router 20 and the SONET/SDH apparatus 1 and a fault at the self-transmitter, based on the information contained in the K-packets received via the transmission lines (WK and PT). When a fault occurs at the transmission lines or transmitters, WK or PT can be switched within 50 ms.

For an IP packet other than the K-packet, when there is no fault at the transmitters and transmission lines, the IP packet on the transmission line WK is selected and transferred. The K-packet is transmitted from the SONET/SDH apparatus 1. It may be transmitted from the IP router 20.

(3-3) Transmission-Line Switching Time and K-Packet Sending Interval

For the time to switch WK and PT, it is stipulated in GR-253 that APS switching time is within 50 ms. In data communication, the data length of an IP packet (packet length) is variable, so there is a need to add a margin to the sending interval and perform APS switching within 50 ms at worst.

An example of the sending interval for K-packets is within 30 ms. The optimum sending interval is determined to a value between the minimum (64 bytes) and maximum (1518 bytes) of the packet length and is obtained by the maximum number of packets per second. Therefore, since K-packets are sent from the 1 Gbps/10 Gbps Ethernet cards 1b, 1c of the SONET/SDH apparatus 1, suitable throughput can be ensured by making adjustments to the number of K-packets.

Note that when performing switching more quickly, at the time of 1 Gbps Ethernet transmission it is desirable that a K-packet be sent at intervals of 3 to 10 ms, and at the time of 10 Gbps Ethernet transmission it is desirable that the interval be 0.3 to 1.0 ms.

Thus, in both cases of 1 Gbps and 10 Gbps, the transmission lines (WK and PT) can be switched within a previously stipulated time.

Note that the format of the K-packet holds in the second embodiment to be described later.

The above is a description of the K-packet. The IP router 20 and SOENT/SDH transmitter 1 will hereinafter be described in detail.

Next, the functions of the 1 Gbps/10 Gbps Ethernet cards will be described with reference to FIG. 4.

(4) IP Router 20

Figure 4:
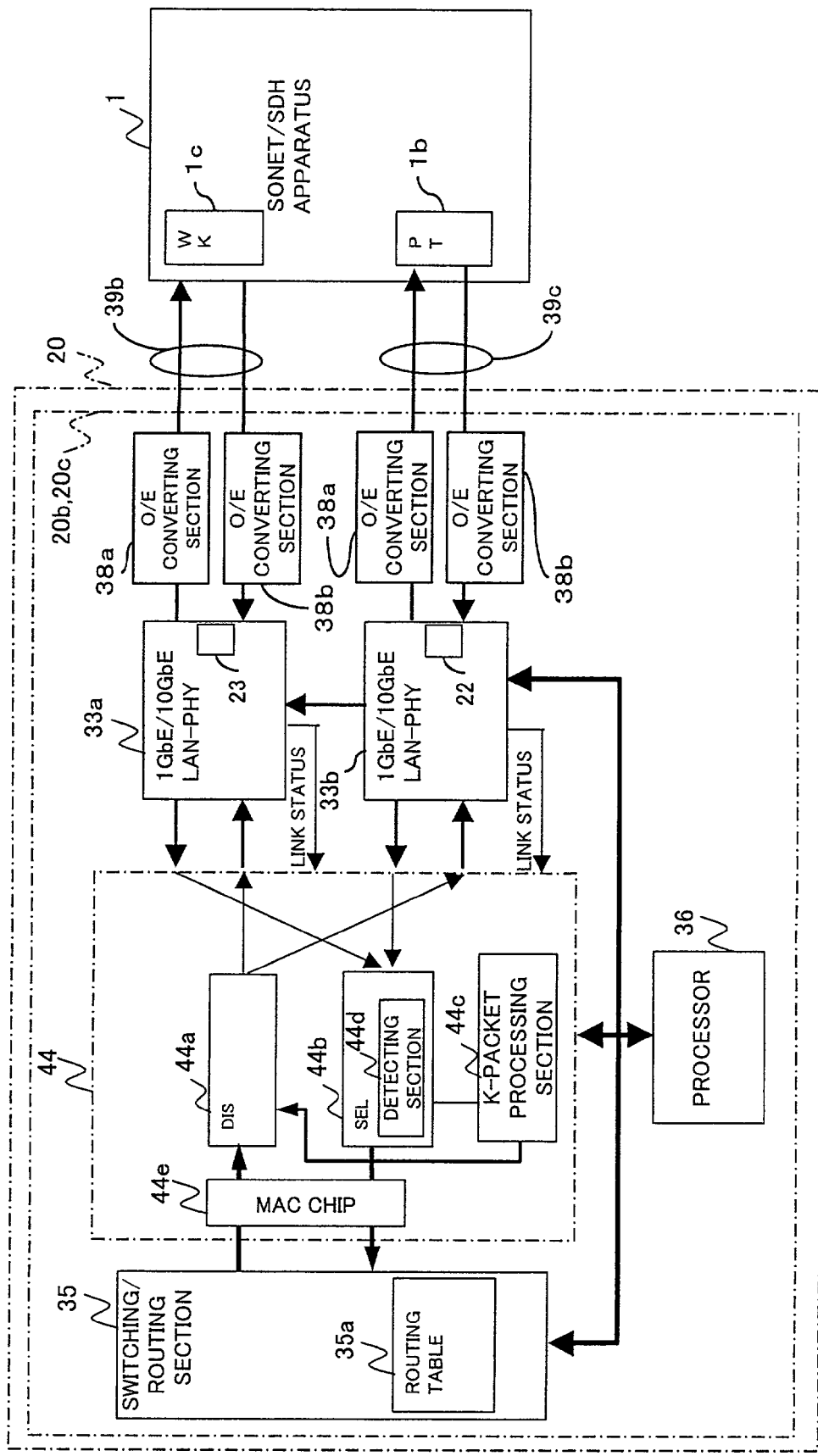
FIG. 4 is a block diagram of the IP router according to the first embodiment of the present invention.

FIG. 4 schematically shows the IP router 20 according to the first embodiment of the present invention. The IP router 20 is connected to the IP network 204 and functions as a transmitter capable of transferring a K-packet which contains transmission-line switching control information about the transmission line 39a. This IP router 20 is equipped with 1 Gbps/10 Gbps Ethernet cards 20b, 20c. The cards 20b, 20c are connected with the SONET/SDH apparatus 1 through a redundancy transmission line structure which consists of a plurality of transmission lines onto which data packets are transmitted. Thus, the 1 Gbps/10 Gbps Ethernet cards 20b, 20c function as an interface section. In the first embodiment, the functions of the interface section (cards 20b and 20c) are exhibited with a single card (e.g., a card type circuit board). Note that the details will be described later.

(4-1) Functions of 1 Gbps/10 Gbps Ethernet Cards 20b, 20c

A description will be given of the functions of the 1 Gbps/10 Gbps Ethernet cards 20b, 20c shown in FIG. 4. The cards 20b, 20c have the following three functions. That is, the cards 20b, 20c have (1) the function of causing 1 Gbps/10 Gbps Ethernet transmission lines to have redundancy, (2) the function of controlling the transmission lines having redundancy, and (3) the function of routing and forwarding IP packets.

(4-1-1) Function of Causing 1 Gbps/10 Gbps Ethernet Transmission Lines to have Redundancy The 1 Gbps/10 Gbps Ethernet cards 20b, 20c shown in FIG. 4 function as interface section in cooperation with ports 23, 22 connected with transmission lines 39b (WK), 39c (PT). These ports 23, 22 are connected with a transmission line structure consisting of the transmission lines 39b, 39c on which IP packets with the same information are always transmitted. In addition, the K-packets for controlling the switching of the transmission lines 39b, 39c are transmitted onto the transmission lines 39b, 39c. For two signals with the same content received via the transmission lines 39b, 39c, the 1 Gbps/10 Gbps Ethernet cards 20b, 20c have the function of selecting one of the two signals which is better in quality.

(4-1-2) Function of Controlling Transmission Lines having Redundancy

To realize the function mentioned in (4-1-1), switching of the transmission lines 39b, 39c is controlled by employing both the link statuses of the transmission lines and a K-packet. If there is no fault at the transmission lines, then the transmission line 39b (WK) is always selected.

(4-1-3) Function of Routing and Forwarding an IP Packet

Between the IP packets received via the transmission lines 39b, 39c, the IP packet with better quality is selected. The selected IP packet is forwarded to its destination, based on the destination IP address of the IP packet and the routing information.

An example of line switching by the K-packet is determined by the K1-byte and K2-byte fields of the K-packet format. For instance, the K1-byte field represents signal degradation (SD) indicating that a bit error rate for a signal has been degraded from a predetermined value, or a signal failure (SF) indicating the occurrence of a transmission fault. The 1 Gbps/10 Gbps Ethernet cards have both the function of inserting this information into an IP packet and sending the IP packet and the function of receiving and processing the IP packet, respectively. The transmitter opposite detects SD or SF and then switches WK or PT.

The condition for detecting SF is when the 1 Gbps/10 Gbps Ethernet cards 20b, 20c detect a loss of signal (LOS) or loss of frame (LOF), when they detect that the bit error rate (BER) has reached $10^{-3}$ to $10^{-5}$, and when they detect the disconnection of a link (link status).

Note that in Ethernet, the BER is judged by a frame check sequence (FCS) for an IP packet. The condition for detecting SD is when the 1 Gbps/10 Gbps Ethernet cards 20b, 20c detect that the bit error rate (BER) is $10^{-5}$ to $10^{-12}$.

The detecting conditions in the SONET/SDH system will further be described. The SF detecting condition is when LOS, LOF, or AIS (alarm indication signal) is detected, and when it is detected that the bit error rate (BER) is $10^{-3}$ to $10^{-5}$. The AIS is a 1-bit signal indicating that there exists a transmission error at a line. The SD detecting condition is when it is detected that the bit error rate (BER) is $10^{-5}$ to $10^{-9}$.

Thus, by causing the transmission lines in Ethernet to have a redundancy structure and transmitting and receiving the same data, it becomes possible to switch WK to PT quickly even when a fault occurs at the transmission line (WK) or a transmitter fails. Therefore, stable network operation becomes possible.

(4-2) 1 Gbps/10 Gbps Ethernet Cards 20b, 20c

Next, a description will be given of the 1 Gbps/10 Gbps Ethernet cards 20b, 20c.

The 1 Gbps/10 Gbps Ethernet cards 20b, 20c are both equipped with physical layer processing sections (LAN-PHY: local area network-physical) 33a, 33b, an MAC-layer processing section 44, a switching/routing section 35, and a processor 36. It is also possible to provide E/O conversion sections 38a and O/E conversion sections 38b between the physical layer processing sections 33a, 33b and the packet transmission lines 39b, 39c. When the E/O conversion sections 38a and O/E conversion sections 38b are provided, optical transmission lines (optical fibers) are connected. When they are not provided, a twisted pair cable that is electrical transmission lines is connected. Other than these, parts having the same reference numerals as the aforementioned parts are the same or similar in function, so a further description thereof is omitted to avoid redundancy.

The processor 36 is constructed of a central processing unit (CPU) and connected to each functional module (not shown) of the 1 Gbps/10 Gbps Ethernet cards 20b, 20c. In cooperation with a random access memory (RAM), a read only memory (ROM), etc., the processor 36 performs calculations and monitors interruption, thereby managing and controlling units.

The physical layer processing sections 33a, 33b have both the function of terminating a transmission signal and a redundant transmission signal transmitted from physical layers, and the function of outputting a link status signal representing the connection or disconnection of a line at predetermined time intervals and monitoring the line switching of WK and PT that is performed by this chip.

More specifically, the physical layer processing sections 33a, 33b output IP packets, which have data in an MAC-layer format, onto the packet transmission lines 39b, 39c and also receive the IP packets input from the packet transmission lines 39b, 39c and output the received IP packets to the MAC-layer processing section 44. Therefore, the physical layer processing sections 33a, 33b function as the transmitting sections in cooperation with the MAC-layer processing section 44, E/O conversion sections 38a.

In other words, the physical layer processing sections 33a, 33b and MAC-layer processing section 44 send both data packets (which are data output from the K-packet processing section 44c and contain information data that is to be transferred) and a K-byte of data (packetized when a K-packet is generated) to the SONET/SDH apparatus 1 opposite via the transmission lines 39b, 39c.

In this manner, the interface section has a terminating portion which terminates both a data packet and a redundant data packet containing the same data as information data contained in the data packet.

The IP router 20 is also equipped with the X-flag notification function of notifying the K-packet processing section 44c of flag data indicating the occurrence of fault information. The X-flag notification function is equivalent to the X-flag notification section 9 provided in the SONET/SDH apparatus 1. This X-f lag notification function can also be constructed so that it performs packetization, based on flag data, and fault information contained in a K-byte of data For the link status signal, the physical layer processing sections 33a, 33b both input a notification signal, which notifies an MAC layer of a link status (see FIGS. 40A and 40B), to the MAC-layer processing section 44.

This notification signal is, for example, a link pulse (pulse signal). When high-speed data of 1 Gbps/10 Gbps or greater are transmitted and received, the notification signal is input as link pulses defined according to specification. With this notification signal, the MAC-layer processing section 44, which is to be described below, is capable of detecting a fault at the transmission lines 39b, 39c which are Ethernet, and also switching WK and PT. Therefore, reliability is enhanced between the SONET/SDH apparatus (with 1 Gbps/10 Gbps Ethernet cards) 1 and the IP router 20.

A routing/switching section 35 forwards data packets, based on the IP addresses of IP packets output from the MAC-layer processing section 44 and other 1 Gbps/10 Gbps Ethernet cards (e.g., 1 Gbps/10 Gbps Ethernet card 20a). Therefore, the routing/switching section 35 has a routing table 35a in which ports and IP addresses are held so that they correspond to each other.

The MAC-layer processing section 44 transmits the IP packet output from the K-packet processing section (generating section) 44c, to the SONET/SDH apparatus 1 opposite through the transmission lines 39b, 39c. Thus, the MAC-layer processing section 44 functions as a transmitting section in cooperation with the physical layer processing sections 33a, 33b.

More specifically, the MAC-layer processing section 44 has both the function of generating an Ethernet frame stipulated in IEEE standard 802.3 and the function of disassembling the frame. The MAC-layer processing section 44 decides a K-packet and an IP packet other than that, and processes the K-packet when it is received. Furthermore, the MAC-layer processing section 44 performs the process of generating and sending a K-packet by a user's request and according to a transmission-line connected state.

To realize these functions, the MAC-layer processing section 44 has the functions of (i) to (iv) to be described later. Because of this, the MAC-layer processing section 44 is equipped with a distributing (DIS) section 44a, a detecting section 44d, a selecting (SEL) section 44b, a K-packet processing section 44c, and an MAC chip 44e.

(i) Distributing (DIS) Section 44a

The distributing section 44a has the function of receiving the IP packet transferred from the switching/routing section 35, the K-packet generated and processed by the K-packet processing section 44c, and the IP packet generated by the processor 36 and then sending the same signals to the LAN-PHY 33a and LAN-PHY 33b.

(ii) Selecting (SEL) Section 44b and Detecting Section 44d

The selecting section 44b receives the two same Ethernet signals from the LAN-PHY 33a and LAN-PHY 33b and then discriminates between a K-packet and a normal IP packet other than the K-packet. In the case of a K-packet, the selecting section 44b transfers the K-packet to the K-packet processing section 44c. In the case of a normal IP packet other than a K-packet, a packet for a line selected by the K-packet is transferred to the switching/routing section 35. The selection of a line is performed by the K-packet processing section 44c.

The detecting section 44d is included in the selecting section 44b and has both the function of detecting link information (link status) from the LAN-PHY 33a and LAN-PHY 33b and the function of discriminating between a K-packet and a normal IP packet other than the K-packet.

(iii) K-Packet Processing Section 44c

The K-packet processing section 44c generates a K-byte of data representing transmission-line switching control information about the transmission lines 39b, 39c and packetizes the generated data and outputs a K-packet. Thus, the K-packet processing section 44c functions as a generating section. The K-packet processing section 44c is notified of only a K-packet by the selecting section 44b and then processes the K-packet. The details of the processing are the same as the contents described as the function of the K-packet. According to the processing, the K-packet processing section 44c also has the function of instructing the selecting section 44b to select a transmission line. When there is no fault at the transmission lines, the transmission line 39b (WK) is normally selected.

That is, when it is decided based on the destination of a packetized transmission signal that the packetized signal is a K-packet addressed to a self-transmitter, the K-packet processing section 44c performs a formatting process on the K-packet.

The K-packet processing section 44c also generates both management data for determining the transmission control right for a K-packet containing a K-byte of data, and control data for controlling the start or stop of the process of switching the transmission lines 39b, 39c with respect to the transmitter 1. The K-packet processing section 44c further packetizes the management data by inserting it into a transmission signal. This K-packet generation function is also provided in the IP router 20 and SONET/SDH apparatus 1, as described later with reference to FIG. 6.

(iv) MAC Chip 44e

The MAC chip 44e executes the frame generation function, the frame disassembly function, and the MAC layer function and is realized by a general-purpose IC.

Note that the functions of the MAC-layer processing section 44 can be combined together as desired and can also be realized by an application specified integrated circuit (ASIC) integrating the MAC layer function and the K-packet processing function. For example, the functions can be integrated together by mounting both the MAC layer function and the K-packet processing function on the same ASIC, or by combining general-purpose parts, which have some of the functions, and a portion employing ASIC.

Therefore, when model specification is changed, a reduced quantity of change is needed. The designer can quickly cope with a model change. Note that whether to disperse or integrate functions can be selected in various ways according to a plan.

Thus, the 1 Gbps/10 Gbps Ethernet cards 20b, 20c can interface with the 1 Gbps/10 Gbps Ethernet data between the transmission lines 39b, 39c in a redundancy manner.

Next, a description will be given of the details of the SONET/SDH apparatus (with 1 Gbps/10 Gbps Ethernet interfaces) 1.

(5) SONET/SDH Apparatus (with 1 Gbps/10 Gbps Ethernet Interfaces) 1

Figure 5:
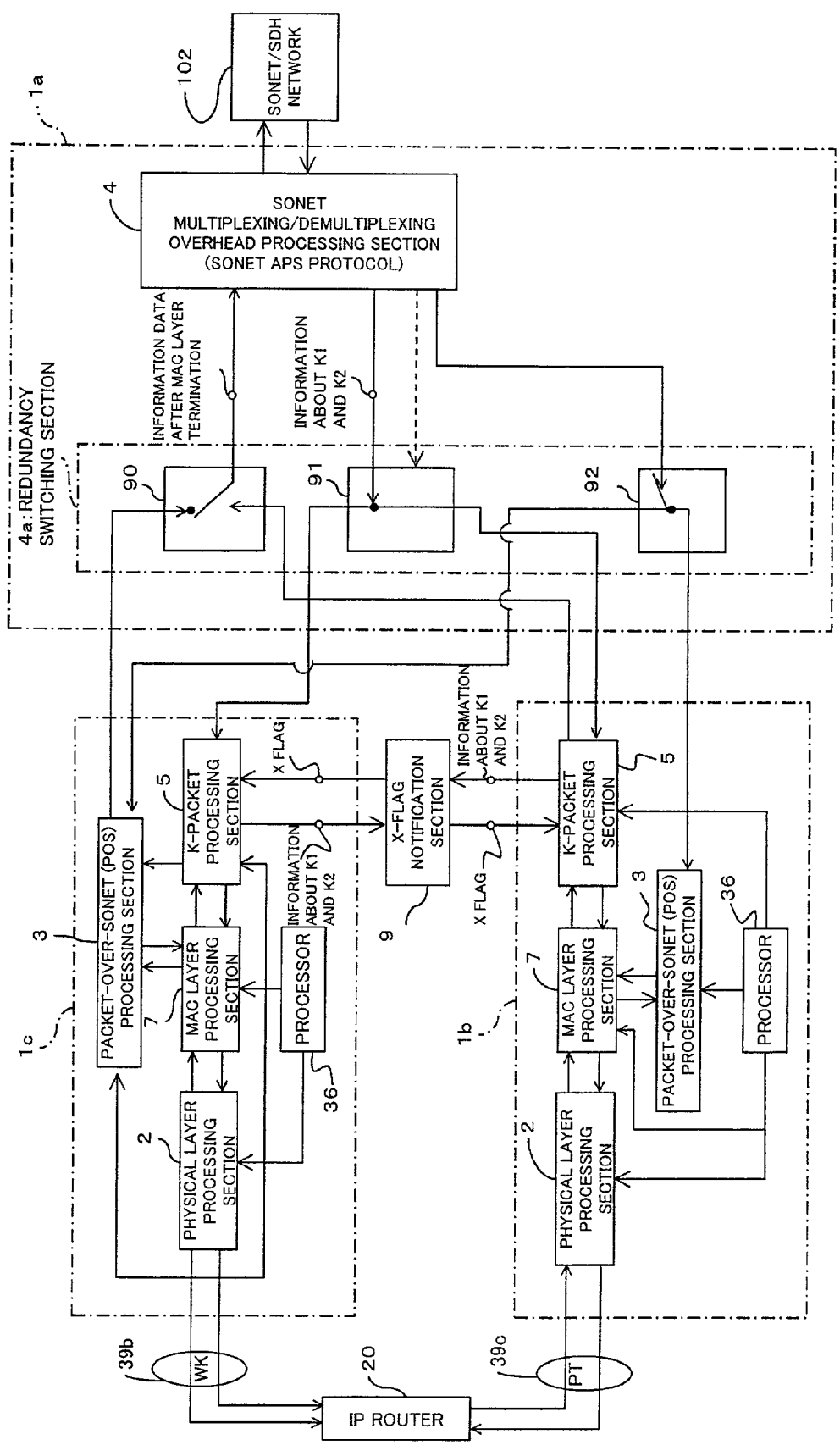
FIG. 5 is a block diagram of the SONET/SDH transmitter according to the first embodiment of the present invention.

FIG. 5 schematically shows the SONET/SDH apparatus (with 1 Gbps/10 Gbps Ethernet interfaces) 1 according to the first embodiment of the present invention. The SONET/SDH apparatus (with 1 Gbps/10 Gbps Ethernet interfaces) 1 shown in the figure is equipped with 1 Gbps/10 Gbps Ethernet cards 1b, 1c and a SONET/SDH card 1a. Reference numeral 1c denotes WK and reference numeral 1b denotes PT. The 1 Gbps/10 Gbps Ethernet cards 1b, 1c are connected with the IP router 20. Note that the SONET/SDH card 1a is connected from the ports 11a, 11b to the SONET/SDH network 102. The details will hereinafter be described.

(5-1) Functions of SONET/SDH Apparatus (with 1 Gbps/10 Gbps Ethernet Interfaces) 1

A description will be given of the functions of the SONET/SDH apparatus (with 1 Gbps/10 Gbps Ethernet cards) 1 shown in FIG. 5. This transmitter has the following four functions.

That is, the SONET/SDH apparatus 1 has (1) the function of causing 1 Gbps/10 Gbps Ethernet transmission lines to have redundancy, (2) the function of controlling the transmission lines having redundancy, (3) the function of mapping an IP packet into the payload of a SONET/SDH frame, or the reversed function, and (4) the functions of the SONET/SDH apparatus.

(5-1-1) Function of Causing 1 Gbps/10 Gbps Ethernet Transmission Lines to have Redundancy The 1 Gbps/10 Gbps Ethernet cards 1b, 1c shown in FIG. 5 have ports 13, 12 (FIG. 3), which are connected with transmission lines 39b (WK), 39c (PT). IP packets with the same information are always transmitted onto the transmission lines 39b (WK), 39c (PT). In addition, K-packets for controlling the switching of the transmission lines 39b, 39c are transmitted onto the transmission lines 39b, 39c. For two signals with the same content received via the transmission lines 39b, 39c, the 1 Gbps/10 Gbps Ethernet cards 1b, 1c have the function of selecting one of the two signals which is better in quality.

A fault in the SONET/SDH network 102 is detected by the SONET/SDH card 1a. That is, the SONET/SDH apparatus 1 is also provided with the function of notifying the IP router 20 of a detected fault via the 1 Gbps/10 Gbps Ethernet cards 1b, 1c by a K-packet. The details will be described later.

(5-1-2) Function of Controlling the Transmission Lines having Redundancy

To realize the function mentioned in (5-1-1), switching of the transmission lines 39b, 39c is controlled by employing both the link statuses of the transmission lines and a K-packet. If there is no fault at the transmission lines, then the transmission line 39b (WK) will always be selected.

(5-1-3) Function of Mapping an IP Packet into the Payload of a SONET/SDH Frame, or the Reversed Function This function is a method of mapping an IP packet in the payload of a SONET/SDH frame. More specifically, an IP packet is encapsulated according to a point to point protocol (PPP) and mapped into the payload of a SONET/SDH frame. The mapping of a SONET/SDH frame into an IP packet is performed in reversed order. Note that specification is stipulated in RFC 1619 and RFC 2615.

(5-1-4) Functions of SONET/SDH Apparatus 1

The SONET/SDH apparatus 1 primarily performs the function of terminating signals stipulated in the SONET/SDH system and the signal multiplexing and demultiplexing function. The SONET/SDH apparatus 1 further has the APS function and the MPS function.

Next, a description will be given of the cards that are mounted in the SONET/SDH apparatus 1.

(5-2) SONET/SDH Card 1a

The SONET/SDH card 1a of the SONET/SDH (with 1 Gbps/10 Gbps Ethernet cards) 1 shown in FIG. 3 consists of a redundancy switching section 4a and a SONET multiplexing-demultiplexing overhead processing section 4, as shown in FIG. 5.

The redundancy switching section 4a is capable of selectively switching the transmission lines 39b and 39c, where transmission signals with information data are transmitted, according to a status in which the packetized K-byte of data from the IP router 20 (which is the transmitter opposite) is received. With this redundancy switching section 4a, the IP router 20 is capable of early detecting a fault, because the IP router 20 is notified of the status of the SONET/SDH network 102.

The redundancy switching section 4a has the function of a second switch 91 which notifies the 1 Gbps/10 Gbps Ethernet cards 1b, 1c of the K1-byte and K2-byte obtained from the SONET/SDH network 102, and the distributing function of a third switch 92 which transmits data obtained from the SONET/SDH network 102 (i.e., the payloads of SONET/SDH frames), to the 1 Gbps/10 Gbps Ethernet cards 1b, 1c at the same time. The redundancy switching section 4a further has the function of a first switch 90 which selects one of the two same data packets transmitted from the 1 Gbps/10 Gbps Ethernet cards 1b, 1c and then sends the selected data packet to the SONET multiplexing-demultiplexing overhead processing section 4.

Note that the selection at the first switch 90 is performed by a mechanism that monitors and controls the SONET/SDH apparatus 1. This is to switch the data at the 1 Gbps/10 Gbps Ethernet cards 1b, 1c by the first switch 90, based on the value of the K-byte of data. The functions of these switches 90 to 92 are realized by electric switches.

The SONET multiplexing-demultiplexing overhead processing section 4 has the function of terminating signals stipulated in the SONET/SDH system, the signal multiplexing and demultiplexing functions, the function of protecting transmission lines according to APS and MPS protocols, and the function of transmitting and receiving optical signals. Therefore, the SONET multiplexing-demultiplexing overhead processing section 4 functions as an interface section and is equipped with a terminating section which terminates both a data packet and a redundant data packet containing the same data as information data contained in the data packet.

The SONET multiplexing-demultiplexing overhead processing section 4 also controls the APS on the side of the SONET/SDH network 102 by the K1-byte and K2-byte of the overhead field of a SONET/SDH frame, based on SONET-APS protocol (with firmware).

(5-3) 1 Gbps/10 Gbps Ethernet Cards 1b, 1c

The 1 Gbps/10 Gbps Ethernet cards 1b, 1c shown in FIG. 3 send IP packets output from K-packet generating sections 5b to be described later, to the IP router 20 (which is the transmitter opposite). The same IP packets are transmitted onto the two packet transmission lines between the cards 1b, 1c and the IP router 20. Because functions other than these have been described above, a description of the functions will not be given to avoid redundancy.

Next, the functions of the SONET/SDH apparatus 1 will be described with reference to FIG. 5. The 1 Gbps/10 Gbps Ethernet cards 1b, 1c shown in the figure are equipped with a physical layer processing section (LAN-PHY) 2, a MAC-layer processing section (MAC chip) 7, a packet-over-SONET (POS) processing section 3, a K-packet processing section (specific packet processing section) 5, and a processor 36. An X-flag notification section 9 may be provided in the cards 1b, 1c, the SONET/SDH card 1a, or a monitoring-controlling mechanism.

The 1 Gbps/10 Gbps Ethernet cards 1b, 1c function as WK and PT and have redundancy. The switching of WK and PT is performed by the redundancy switching section 4a of the SONET/SDH card 1a. Note in FIG. 5 that the same reference numerals denote the same parts as the above-mentioned parts, or similar parts.

(5-3-1) Physical Layer Processing Section 2

The physical layer processing section 2 has the function of sending and receiving an IP packet via the packet transmission lines 39b, 39c. The physical layer processing section 2 also functions as a terminating section which terminates physical layers.

An IP packet that is transmitted onto the transmission line 39a is input from the MAC-layer processing section 7; conversely, an IP packet received via the transmission line is output to the MAC-layer processing section 7.

(5-3-2) MAC-Layer Processing Section 7

The MAC-layer processing section 7 terminates the signal output from the physical layer processing section 2, at a data link layer (IEEE standards 802.3 and 802.2). In addition, this MAC-layer processing section 7 may be provided with the function of discriminating between a K-packet and a normal IP packet. If a received IP packet is a K-packet, then it is processed at the K-packet processing section 5 to be described below. If it is a normal IP packet other than the K-packet, then it is processed at the POS processing section 3. This function can also be provided in the K-packet processing section 5.

In cooperation with the K-packet processing section 5, the MAC-layer processing section 7 functions as means of generating transmission-line switching information, based on fault information in the SONET/SDH network 102; also packetizing the generated information; and transmitting a packet to the side of the IP network 204.

Furthermore, the physical layer processing section 2, MAC-layer processing section 7, processor 36, POS processing section 3, and K-packet processing section 5 as a while function as a transmitting section.

Note that these functions are realized by LSI, ASIC, etc. In addition, the integration of the MAC-layer processing section 7 and the K-packet processing section 5 can constitute LSI and ASIC.

(5-3-3) K-Packet Processing Section 5

This K-packet processing section 5 is provided with (1) the function of analyzing the K-packet output from the MAC-layer processing section 7 and performing a line switching instruction and processing the K-packet, (2) the function of receiving the K1-byte and K2-byte of the SONET/SDH frame output from the redundancy switching section 4a and monitoring a fault in the SONET/SDH network 102, and (3) the function of generating a new K-packet and transmitting it to the MAC-layer processing section 7.

Figure 6:
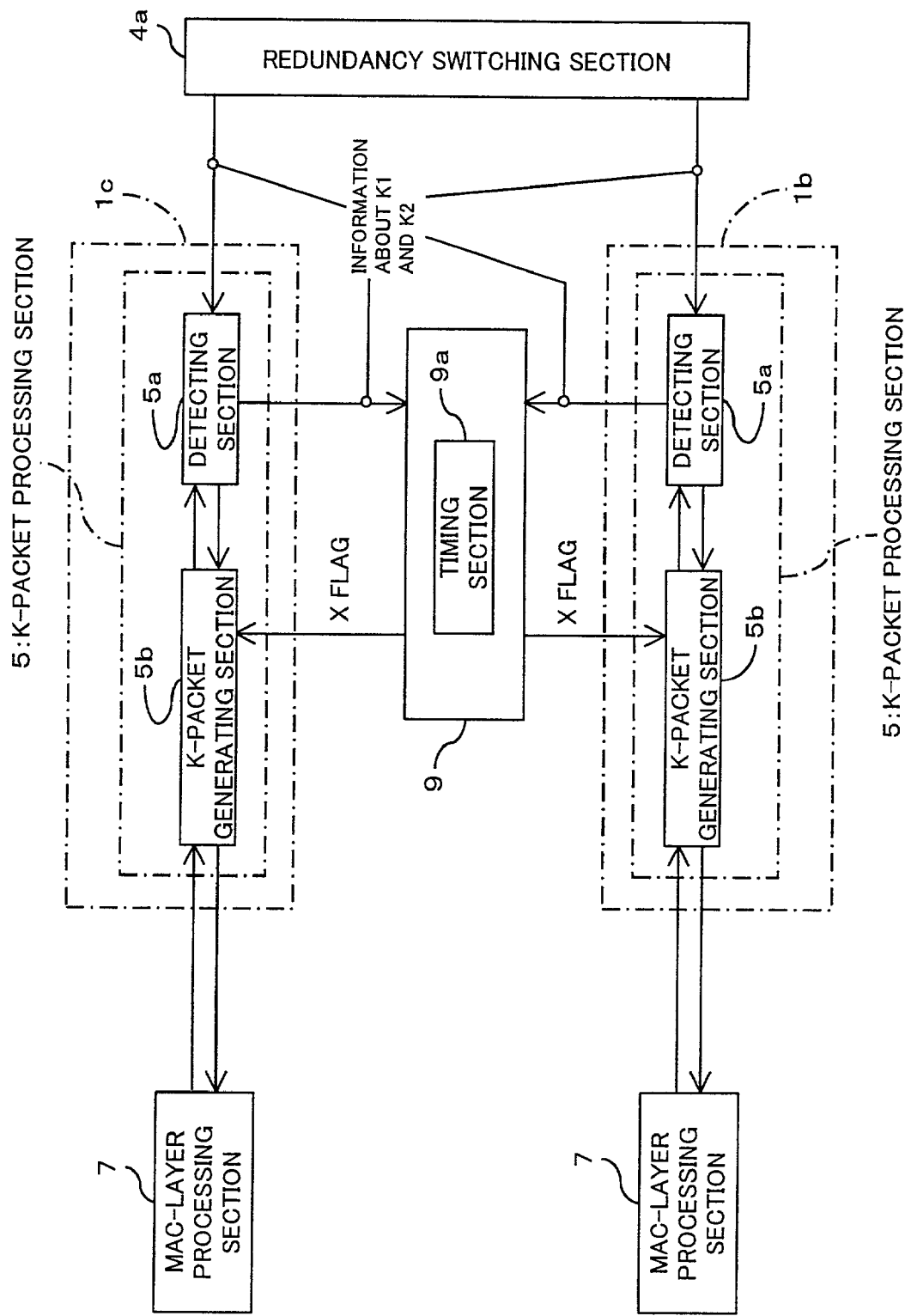
FIG. 6 is a diagram used to explain a specific packet processing section according to the first embodiment of the present invention.

The K-packet processing section 5 shown in FIG. 6 has both a detecting section 5a and a K-packet generating section (generating section) 5b. The detecting section 5a detects and processes a transmission fault, based on the K-byte of the K-packet format input from the K-packet generating section 5b. This detecting section 5a also has the function of sending the K-byte transmitted from the SONET/SDH network 102, to the X-flag notification section 9.

The K-packet processing section 5 also has the function of checking the IP address of an IP packet and decides whether or not the IP packet from the MAC-layer processing section 7 is an IP packet addressed to the processing section 5. In the case in which it is not an IP packet addressed to the processing section 5, the IP packet is input to the POS processing section 3. On the other hand, in the case in which an IP packet has been addressed to the processing section 5, the IP packet is analyzed. If an IP packet is a K-packet, then the K-packet processing section 5 processes the K-packet.

The K-packet generating section 5b generates a K-byte of data representing transmission-line switching control information about a redundancy structure (consisting of transmission lines) and packetizes the generated K-byte of data and outputs a packet. The K-packet generating section 5b generates a K-packet, based on the line fault detection signal from the detecting section 5a and the X flag from the X-flag notification section 9.

When it is decided based on the destination of a packetized transmission signal that the packetized signal is a K-packet addressed to a self-transmitter, the K-packet generating section 5b performs a formatting process on the K-packet and inserts data, which represents the priority of a priority transmitter which can send the K-packet preferentially, into a transmission signal and then packetizes the signal.

The functions of the units such as the detecting section 5a are realized by an application specified integrated circuit (ASIC), a field programmable gate array (FPGA), etc., and the units are integrally formed. An ASIC integrating the units and the MAC-layer processing section 7 can be designed. Note in FIG. 6 that the same reference numerals denote the same parts as the above-mentioned parts, or similar parts.

Thus, the SONET/SDH apparatus (1 Gbps/10 Gbps Ethernet cards) 1 shown in FIG. 5 is constructed so that it is equipped with a pair of 1 Gbps/10 Gbps Ethernet cards 1b, 1c, which are equipped with (1) the K-packet processing section 5 which generates a K-packet containing transmission-line switching control information, based on the K-byte (which represents switching-control information), and (2) the terminating sections (physical layer processing section 2 and MAC-layer processing section 7) which terminate a transmission signal and a corresponding redundant transmission signal. The SONET/SDH apparatus 1 is also constructed so that, based on the K-byte (which represents switching-control information), the redundancy switching section 4a causes one of the Ethernet cards 1b, 1c to be WK and the other to be PT.

In addition, the K1-byte and K2-byte can be processed by employing the existing SONET/SDH card and the APS function, along with SONET/SDH interface cards and 1 Gbps/10 Gbps Ethernet cards.

Furthermore, because a firmware resource to process the SONET/APS protocol can be employed as it is, the circuit scale and costs are minimized. Therefore, an interface employing high-speed line protection can be realized by the 1 Gbps/10 Gbps Ethernet cards.

(5-3-4) Detection of Information about a Fault in SONET/SDH Network 102

Next, the detection of information about a fault in the SONET/SDH network 102, and the switching of the 1 Gbps/10 Gbps Ethernet cards of the SONET/SDH apparatus 1, will be described with reference to FIG. 6.

FIG. 6 shows the K-packet processing section 5 according to the first embodiment of the present invention. The same K bytes (which consist of a K1-byte and a K2-byte) from the redundancy switching section 4a shown in FIG. 6 are input to the K-packet processing section 5 on the side of the 1 Gbps/10 Gbps Ethernet card 1b and the K-packet processing section 5 on the side of the 1 Gbps/10 Gbps Ethernet card 1c, respectively.

The X-flag notification section 9 receives the K1-byte and K2-byte from the K-packet processing sections 5 and then checks from the K1-byte and K2-byte whether or not a transmission-line fault and a transmitter failure have occurred on the side of the SONET/SDH network 102. When it is decided that a fault has occurred, the X-flag notification section 9 sets the X flag to 1 and notifies the K-packet generating section 5b of the occurrence of the fault and notifies the IP router 20, provided opposite, of the fault by using a K-packet.

Thus, the SONET/SDH apparatus 1 is constructed so that the interface section, connected with both the redundancy transmission line structure (consisting of two or more transmission lines 39b, 39c on which data packets are transmitted) and the SONET/SDH apparatus 1, is equipped with the X-flag notification portion 9 which notifies the K-packet generating section 5b of the occurrence of information about a fault in the SONET/SDH network 102, and also constructed so that, based on the flag data and the fault information contained in the K-byte of data, the K-packet generating section 5b generates a K-packet.

(5-3-5) Generation and Transmission of a K-Packet

For the procedure of generating a K-packet, the K-packet generating section 5b generates both management data for determining a transmission control right for a K-packet containing a K-byte of data, and control data for controlling the start or stop of the process of switching the transmission lines 39b, 39c with respect to the transmitter opposite. The K-packet generating section 5b inserts the management data into a transmission signal and packetizes the signal and sends an IP packet. The transmitter opposite switches the WK or PT of the redundancy switching section 1a, based on the K-packet information and X flag, contained in the received IP packet.

More specifically, the management data is a K-packet for determining a right to control a K-packet between the SONET/SDH apparatus 1 and the IP router 20 and is referred to as a K-packet (management). The control data is data for controlling the start or stop of the process (stipulated in GR-253) of individually switching the transmission lines 39b, 39c with respect to the transmitter (IP router or SONET/SDH apparatus 1) opposite via the packet transmission lines 39b, 39c, and consists of a K-packet of data. The control data is referred to as a K-packet (control).

(5-3-6) POS Processing Section 3

The POS processing section 3 inserts an IP packet into the payload of a SONET/SDH frame and also performs the reverse. More specifically, the POS processing section 3 encapsulates the IP packet, input from the MAC-layer processing section 7, according to the point to point protocol (PPP), and inserts the encapsulated IP packet into the payload of the SONET/SDH frame. In the first embodiment, the PPP frame is generated by the POS processing section 3 and output to the redundancy switching section 4a.

The POS processing section 3 also extracts information data from the PPP frame input from the redundancy switching section 4a, removes the previously added byte from the PPP-encapsulated information data, and outputs the IP packet with information to the MAC-layer processing section 7. Note that POS is stipulated in RFC 1619 and RFC 2615.

(6) Operation

The transmission operation of the first embodiment of the present invention constructed as described above will be described with reference to FIGS. 12, and 13.

First, a description will be given in the case in which there is a disconnection of WK between the IP router 20 and the SONET/SDH apparatus (1 Gbps/10 Gbps Ethernet cards) 1.

Figure 12:
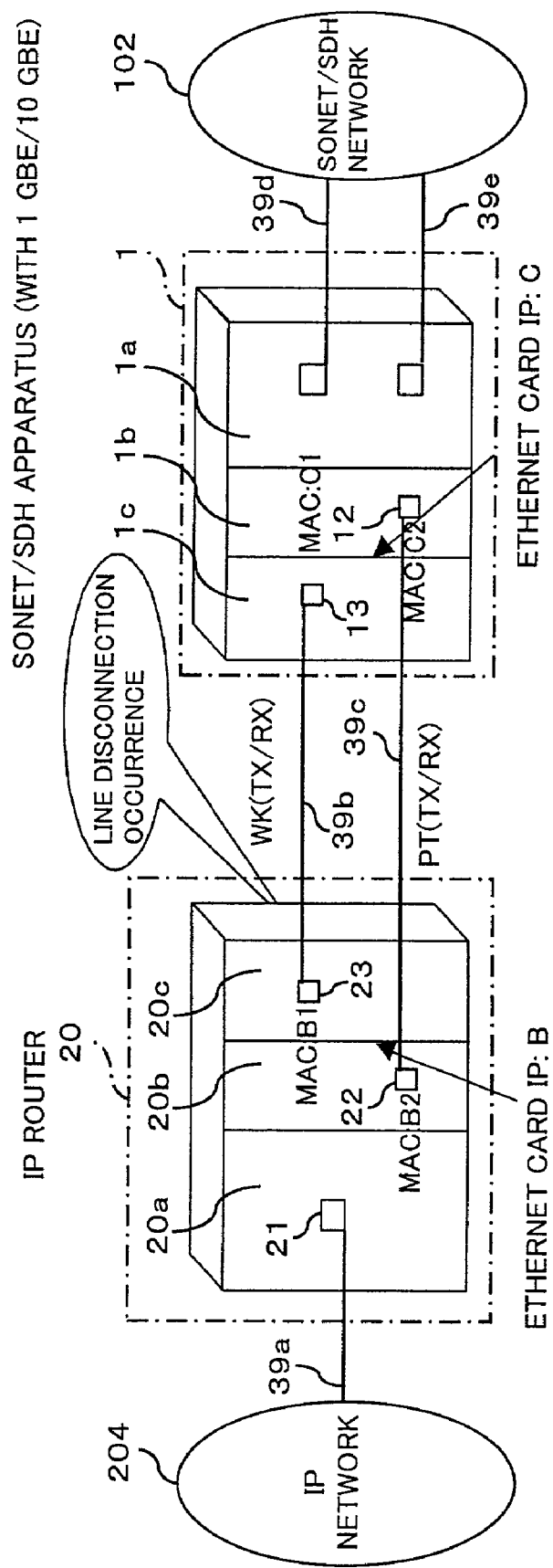
FIG. 12 is a diagram used to explain how a disconnection of a working line is processed according to the first embodiment of the present invention.

FIG. 12 shows how a disconnection of WK is processed according to the first embodiment of the present invention. In this case, there is a disconnection of WK between the IP router 20 and the SONET/SDH apparatus (1 Gbps/10 Gbps Ethernet cards) 1. Note in FIG. 12 that the same reference numerals denote the same parts as the above-mentioned parts, or similar parts.

The ports 22, 23 of the IP router 20 both have the same IP address B. In addition, the port 22 has an MAC address B1 and the port 23 a different MAC address B2. The ports 12, 13 of the SONET/SDH apparatus 1 both have the same IP address C. In addition, the port 12 has an MAC address C1 and the port 13 a different MAC address C2. Note that these addresses and the following addresses are merely an example.

Figure 13:
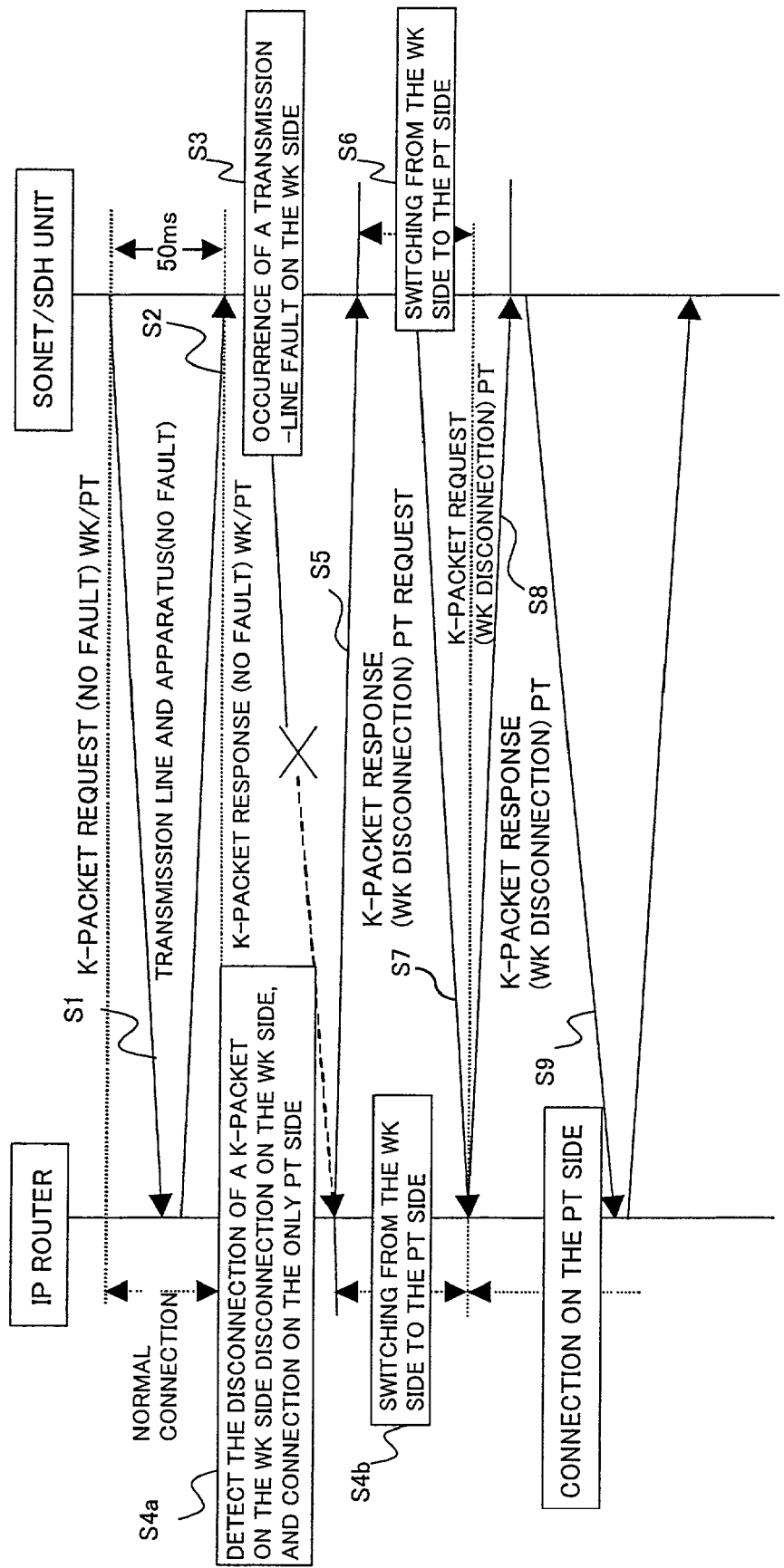
FIG. 13 is a diagram showing an example of a sequential operation between the IP router and the SONET/SDH transmitter according to the first embodiment of the present invention.

FIG. 13 shows an example of a sequential operation between the IP router 20 and the SONET/SDH apparatus (1 Gbps/10 Gbps Ethernet cards) 1 according to the first embodiment of the present invention. In the figure there are shown messages (S1, S2, S5, S7, S8, and S9), an event (S3), and processing steps (S4a, S4b, and S6).

A description will hereinafter be given of the operations when there is no fault and when there is a fault.

(6-1) Between the SONET/SDH apparatus (with 1 Gbps/ 10 Gbps Ethernet cards) 1 and the IP router 20, Ethernet interface data of 1 Gbps/10 Gbps are transmitted and received by full duplex transmission. In FIG. 13, the SONET/SDH apparatus (with 1 Gbps/10 Gbps Ethernet cards) 1 transmits a K-packet request to the IP router 20 via WK and PT (message S1), while the IP router 20 transmits a K-packet response to the SONET/SDH apparatus (with 1 Gbps/10 Gbps Ethernet cards) 1 via WK and PT (message S2). These messages are transmitted and received at a suitable interval between the two transmitters.

Note that in the following description, this content is represented as [WK MAC: C1->B1, IP: C->B] and [PT MAC: C2->B2, IP: C->B] for convenience.

(6-2) If receiving the K-packet, the IP router 20 transmits an IP packet, containing [WK MAC: B1->C1, IP: B->C] and [PT MAC: B2->C2, IP: B->C], to the SONET/SDH apparatus 1 with the S/R flag of the K-packet being 0, because there is no switching of WK and PT.

If a fault occurs at Ethernet 39b, the K-packet and IP data on the WK will be disconnected (see event S3 shown in FIG. 13). On the other hand, the IP router 20 detects the disconnection of WK and the connection of PT (process S4a) and sends a switching request to the SONET/SDH apparatus (with 1 Gbps/10 Gbps Ethernet cards) 1 (message S5) via the transmission line PT.

(6-3) The SONET/SDH apparatus (with 1 Gbps/10 Gbps Ethernet cards) 1 sends a K-packet response, containing a switching request, to the IP router 20 via the transmission line PT, because the transmission line WK has been disconnected (message S7). The K-packet is send according to [WK MAC: C1->B1, IP: C->B] and [PT MAC: C2->B2, IP: C->B], and the S/R flag becomes 0. In this manner, the SONET/SDH apparatus (with 1 Gbps/10 Gbps Ethernet cards) 1 and the IP router 20 detect the disconnection of WK.

(6-4) The IP router 20 detects a K-packet, which contains the switching response, via the transmission line PT (message S7) and switches the WK to the PT, for example, within 50 ms (processing step S4b). The IP router 20 sends a K-packet response to the SONET/SDH apparatus (with 1 Gbps/10 Gbps Ethernet cards) 1 via the transmission line PT (message S8).

This K-packet is sent to the SONET/SDH apparatus (with 1 Gbps/10 Gbps Ethernet cards) 1 according to [WK MAC: B1->C1, IP: B->C] and [PT MAC: B2->C2, IP: B->C]. The IP router 20 causes the S/R flag to be 1, thereby notifying the transmitter 1 that the K-packet is sent from in the IP router.

(6-5) The SONET/SDH apparatus (with 1 Gbps/10 Gbps Ethernet cards) 1 receives the K-packet explained in (5-4) and sends the K-packet response to the IP router 20 (message S9).

Thus, the IP router 20 and the SONET/SDH apparatus (with 1 Gbps/10 Gbps Ethernet cards) 1 have redundancy therebetween and employ K-packets. Therefore, even if a line disconnection occurs, recovery becomes easy and line reliability is enhanced.

Next, with reference to FIG. 14, a description will be given in the case in which there is no fault at the transmission lines between the IP router 20 and the SONET/SDH apparatus (with 1 Gbps/10 Gbps Ethernet cards) 1, and in which there is a line disconnection in the SONET/SDH network 102.

FIG. 14 shows how the occurrence of a fault in the SONET/SDH network 102 is processed by the SONET/SDH apparatus (with 1 Gbps/10 Gbps Ethernet cards) 1 according to the first embodiment of the present invention.

If a fault (line disconnection indicated at A21) occurs in the SONET/SDH network 102, and the SONET/SDH apparatus (with 1 Gbps/10 Gbps Ethernet cards) 1 detects this fault, then the X flag indicating the line disconnection of the SONET/SDH network 102 is set to 1, as indicated at A22. The SONET/SDH apparatus (with 1 Gbps/10 Gbps Ethernet cards) 1 also sends a K-packet with the X flag to the IP router 20 via the transmission lines WK and PT, as indicated at A23.

Thus, the IP router 20 is notified of the K-packet and early detects the fault that occurred in the SONET/SDH network 102, and deletes data addressed to the side of the SONET/SDH network 102, from the routing table of the IP router 20. In this manner, the IP router 20 can transfer the IP packet, addressed to the SONET/SDH network 102, directly to a different network than the network 102. As a result, packet loss in updating the routing table can be reduced.

Next, the process in the IP router 20 will be described with reference to FIGS. 15, 16A, and 16B.

FIG. 15 shows how a fault occurs in the SONET/SDH network 102 is processed at the side of the IP router 20 according to the first embodiment of the present invention. Reference numerals 21a to 21d denote ports, which are connected with the IP network 204 and the routers A to D of other IP networks (not shown) via Ethernet 39a. Note in FIG. 15 that the same reference numerals denote the same parts as the above-mentioned parts, or similar parts.

Figures 16A, 16B:
FIGS. 16A and 16B are diagrams showing examples of the written contents of the routing table of the IP router according to the first embodiment of the present invention.

FIGS. 16A and 16B show examples of the routing tables of the IP router according to the first embodiment of the present invention. In the routing tables shown in the figures, destination IP addresses are listed on the left column, and port names from which IP packets are output are listed on the right column. These routing tables list the IP addresses that the IP router 20 has held before a fault occurs.

In the SONET/SDH network 102, the SONET/SDH apparatus (with 1 Gbps/10 Gbps Ethernet cards) 1 shown in FIG. 15 transmits and receives a SONET/SDH overhead byte at intervals of 125 µs. If a fault occurs at the side of the SONET/SDH network 102, then the SONET/SDH apparatus (with 1 Gbps/10 Gbps Ethernet cards) 1 detects the occurrence of the fault by the information contained in K1-byte and K2-byte, causes the X flag to be 1, and transmits the K-packet to the IP router 20. If it receives the K-packet (A24 in FIG. 15), the IP router 20 deletes the IP address of the SONET/SDH network 102 from the routing table (A25 in FIG. 15). The contents of the routing table are shown in FIG. 16B.

Thus, if a fault occurs in the SONET/SDH network 102, then IP addresses corresponding to the SONET/SDH network 102 are deleted from the routing table of the IP router 20. In this way, IP packets addressed to the SONET/SDH network 102 are transferred to a different IP network, so that packet loss is minimized.

(6-6) Method of Setting a Transmission Control Right

Next, the transmission control right will be described with reference to FIGS. 17 and 18.

At the IP router 20 or the SONET/SDH apparatus (with 1 Gbps/10 Gbps Ethernet cards with line protection feature) 1, the line switching control is performed using a K-packet. Note that in the second embodiment to be described later, the transmission control right is controlled and set by the same method, unless otherwise noted.

Figure 17:
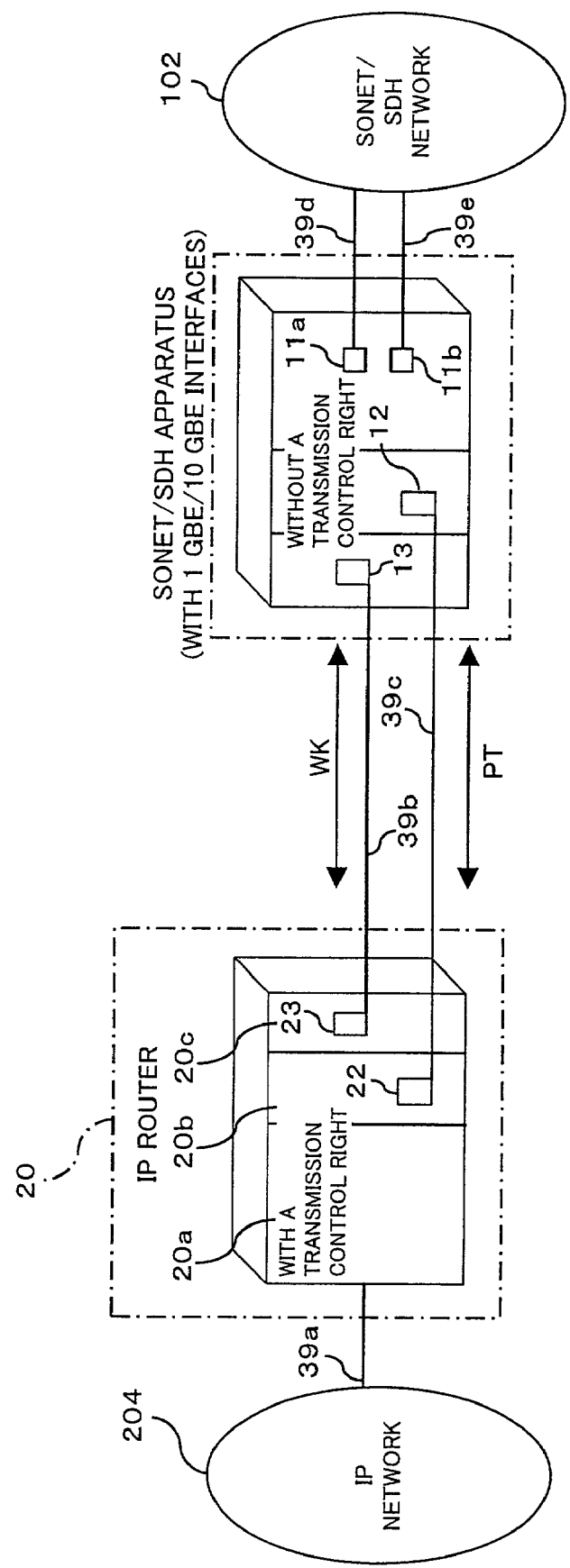
FIG. 17 is a diagram used to explain a method of setting a transmission control right, according to the first embodiment of the present invention.

FIG. 17 shows a method of setting a transmission control right, according to the first embodiment of the present invention. The IP router 20 shown in the figure has a transmission control right, while the SONET/SDH apparatus (with 1 Gbps/10 Gbps Ethernet cards) 1 has no transmission control right.

The IP router 20 and the SONET/SDH apparatus (with 1 Gbps/10 Gbps Ethernet cards) 1 can decide whether or not the SONET/SDH apparatus 1 itself has a transmission control right. In FIG. 17, the same reference numerals denote the same parts as the above-mentioned parts, so a further description is omitted to avoid redundancy.

The transmission control right is decided by the management units (not shown) of the SONET/SDH apparatus (with 1 Gbps/10 Gbps Ethernet cards) 1 and IP router 20. A set value for the transmission control right (see FIG. 11) is reflected on the management flag field of the K-packet format. An apparatus that has this transmission control right has a right to transmit a K-packet (control).

Thus, the K-packet can be transmitted from the SONET/SDH apparatus (with 1 Gbps/10 Gbps Ethernet cards) 1 and the IP router 20.

(6-7) Sequential Operation for K-Packet Transmission and Reception

Figure 18:
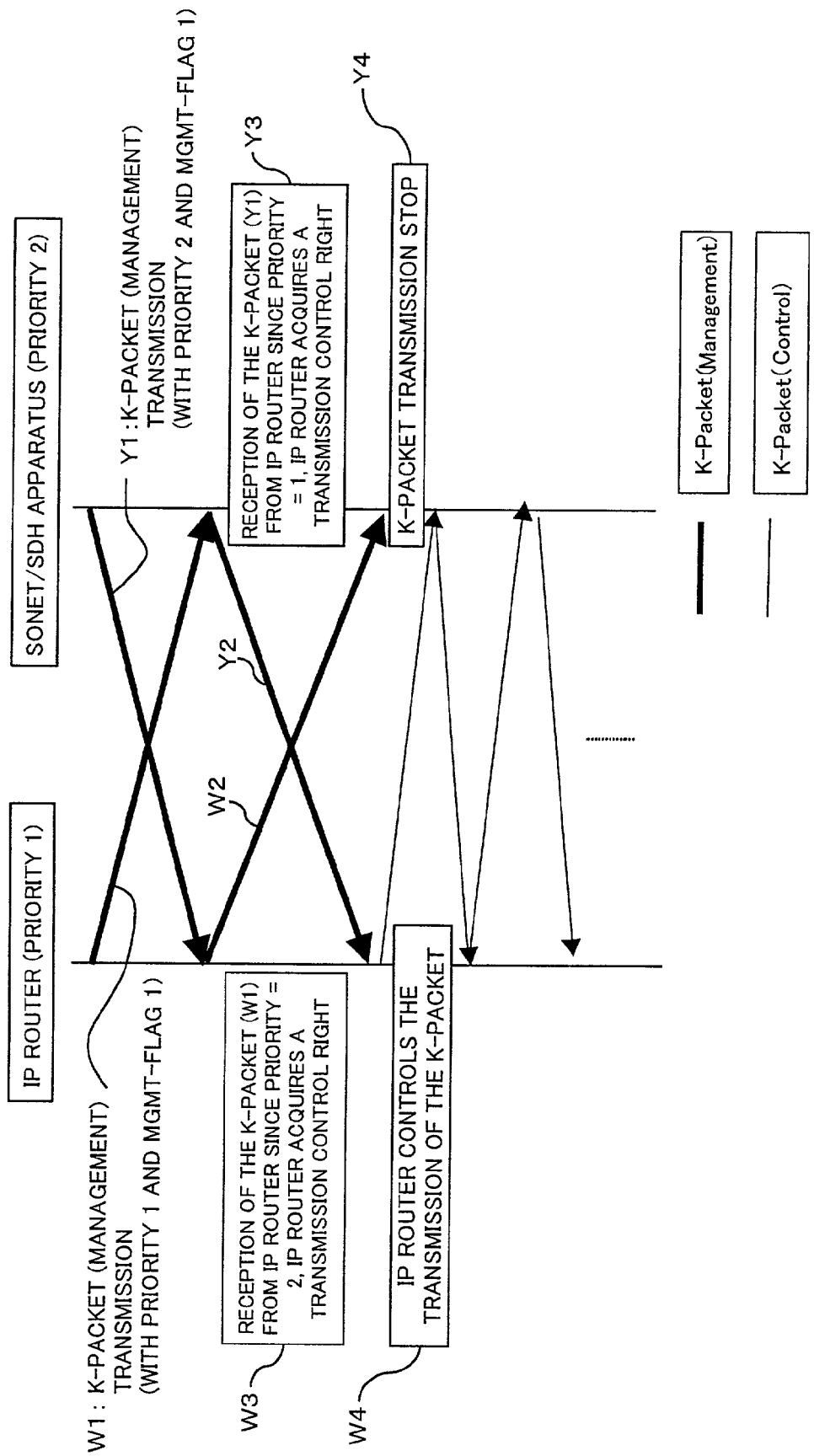
FIG. 18 is a diagram showing a sequential operation for explaining the determination of a K-packet transmission right according to the first embodiment of the present invention.

FIG. 18 shows how a right to transmit a K-packet is determined according the first embodiment of the present invention. In the figure, both transmitters have the management flag (Mgmt-flag) field of the K-packet format set to 1 (that is, both transmitters have a K-packet transmission right), and there is shown a protocol between the IP router 20 whose priority is set to 1 and the SONET/SDH apparatus (with 1 Gbps/10 Gbps Ethernet cards) 1 whose priority is set to 2. In addition, there are shown messages W1 and W2, which are transmitted from the IP router 20 to the SONET/SDH apparatus (with 1 Gbps/10 Gbps Ethernet cards) 1; messages Y1 and Y2, which are transmitted from the SONET/SDH apparatus (with 1 Gbps/10 Gbps Ethernet cards) 1 to the IP router 20; and processing steps (W3, W4, Y3, and Y4).

First, an equipment power is turned on. If both transmitters are in on-line states, or if transmission lines WK and PT are linked between both transmitters, the IP router 20 and the SONET/SDH apparatus (with 1 Gbps/10 Gbps Ethernet cards) 1 transmit K-packets (management) to each other until the transmission control right is determined. The initial value of the transmission control right and the priority of the IP router 20 are 1 and 1, respectively. The initial value of the transmission control right and the priority of the SONET/SDH apparatus (with 1 Gbps/10 Gbps Ethernet cards) 1 are 1 and 2, respectively.

The IP router 20 transmits a K-packet (management flag) to the SONET/SDH apparatus (with 1 Gbps/10 Gbps Ethernet cards) 1. The priority is 1 and the management flag is 1 (message W1). On the other hand, the SONET/SDH apparatus (with 1 Gbps/10 Gbps Ethernet cards) 1 also transmits a K-packet to the IP router 20. The priority is 2 and the management flag is 1 (message Y1).

The priority of the K-packet (management flag) of the IP router 20 with respect to the SONET/SDH apparatus (with 1 Gbps/10 Gbps Ethernet cards) 1 is 1 and the management flag is 1. These values are transmitted. On the other hand, the K-packet of the SONET/SDH apparatus (with 1 Gbps/10 Gbps Ethernet cards) 1 with respect to the IP router 20 is transmitted with the priority being 2 and the management flag being 1.

If the SONET/SDH apparatus (with 1 Gbps/10 Gbps Ethernet cards) 1 receives the K-packet contained in the message W1, the priority (1) of the received K-packet is compared with the priority (1) of the SONET/SDH apparatus (with 1 Gbps/10 Gbps Ethernet cards) 1. Because the priority of the IP router 20 is higher than that of the SONET/SDH apparatus (with 1 Gbps/10 Gbps Ethernet cards) 1, the SONET/SDH apparatus (with 1 Gbps/10 Gbps Ethernet cards) 1 knows that the IP router 20 obtains the transmission control right (step Y3). Because of this, the SONET/SDH apparatus (with 1 Gbps/10 Gbps Ethernet cards) 1 stops spontaneous transmission of the K-packet (step Y4).

On the other hand, if the IP router 20 receives the K-packet (message Y1) from the SONET/SDH apparatus (with 1 Gbps/10 Gbps Ethernet cards) 1, the priority (2) of the received K-packet is compared with the priority (1) of the IP router 20. The IP router 20 transmits a K-packet to the SONET/SDH apparatus (with 1 Gbps/10 Gbps Ethernet cards) 1 (message W2). Since the priority (1) of the IP router 20 is higher than that (2) of the SONET/SDH apparatus (with 1 Gbps/10 Gbps Ethernet cards) 1, the IP router 20 obtains the transmission control right (step W3). Therefore, the IP router 20 continues to transmit a K-packet (control), such as message W2, to the SONET/SDH apparatus (with 1 Gbps/10 Gbps Ethernet cards) 1 and also controls transmission (step W4).

Thus, the IP router 20 and the SONET/SDH apparatus (with 1 Gbps/10 Gbps Ethernet cards) 1 both have the function of transmitting and receiving K-packets and controlling them. In addition, by providing the priority function, the conflict of K-packets from both transmitters is avoided.

(6-8) Processing Procedure for K-Packets

Next, with reference to FIGS. 19 to 21, a detailed description will be given of the procedure in which the IP router 20 or SONET/SDH apparatus (with 1 Gbps/10 Gbps Ethernet cards) 1 processes K-packets.

Figure 19:
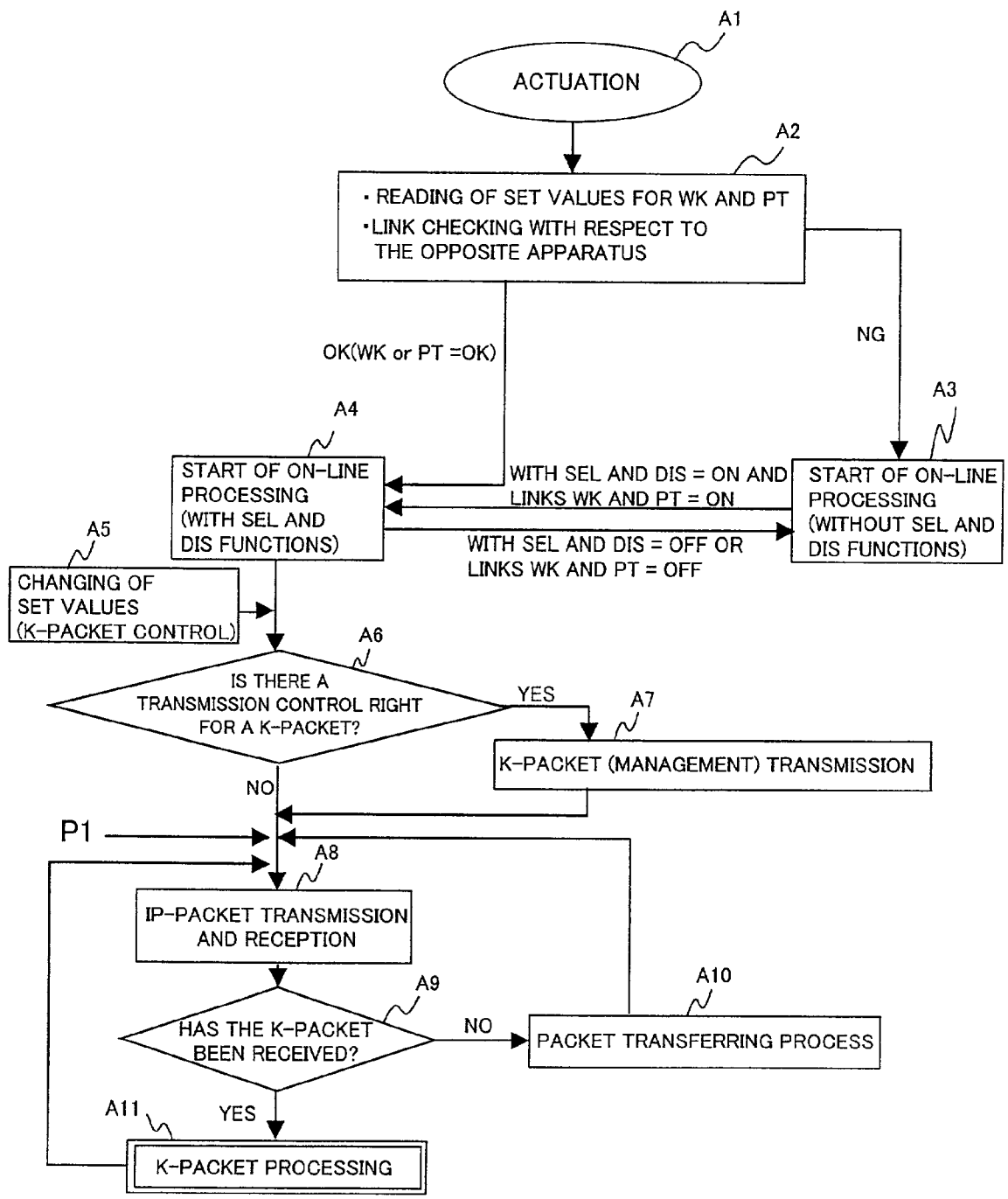
FIG. 19 is a flowchart used to explain K-packet processing according to the first embodiment of the present invention.

FIG. 19 shows how a K-packet is processed according to the first embodiment of the present invention. The overall flow will be described with reference to the figure.

First, if the SONET/SDH apparatus (with 1 Gbps/10 Gbps Ethernet cards) 1 and the IP router 20 are actuated (step A1), the SONET/SDH apparatus (with 1 Gbps/10 Gbps Ethernet cards) 1 and the IP router 20 decide the type of WK or PT by reading a preset value and also check a link status with respect to the opposite apparatus (step A2). In the case where neither a link WK nor a link PT has been set, the process advances to step A3 via a route labeled NG (No Good). In step A3, on-line processing is started. Note that the on-line processing does not employ the selector/distributor function.

In step A2, in the case where either the link WK or the link PT has been set, the process advances to step A4 via a route labeled OK. In step A4, on-line processing is started using the selector/distributor function. If the selector/distributor function and the link are both made on, step A4 is carried out. On the other hand, in step A4, if the selector/distributor function is made off and the links WK and PT made off, step A3 is carried out.

If setting is changed after step A4 to control a K-packet (step A5), in step A6 the value of the flag for the K-packet transmission control right is checked. When the flag for the transmission control right is 1, the process advances to step A7 via a route labeled YES. In step A7 a K-packet (management) is transmitted. On the other hand, in step A6, when the flag is 0, the process advances to step A8 via a route labeled NO. Note that reference character P1 means that step A8 is executed after the process shown in FIG. 20 ends.

In step A8, an IP packet with information data is transmitted and received, and it is monitored whether or not a K-packet has been received (step A9). When no K-packet is received, the process advances to step A10 via a route labeled NO. In step A10 a packet transferring process is continued, and steps A8 to A10 are carried out. On the other hand, in step A9, if a K-packet is received, the process advances to step A11 via a route labeled YES. In step A11 the received K-packet is processed.

Thus, the processing of the K-packet is performed along with the transmission and reception of a normal packet.

The K-packet processing in step A11 will be described in detail with reference to FIG. 20.

Figure 20:
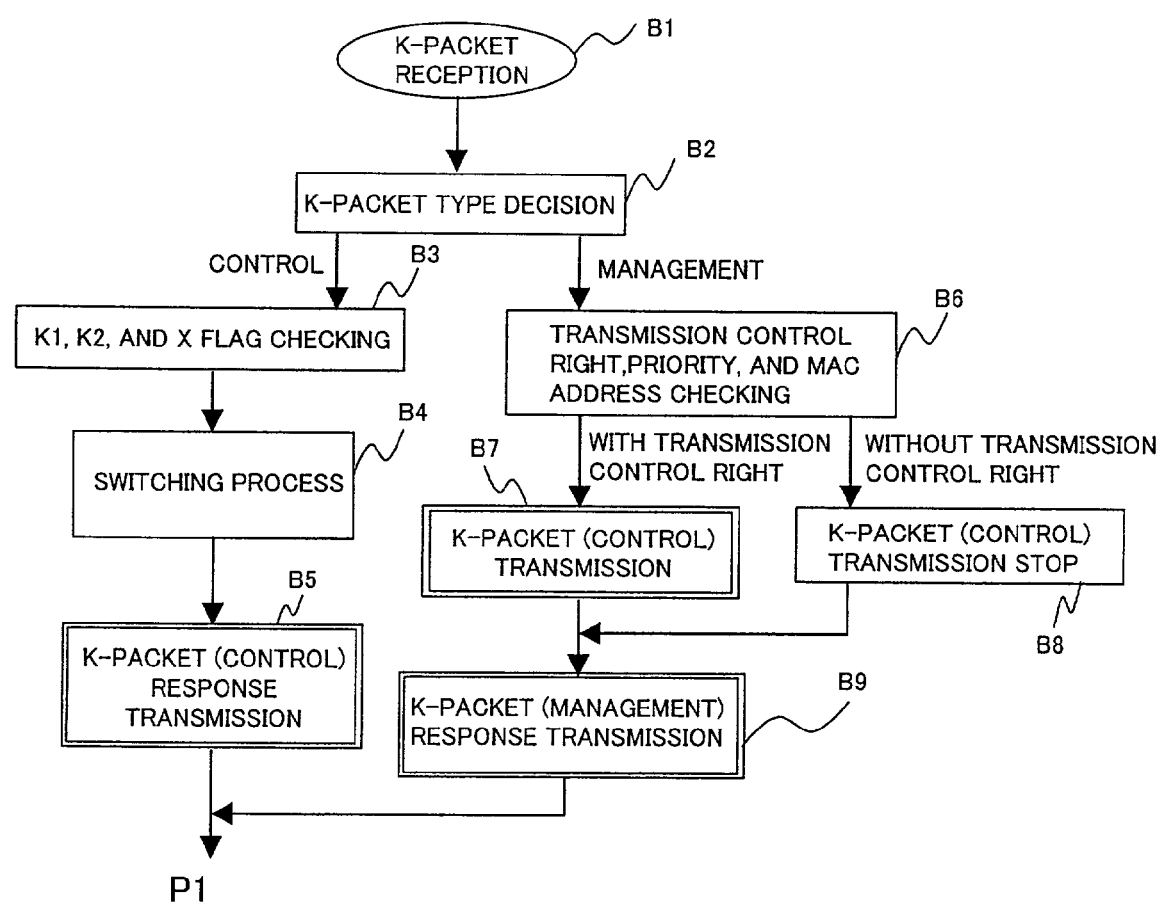
FIG. 20 is a flowchart used to explain K-packet processing according to the first embodiment of the present invention.

FIG. 20 shows the K-packet processing according to the first embodiment of the present invention. In step B1 shown in the figure, if a K-packet is received, the type of K-packet is decided (step B2). If the K-packet is for control, the process advances to step B3 via a route labeled CONTROL. In step B3, the K1-byte and K2-byte and the X flag are checked. In step B4, the switching of WK and PT is performed based on standard GR-253. In step B5, a response to the K-packet (control) is transmitted. Thereafter, step A8 shown in FIG. 19 is carried out (see P1 in the figure).

In step B2, when the received K-packet is for management, the process advances to step B6 via a route labeled MANEGEMENT. In step B6, the transmission control right, the priority, and the MAC address are checked. When it has a transmission control right, the process advances to step B7 via a route labeled TRANSMISSION CONTROL RIGHT. In step B7 the K-packet (control) is transmitted. In step B9 a response to the K-packet (management) is transmitted. In step B6, when it has no transmission control right, the advances to step B8 via a route labeled NO TRANSMISSION CONTROL RIGHT. Instep B8 the transmission of the K-packet (control) is stopped and step B9 is carried out.

If step B9 is completed, the process in FIG. 20 again returns to the main routine (step A8 or P1 shown in FIG. 19).

Next, the K-packet transmitting process in steps B5, B7, and B9 in FIG. 20 will be described with reference to FIG. 21.

Figure 21:
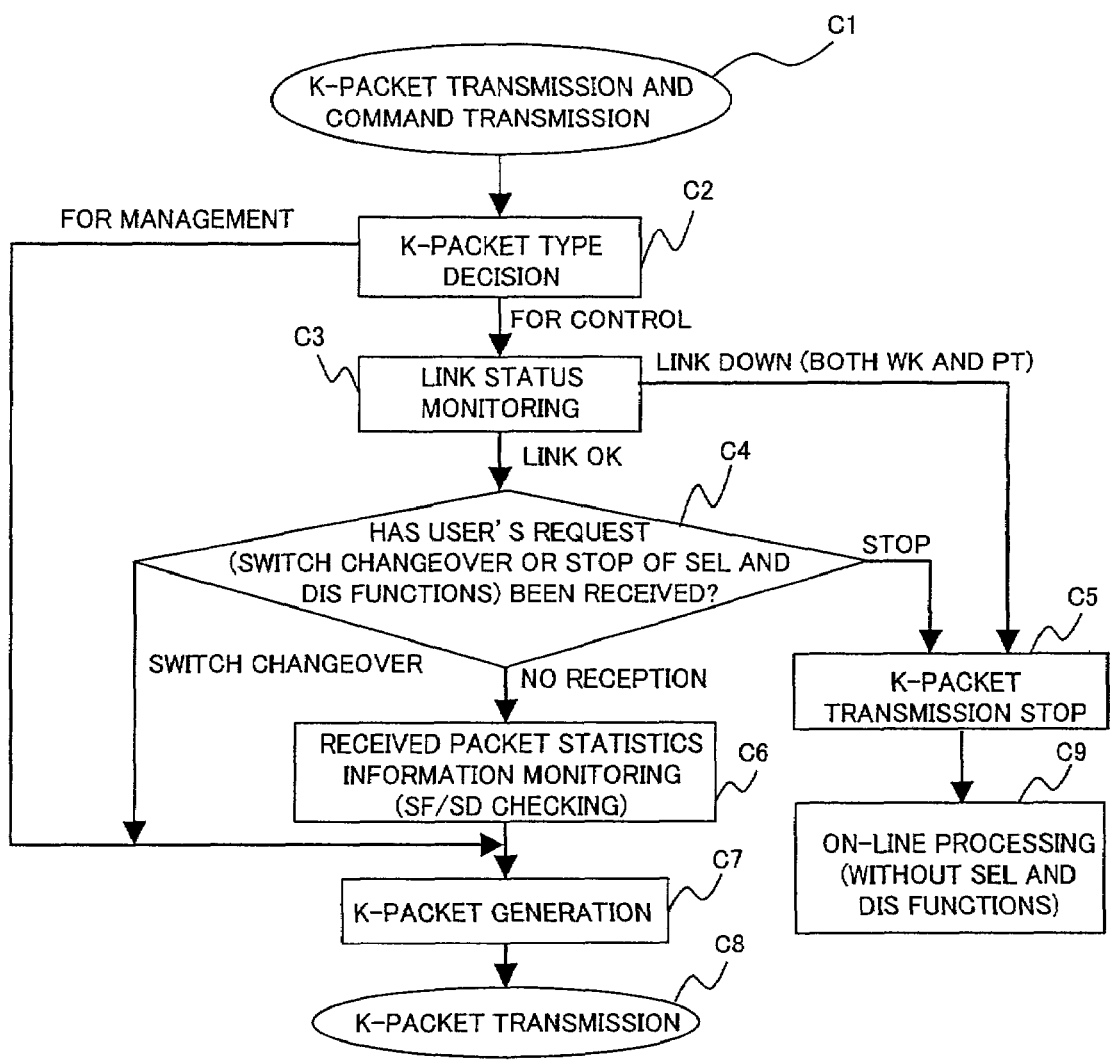
FIG. 21 is a flowchart used to explain a K-packet transmitting process according to the first embodiment of the present invention.

FIG. 21 shows the K-packet transmitting process according to the first embodiment of the present invention. First, if the IP router 20 or SONET/SDH apparatus (with 1 Gbps/10 Gbps Ethernet cards) 1 receives a command to transmit a K-packet (step C1), the type of K-packet is decided (step C2). When it is for management, the process advances to step C7 via a route labeled MANAGEMENT. In step C7 a K-packet is generated, and in step C8 the K-packet is transmitted.

In step C2, when the K-packet is for management, the process advances to step C3 via a route labeled CONTROL. In step C3 the IP router 20 or SONET/SDH apparatus (with 1 Gbps/10 Gbps Ethernet cards) 1 monitors a link status. If a fault occurs at both the link WK and the link PT, the process advances to step C5 via a route labeled LINK DOWN (WK and PT). In step C5 the transmission of the K-packet is stopped, and in step C9 on-line processing (without the selector/distributor function) is carried out. Instep C3, if the link status is normal, the process advances to step C4 via a route labeled LINK OK. In step C4, the IP router 20 or SONET/SDH transmitter (with 1 Gbps/10 Gbps Ethernet cards) 1 checks whether or not it has received a user request. This user's request refers to a request to change over a switch, or a request to stop the selector/distributor function.

When the IP router 20 or SONET/SDH transmitter (with 1 Gbps/10 Gbps Ethernet cards) 1 changes over a switch, the process advances to step C7 via a route labeled SWITCH CHANGEOVER. In step C7 a K-packet is generated, and in step C8, the K-packet is transmitted. In step C4, when the IP router 20 or SONET/SDH transmitter (with 1 Gbps/10 Gbps Ethernet cards) 1 receives a request to stop the selecting/distributing function, the process advances to step C5 via a route labeled STOP. Instep C5, transmission of the K-packet is stopped. Instep C9, on-line processing is performed without the selecting/distributing function. In step C4, when the SONET/SDH transmitter (with 1 Gbps/10 Gbps Ethernet cards) 1 does not receive the aforementioned two user's requests, the process advances to step C6 via a route labeled NO RECEPTION. In step C6, information about the statistics of received packets (information about degradation) is monitored. More specifically, the IP router 20 or SONET/SDH transmitter (with 1 Gbps/10 Gbps Ethernet cards) 1 checks statistical variables (transmission quality) SF and SD (step C6), then generates a K-packet (step C7), and transmits the K-packet (step C8).

Thus, a K-packet is generated and the line switching of WK and PT becomes easy. With this line switching, the IP router 20 and the SONET/SDH transmitter (with 1 Gbps/10 Gbps Ethernet cards) 1 can have a redundancy structure (WK and PT). In addition, when maintaining and managing the IP router 20 and the SONET/SDH transmitter (with 1 Gbps/10 Gbps Ethernet cards) 1, a reduction in services due to a line disconnection can be avoided, because WK and PT can be easily switched.

Next, an example of the difference between the present invention and a conventional system will be described with reference to FIG. 22. Note that the following description relates to Ethernet of 1 Gbps.

Figure 22:
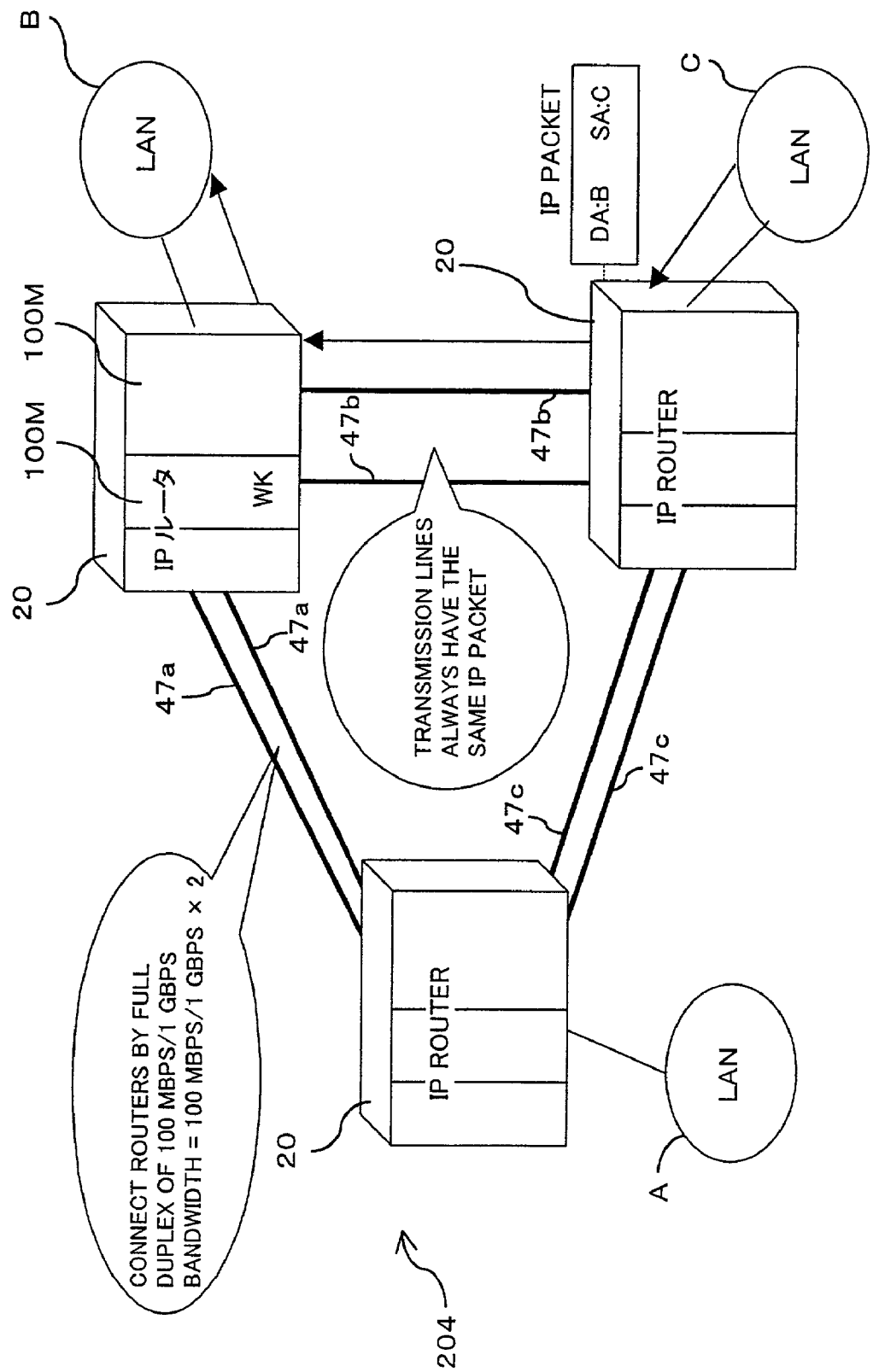
FIG. 22 is a diagram used to explain the difference between the IP network, to which the present invention is applied, and a conventional IP network.

FIG. 22 shows the difference between an IP network 204, to which the present invention is applied, and a conventional IP network. The IP network 204 shown in the figure is equipped with IP routers A, B, and C, transmission lines (packet transmission lines) 47a, 47b, and 47c, and LANs A, B, and C.

The IP routers A to C have routing tables in which destination IP addresses and port (physical port) names are held so that they correspond to each other. Based on the held data, each IP router determines a route. The LANs A, B, and C are, for example, private networks for enterprises, respectively. Although not shown, each LAN has network terminations (NTs).

The packet transmission lines 47a, 47b, 47c are connected between the IP routers A, B, and C and are used to transmit IP packets. Each packet transmission line pair consists of WK and PT. As full duplex transmission is employed, the bandwidth between the IP routers is 200 Mbps, or 2 Gbps (100 Mbps×2, or 1 Gbps×2). An IP packet passes through a route determined by the routing table (not shown) of the IP router 20 and reaches its final destination. Note that the remaining functions are the same as those of the conventional router.

Therefore, even if each of the packet transmission lines 47a, 47b, 47c were constructed of a bundle of two or more optical fibers, the transmission bandwidth would not increase.

Thus, IP packets with the same content are always transmitted onto the transmission line pair. The IP routers A, B, and C each receive two IP packets transmitted on WK and PT and select one of the two IP packets which is higher in reliability, and transfer the selected IP packet to the destination.

Thus, transmission reliability is considerably enhanced, compared with the conventional transmission system (e.g., FIGS. 41 to 44). As a result, the quality of services to users is enhanced.

In this way, the SONET/SDH transmitter (with 1 Gbps/10 Gbps Ethernet cards) 1, provided with packet interfaces, and the IP router 20 can be connected via 1 Gbps or 10 Gbps Ethernet interfaces having (1+1) line protection and (1:N) line protection and network redundancy can be possible.

In addition, the transmitters are capable of early coping with the occurrence of a transmission line fault, a transmitter failure, etc., also making quick healing possible, and ensuring a desired transmission bandwidth. Therefore, transmission services with high reliability can be offered to users.

Furthermore, a network, which cannot perform high-speed switching originally, like the IP network 204, is capable of performing high-speed switching and high-speed fault recovery.

The first embodiment can be modified like (A1) and (A2).

(A1) In FIG. 3, the interface between the SONET/SDH transmitter (with 1 Gbps/10 Gbps Ethernet cards) 1 and the IP router 20 may be an electrical interface or optical interface.

(A2) The SONET/SDH transmitter (with 1 Gbps/10 Gbps Ethernet cards) 1 may be a wavelength division multiplexing (WDM) transmitter.

Thus, the transmission lines with redundancy are realized with 1 Gbps/10 Gbps Ethernet service, and the transmitters can restore a transmission-line fault, a transmitter failure, etc.

In addition, the transmitters are capable of healing transmission quickly when a fault occurs, and also ensuring a desired transmission bandwidth. Therefore, transmission services with high reliability can be offered to users. In this manner, the IP network 204, which cannot perform high-speed switching originally, is capable of performing both high-speed switching and high-speed fault recovery.

(B) Second Embodiment

A transmission system in the second embodiment can be realized by attaching a transmitter (automatic protection switching (APS) adapter), which has the function of switching WK and PT, to the outside of an IP router already provided in a network.

(7) System Constitution

In the transmission system according to the second embodiment, transmitters constituting the transmission system have the APS function of switching WK and PT by employing a K-packet.

(7-1) Transmission System 100a

Figure 23:
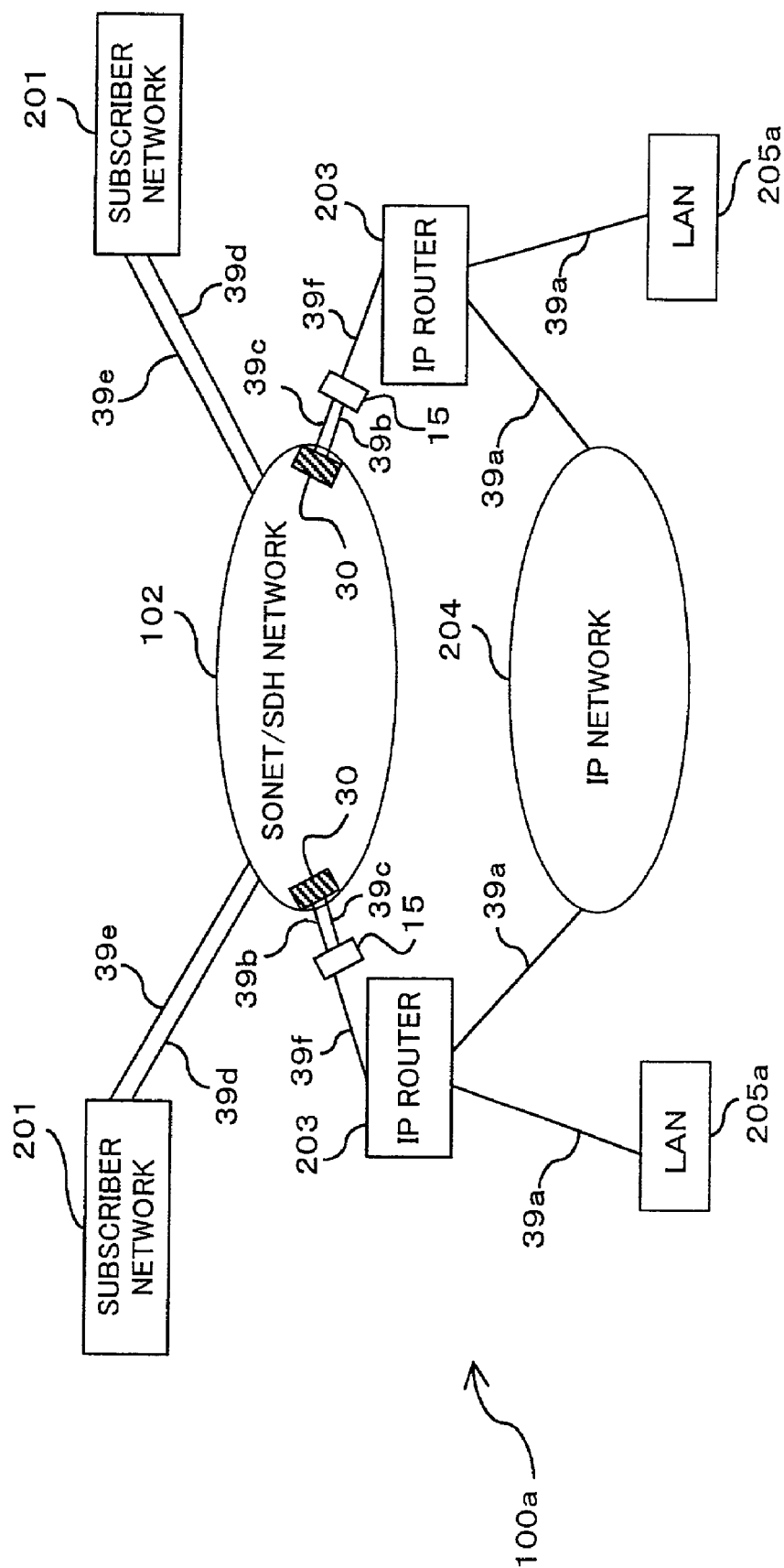
FIG. 23 is a schematic diagram of a transmission system according to a second embodiment of the present invention.

FIG. 23 schematically shows the transmission system 100a according to the second embodiment of the present invention. The transmission system 100a shown in the figure is constructed so that between an IP network 204 and a SONET/SDH network 102, IP routers 203, APS adapters 15, and a SONET/SDH transmitter (with 1 Gbps/10 Gbps Ethernet) 30 are connected via Ethernet. Other than these, parts with the same reference numerals as the aforementioned parts have the same or similar functions, so a further description thereof will not be given to avoid redundancy.

(7-2) Connection between IP router 203, APS Adapter 15, and SONET/SDH Transmitter (with 1 Gbps/10 Gbps Ethernet interfaces) 30

Figure 24:
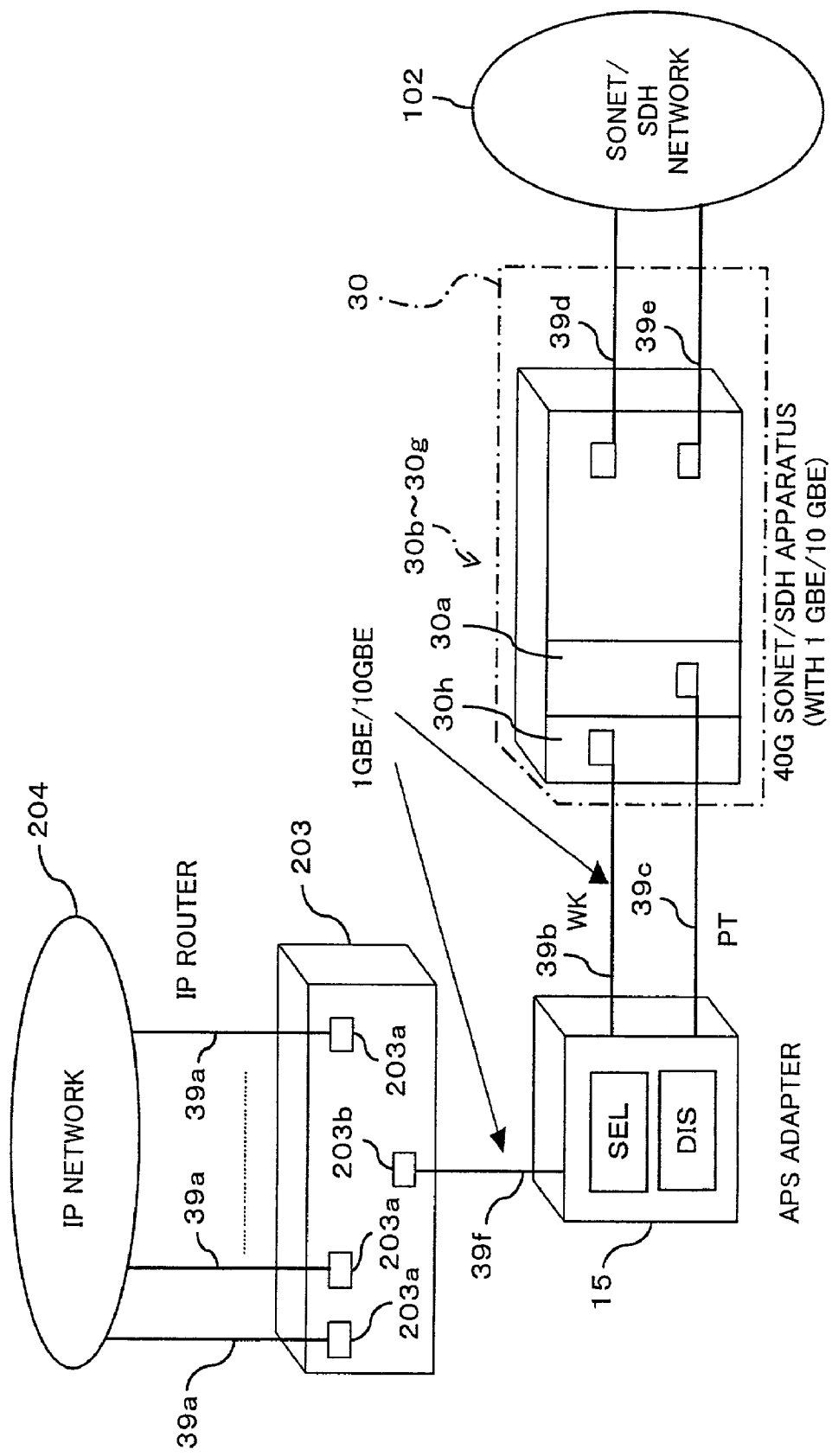
FIG. 24 is a schematic diagram of the transmission system that has a redundancy structure according to the second embodiment of the present invention.

FIG. 24 schematically shows the transmission system 100a having a redundancy structure according to the second embodiment of the present invention. The transmission system 100a is equipped with an already-introduced IP router 203, a packet transmission line 39f, an APS adapter 15, packet transmission lines 39b, 39c, and a SONET/SDH transmitter (with 1 Gbps/10 Gbps Ethernet cards) 30.

The IP router 203 and the APS adapter 15 are connected via a single transmission line and are connected with the router 203 that has already been installed. The APS adapter 15 and the SONET/SDH transmitter (with 1 Gbps/10 Gbps Ethernet) 30 are connected via the transmission line 39b (WK) and transmission line 39c (PT). Thus, line protection is realized.

Note in FIG. 24 that the same reference numerals denote the same parts as the aforementioned parts, or similar parts. In the following description, the construction is the same, unless otherwise noted.

(8) IP Router 203

The IP router 203 is connected with the IP network 204 and routes IP packets. This IP router 203 also has two or more IP interface cards (line cards) and two or more ports 203a, 203b. The IP router 203 is a transmitter that transmits IP packets that meet 1 Gbps/10 Gbps Ethernet standards. The ports 203a, 203b are Ethernet ports for connection. Furthermore, the packet transmission line 39f is Ethernet capable of transmitting IP packets of 1 Gbps and 10 Gbps or greater. A single line shown FIG. 24 represents a pair of differential twisted pair cables or a pair of optical fibers, shown in FIGS. 8A and 8B.

(9) APS Adapter 15

The APS adapter 15 has the distributing function of simultaneously transferring normal packets transmitted from the IP router 203, onto the transmission lines 39b, 39c, and the function of selecting a packet. The packet selecting function is the function of discriminating between a K-packet and a normal IP packet, input via the packet transmission lines 39b, 39c; also selecting a transmission line WK or PT, based on the K-byte; and transferring a normal packet. Functional units realizing these functions are formed integrally.

As an example of the configuration of the APS adapter 15, the APS adapter 15 is placed on the case of the IP router 203, and both are connected via an Ethernet cable of about 30 cm. That is, the APS adapter 15 is attached to the outside of the existing IP router 203. In this manner, the system can be constructed without exchanging or modifying the existing IP router 203. When a fault occurs between the IP router 15 and the SONET/SDH transmitter (with 1 Gbps/10 Gbps Ethernet cards) 30, the transmission line is switched from WK to PT to heal data by the K-packet function described in the first embodiment.

(9-1) APS Adapter 15

Figure 25:
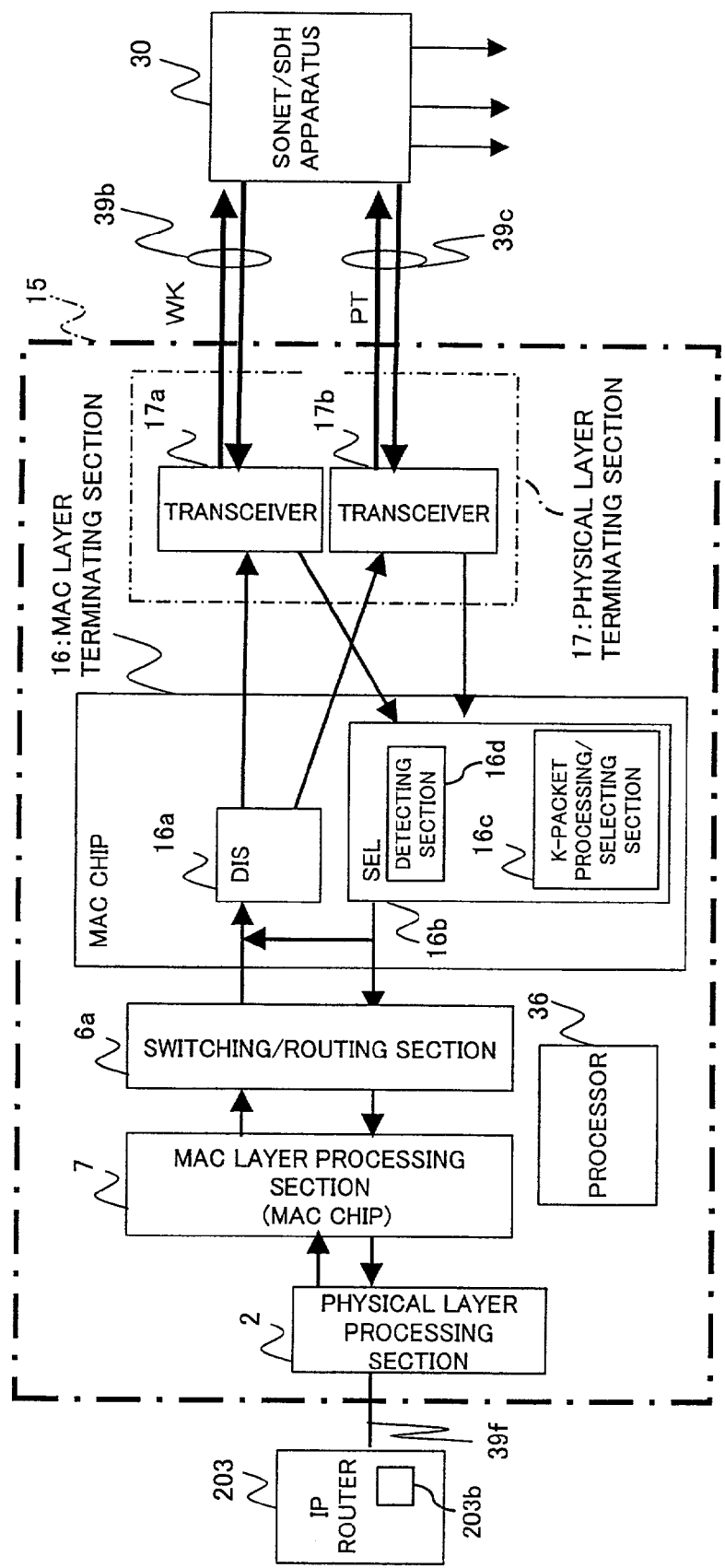
FIG. 25 is a block diagram of an APS adapter according to the second embodiment of the present invention.

FIG. 25 shows the APS adapter 15 according to the second embodiment of the present invention. The APS adapter 15 shown in the figure is equipped with a physical layer processing section (LAN-PHY) 2, an MAC-layer processing section (MAC chip) 7, a physical layer terminating section 17, an MAC-layer terminating section 16, and a switching/routing section 6a. The layer processing section (LAN-PHY) 2 and the MAC-layer processing section (MAC chip) 7 are provided on the side of the IP router 203, while the physical layer terminating section 17 and the MAC-layer terminating section 16 are provided on the side of the SONET/SDH transmitter (with 1 Gbps/10 Gbps Ethernet cards) 30.

The layer processing section (LAN-PHY) 2 and the physical layer terminating section 17 both have the function of terminating physical layers. A 1 Gbps/10 Gbps Ethernet card switches the transmission lines 39b, 39c, based on a link status signal indicating the connection or disconnection of a line at predetermined time intervals.

The MAC-layer processing section 7 has the function of terminating IP packets, output from the layer processing section 2 and the switching/routing section 6a, at a data link layer (IEEE standards 802.3 and 802.2). The switching/routing section 6a has the function of transferring an IP packet according to the IP address.

The MAC-layer terminating section 16 has the function of the MAC-layer section 7, the function of discriminating between a K-packet and a normal IP packet from UDP data, the function of selecting an IP packet and a transmission line (WK or PT), and the distributing function of simultaneously transmitting the same IP packets onto transmission lines.

Therefore, the 1 Gbps/10 Gbps Ethernet card has a terminating section that terminates a data packet and a redundant data packet containing the same data as information data contained in the data packet.

In the process of identifying a K-packet, if a received IP packet is a K-packet, it is processed by a K-packet processing/selecting section 16c. If it is an IP packet other than a K-packet, then it is processed by the switching/routing section 6a.

These units will hereinafter be described in detail.

(9-1-1) MAC-Layer Terminating Section 16

The MAC-layer terminating section 16 acquires information, such as an IP address, etc., from an IP packet. When the IP packet is not an IP packet addressed to the terminating section 16 (when there is no possibility of a K-packet), the IP packet is transferred to the switching/routing section 6a.

The MAC-layer terminating section 16 is equipped with a distributing section (DIS) 16a, a selecting section (SEL) 16b, a K-packet processing/selecting section 16c, and a detecting section 16d. The distributing section 16a outputs an IP packet input from the switching/routing section 6a, to the transceivers 17a, 17b (which are to be described later) of the physical layer terminating section 17.

The selecting section 16b has both the function of processing a K-packet and the function of selecting an IP packet. The selecting section 16b selects one of the two IP packets, transmitted via WK and PT and input from the physical layer terminating section 17, and outputs the selected IP packet to the switching/routing section 6a. That is, the selecting section 16b has the detecting section 16d and the K-packet processing/selecting 16c. This detecting section 16d is used to detect a transmission fault, based on a link status signal from the physical layer terminating section 17.

The K-packet processing section 16c decides whether an IP packet is a K-packet or a normal packet. If it is a K-packet, then the section 16c checks whether it is for management or for control. If it is for control, then the section 16c checks the K1-byte, the K2-byte, and the X flag and then switches WK and PT. On the other hand, if the K-packet is for management, the section 16c checks the transmission control right, the priority, and the MAC address and then decides the transmission control right for the K-packet. A response to the K-packet is calculated by the processor 36 and is output to the distributing section (DIS) 16a.

The IP packet selecting function in the K-packet processing/selecting section 16c is to select one of the two IP packets, transmitted via WK and PT and input from the transceivers 17a and 17b, and input the selected IP packet to the switching/routing section 6a. The switching signal is input from the processor 36.

In this manner, when a request to switch WK or PT occurs, the switching can be quickly performed. Thus, there is no data loss and high-quality data can be transmitted and received.

(9-1-2) Physical Layer Terminating Section 17

The physical layer terminating section 17 has transceivers 17a, 17b, which have the function of outputting IP packets, having a MAC-layer format, to the packet transmission lines 39b, 39c and also receiving IP packets input from the packet transmission lines 39b, 39c. The transceivers 17a, 17b output IP packets from the distributing section 16a, to the packet transmission lines 39b, 39c and also receive IP packets from the packet transmission lines 39b, 39c and input the received IP packets to the MAC-layer terminating section 16.

Thus, the APS adapter 15 has both the 1 Gbps/10 Gbps Ethernet interface function of interfacing with the SONET/SDH transmitter 30, and the function of switching WK and PT. With these functions, a line redundancy function can be realized. Therefore, since the APS adapter 15 is connected with the SONET/SDH transmitter (with 1 Gbps/10 Gbps Ethernet) 30 through the packet transmission lines 39a and 39c, a (1+1) switching structure employing 1 Gbps/10 Gbps Ethernet can be realized.

In addition, by connecting the existing IP router and the APS adapter 15 together, a redundancy structure can be formed between the APS adapter 15 and the SONET/SDH transmitter (with 1 Gbps/10 Gbps Ethernet) 30. As a result, reliability is enhanced in the network between the IP router 203 and the SONET/SDH transmitter (with 1 Gbps/10 Gbps Ethernet) 30.

(10) SONET/SDH Transmitter (with 1 Gbps/10 Gbps Ethernet) 30

Figure 26:
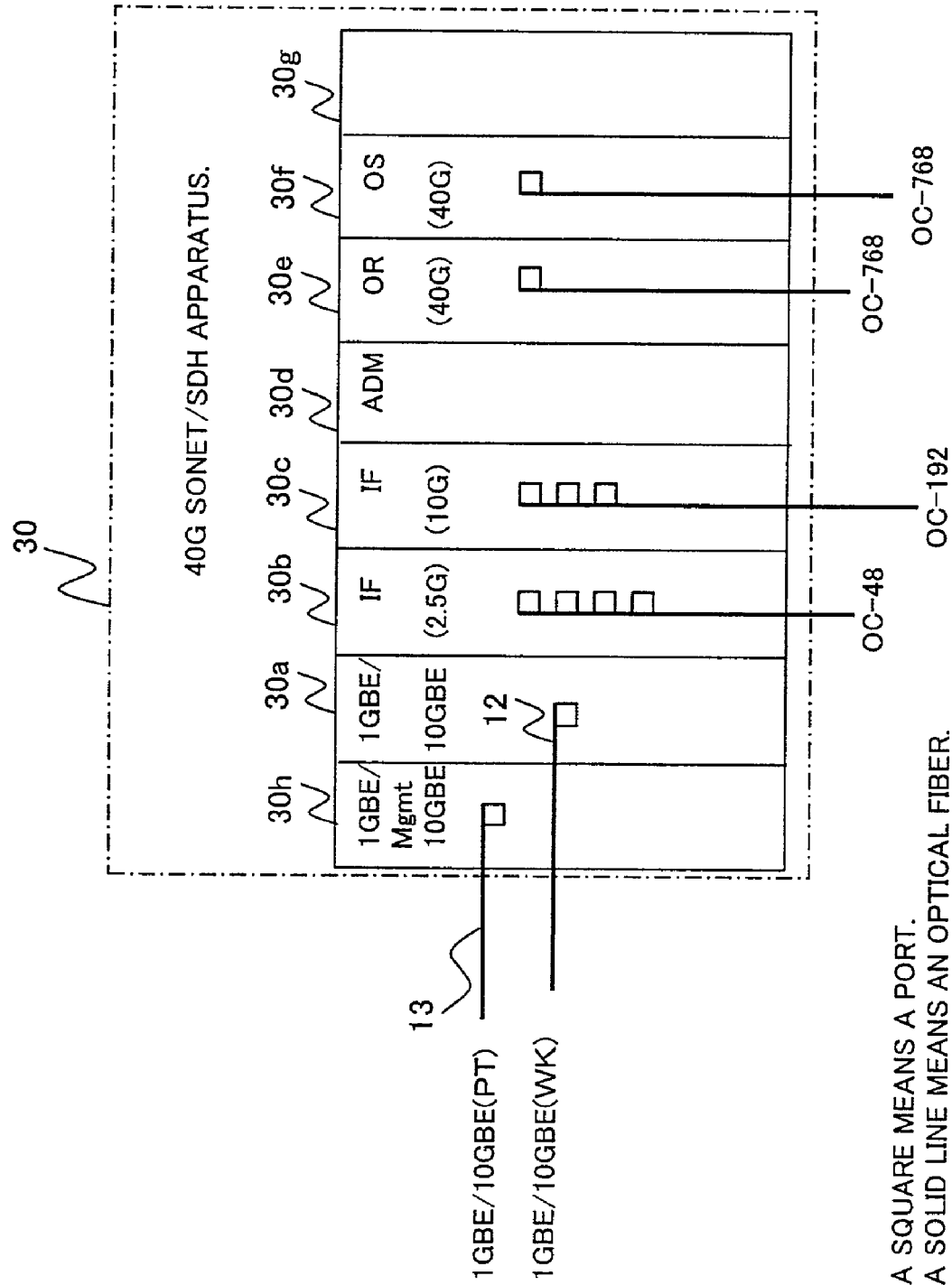
FIG. 26 is a schematic diagram of a SONET/SDH transmitter according to the second embodiment of the present invention.

FIG. 26 schematically shows the SONET/SDH transmitter (with 1 Gbps/10 Gbps Ethernet cards) 30 according to the second embodiment of the present invention. The SONET/SDH transmitter (with 1 Gbps/10 Gbps Ethernet) 30 shown in the figure, in addition to the above-mentioned high-speed line protection function, has the add-drop function of performing multiplexing and demultiplexing by the SONET/SDH system. The SONET/SDH transmitter (with 1 Gbps/10 Gbps Ethernet) 30 supports, for example, a 40 Gbps optical carrier (OC-768), a 2.5 Gbps optical carrier (OC-48), a 10 Gbps optical carrier (OC-192), etc. It also supports the functions of 1 Gbps/10 Gbps Ethernet. Note that a small square shown in FIG. 26 means a port and a slid line an optical fiber. The function of the 1 Gbps/10 Gbps Ethernet card is the same as that of the first embodiment.

This SONET/SDH transmitter (with 1 Gbps/10 Gbps Ethernet cards) 30 is equipped with a management unit (Mgmt) 30g, a pair of 1 Gbps/10 Gbps Ethernet cards 30a, 30h, a SONET OC-48 IF unit 30b (where IF is a relayed optical signal transmitting-receiving section), a SONET OC-192 IF unit 30c, a SONET add-drop multiplex module 30d, a SONET OC-768 reception module 30e, and a SONET OC-768 reception module 30f.

(10-1) Management Unit 30g

The management unit 30g is the same as the function of managing and controlling all the modules of the SONET/SDH transmitter (with 1 Gbps/10 Gbps Ethernet) 30.

(10-2) 1 Gbps/10 Gbps Ethernet Cards 30a, 30h

The 1 Gbps/10 Gbps Ethernet cards 30a, 30h both have the functions described in the first embodiment.

For instance, the 1 Gbps/10 Gbps Ethernet card 30a is PT and the 1 Gbps/10 Gbps Ethernet card 30h is WK. These PT and WK can be switched by the management unit 30g.

Figure 27:
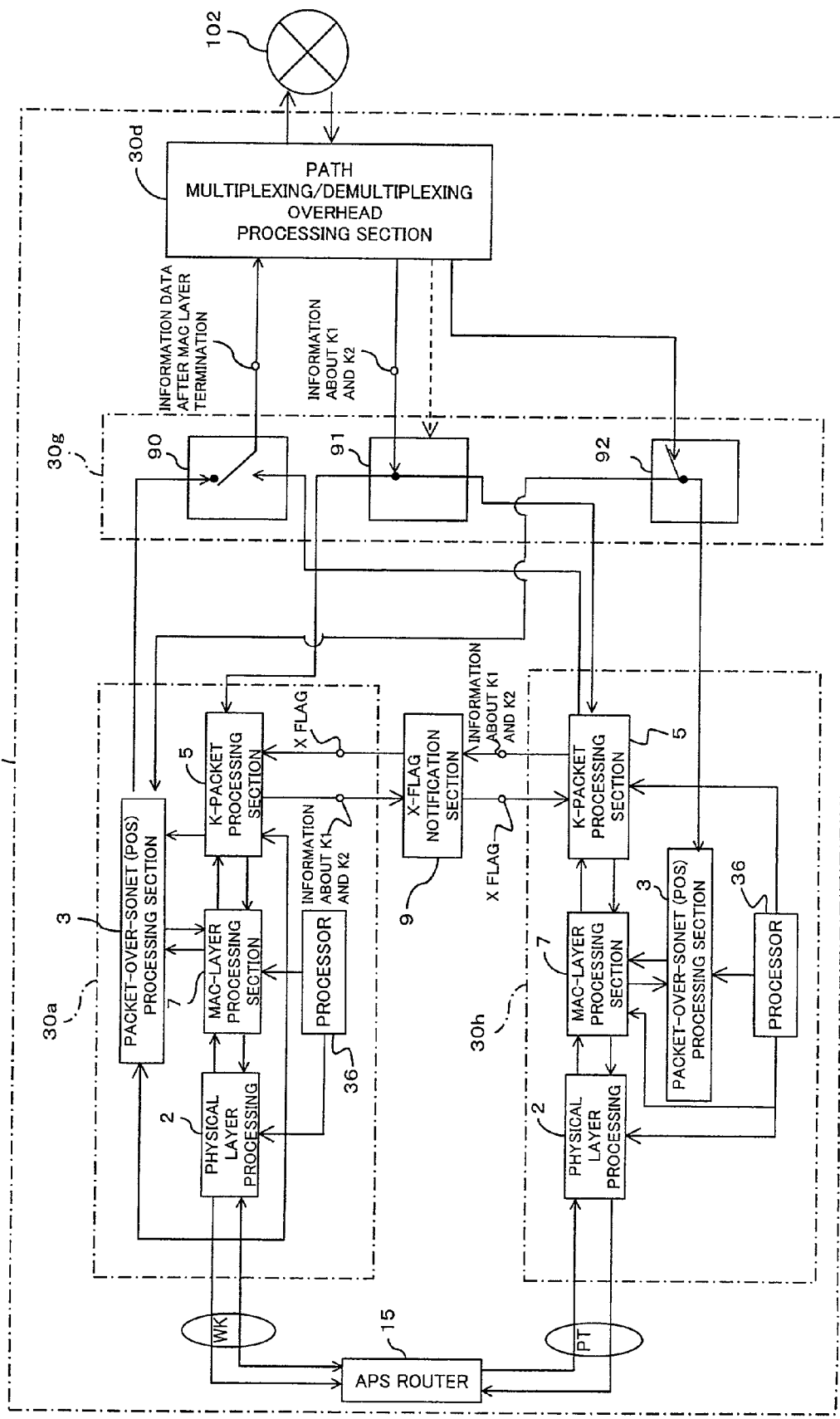
FIG. 27 is a block diagram of the line cards of the SONET/SDH transmitter according to the second embodiment of the present invention.

FIG. 27 schematically shows the 1 Gbps/10 Gbps Ethernet cards 30a, 30b of the SONET/SDH transmitter (with 1 Gbps/10 Gbps Ethernet cards) 30 according to the second embodiment of the present invention. The SONET/SDH transmitter (with 1 Gbps/10 Gbps Ethernet cards) 30 shown in the figure is equipped with a pair of 1 Gbps/10 Gbps Ethernet cards 30a, 30h, an X-flag notification section 9, a management unit 30g, and a path multiplexing/demultiplexing section 30d. The management unit 30g causes one of the two 1 Gbps/10 Gbps Ethernet cards 30a, 30b to be WK and the other to be PT, based on the aforementioned K-byte. In FIG. 27, the same reference numerals denote the same parts as the aforementioned parts. The operation is the same as the first embodiment.

In the IP router 203 and the SONET/SDH transmitter (with 1 Gbps/10 Gbps Ethernet cards) 30 shown in FIG. 23, IP packets (WK and PT) output from the SONET/SDH transmitter (with 1 Gbps/10 Gbps Ethernet cards) 30 are input to the APS adapter 15. The APS adapter 15 selects one of the two IP packets and transfers the selected IP packet to the IP router 203. The IP router 203 performs a routing process on the IP packet and transmits it to the IP network 204.

The IP packet from the IP network 204 is input from the port 203b of the IP router 203 to the APS adapter 15. The APS adapter 15 splits the IP packet into two packets and transmits the two IP packets onto the packet transmission lines 39b, 39c. At the SONET/SDH transmitter (with 1 Gbps/10 Gbps Ethernet cards) 30, the IP packets are subjected to the POS processing and output to the SONET/SDH network 102.

Thus, by providing a 1 Gbps/10 Gbps Ethernet redundancy line that utilizes APS and MPS, a line fault can be quickly healed and transmission services with high reliability can be offered to users. Therefore, a network, which cannot perform high-speed switching originally, like the IP network 204, can perform high-speed switching and high-speed fault recovery.

In addition, in this manner, the APS adapter 15 can be attached to the outside of the existing IP router 203, so that the system is easily extended and is a great convenience.

Figure 28:
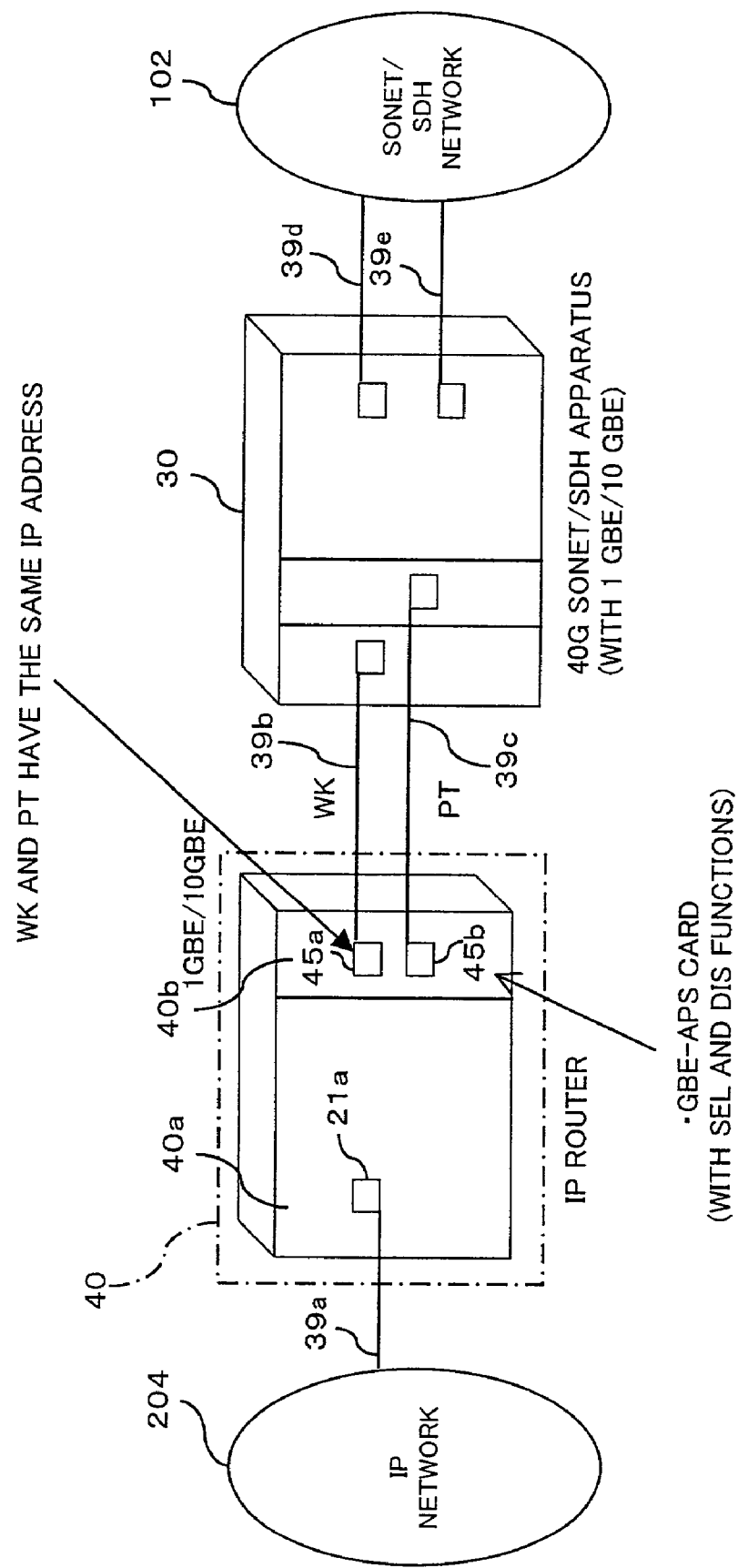
FIG. 28 is a block diagram of a transmission system that has a redundancy structure according to a first modification of the second embodiment of the present invention.
Figure 29:
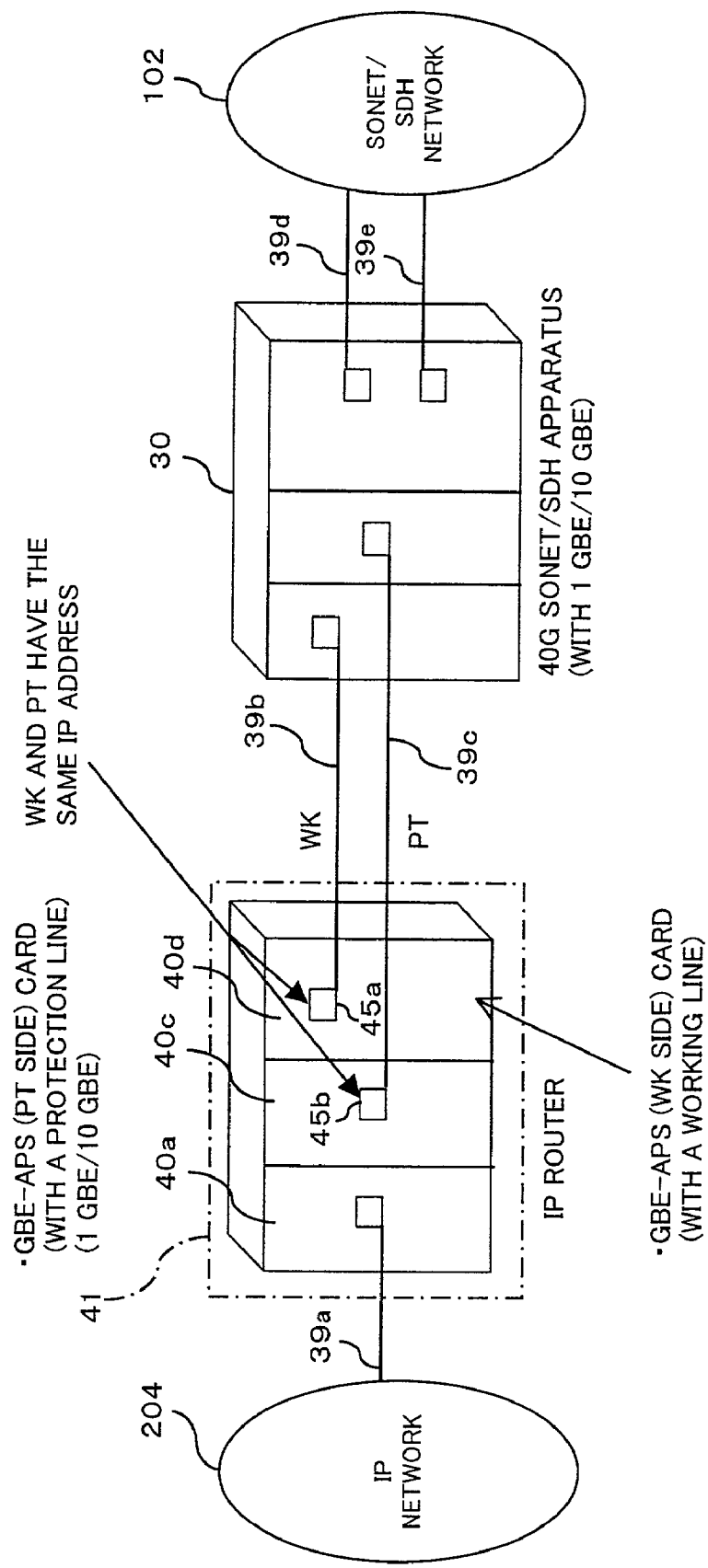
FIG. 29 is a block diagram of a transmission system that has a redundancy structure according to a second modification of the second embodiment of the present invention.
Figure 30:
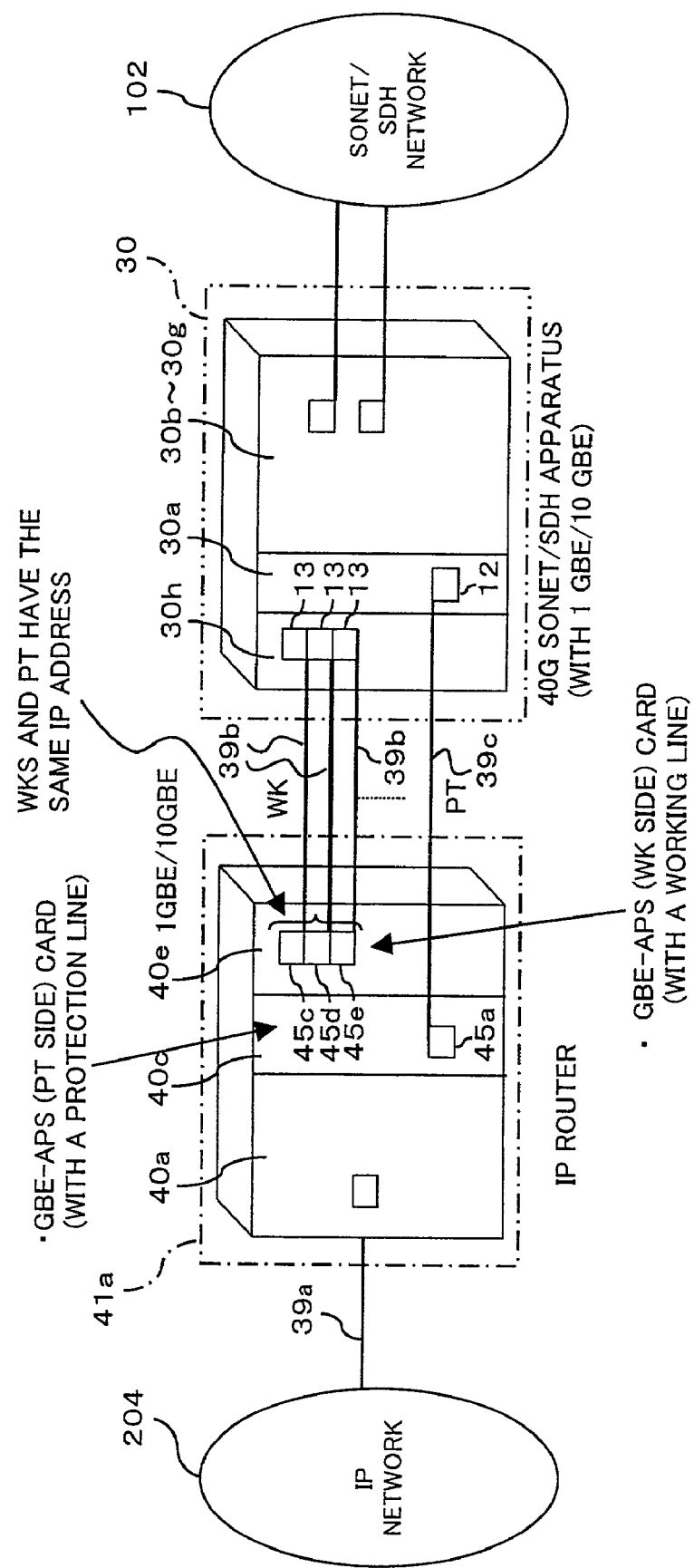
FIG. 30 is a block diagram of a transmission system that has a redundancy structure according to a third modification of the second embodiment of the present invention.
Figure 31:
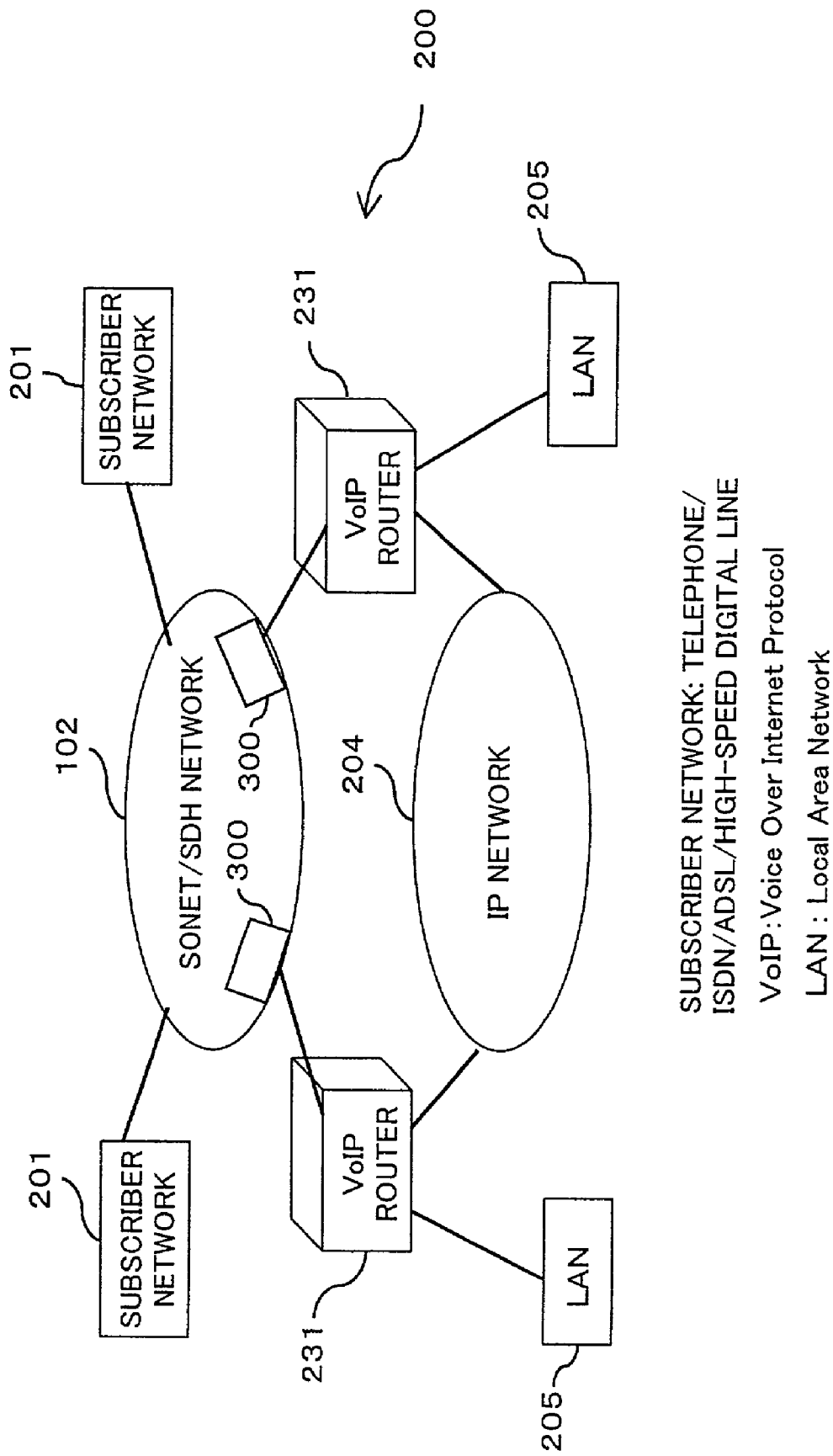
FIG. 31 is a schematic diagram showing a transmission system that has a redundancy structure.
Figure 32:
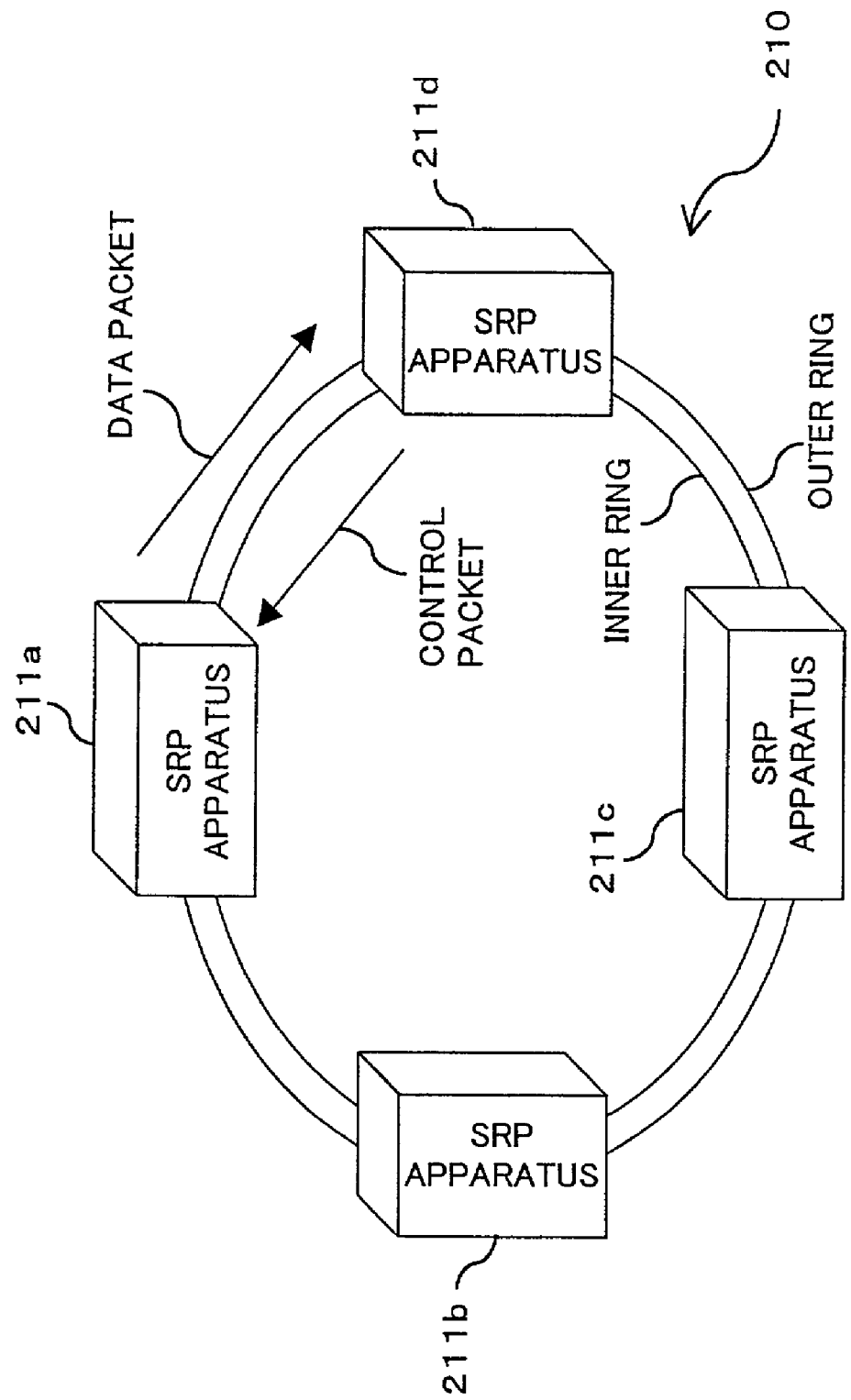
FIG. 32 is a schematic diagram showing a ring-configured network to which a special reuse protocol (SRP) is applied.
Figure 34:
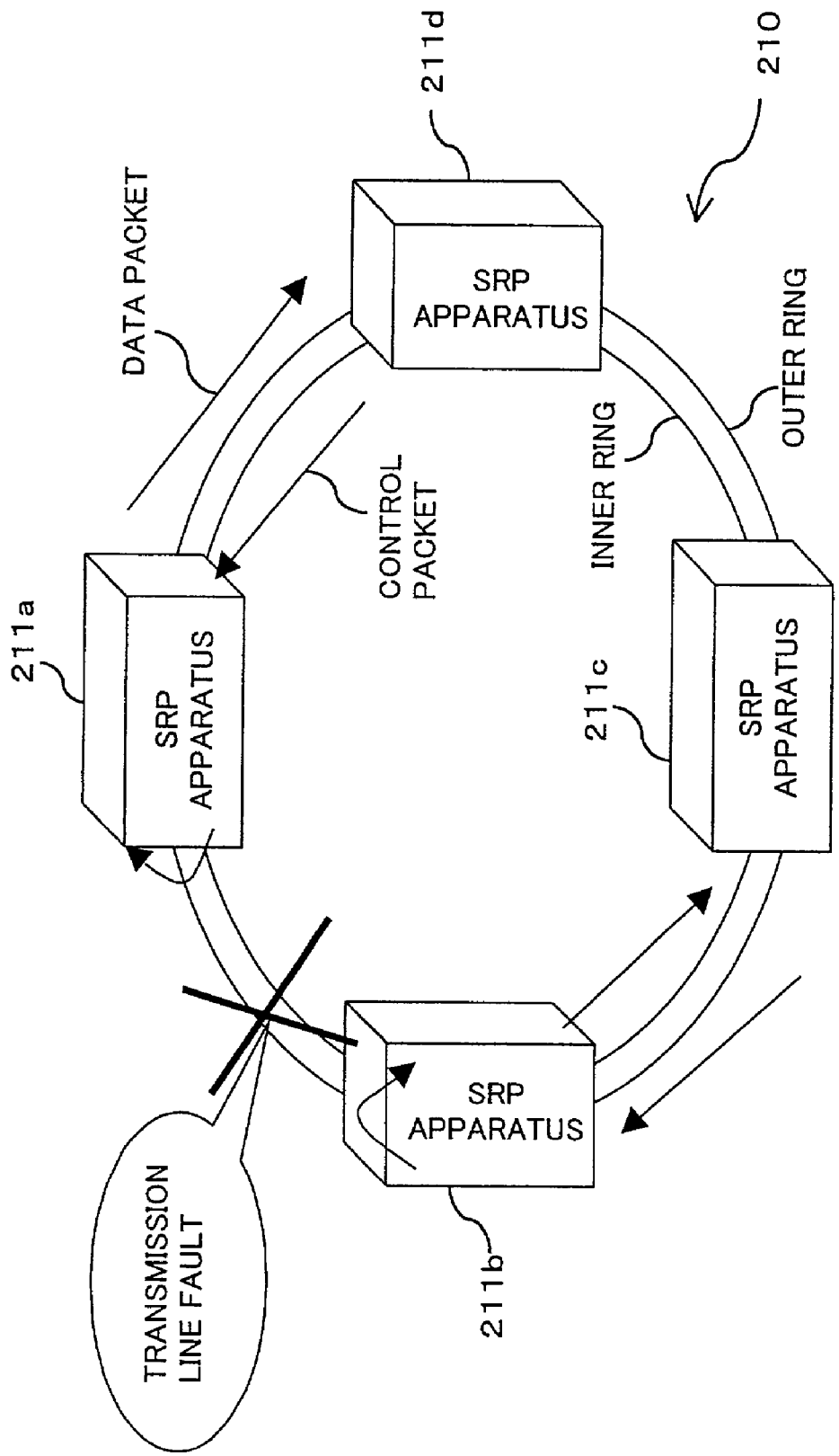
FIG. 34 is a diagram showing how transmission in the SRP ring-configured network is performed when a fault occurs.
Figure 35:
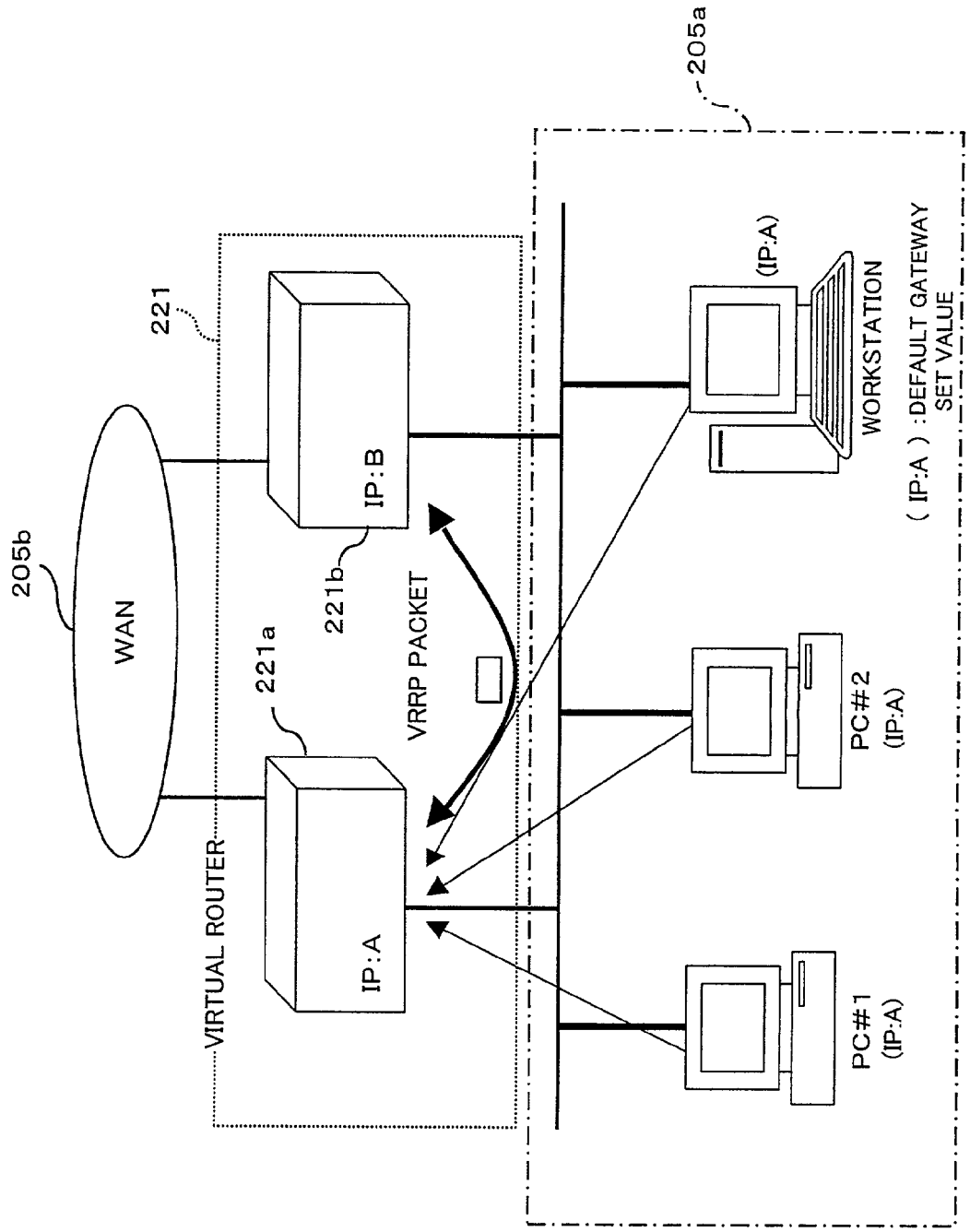
FIG. 35 is a schematic diagram used to explain how a virtual router section is operated according to a virtual router redundancy protocol (VRRP) when there is no fault.
Figure 36:
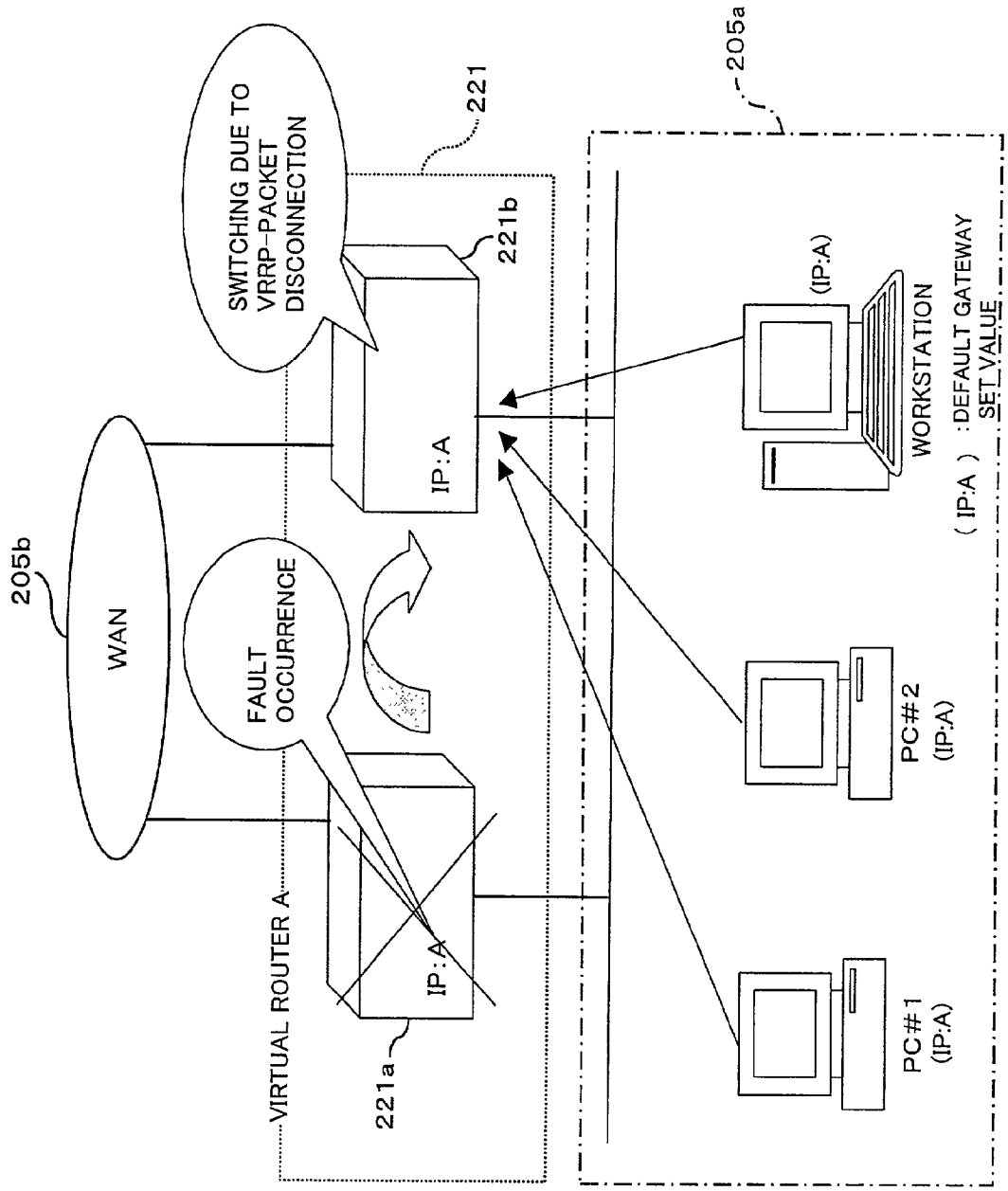
FIG. 36 is a schematic diagram used to explain how the virtual router section is operated according to the VRRP when a fault occurs.
Figure 37:
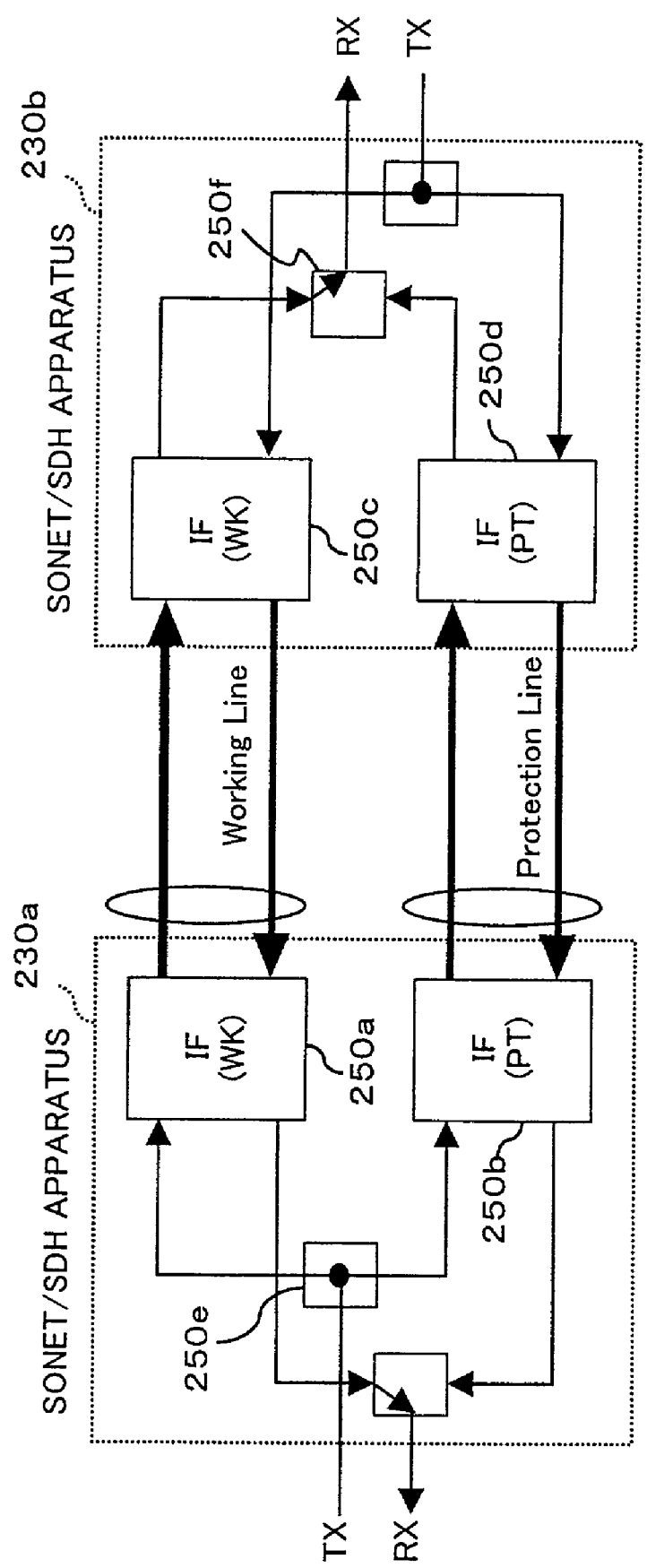
FIG. 37 is a schematic diagram used to explain a (1+1) APS structure employing a SONET/SDH system.
Figure 39:
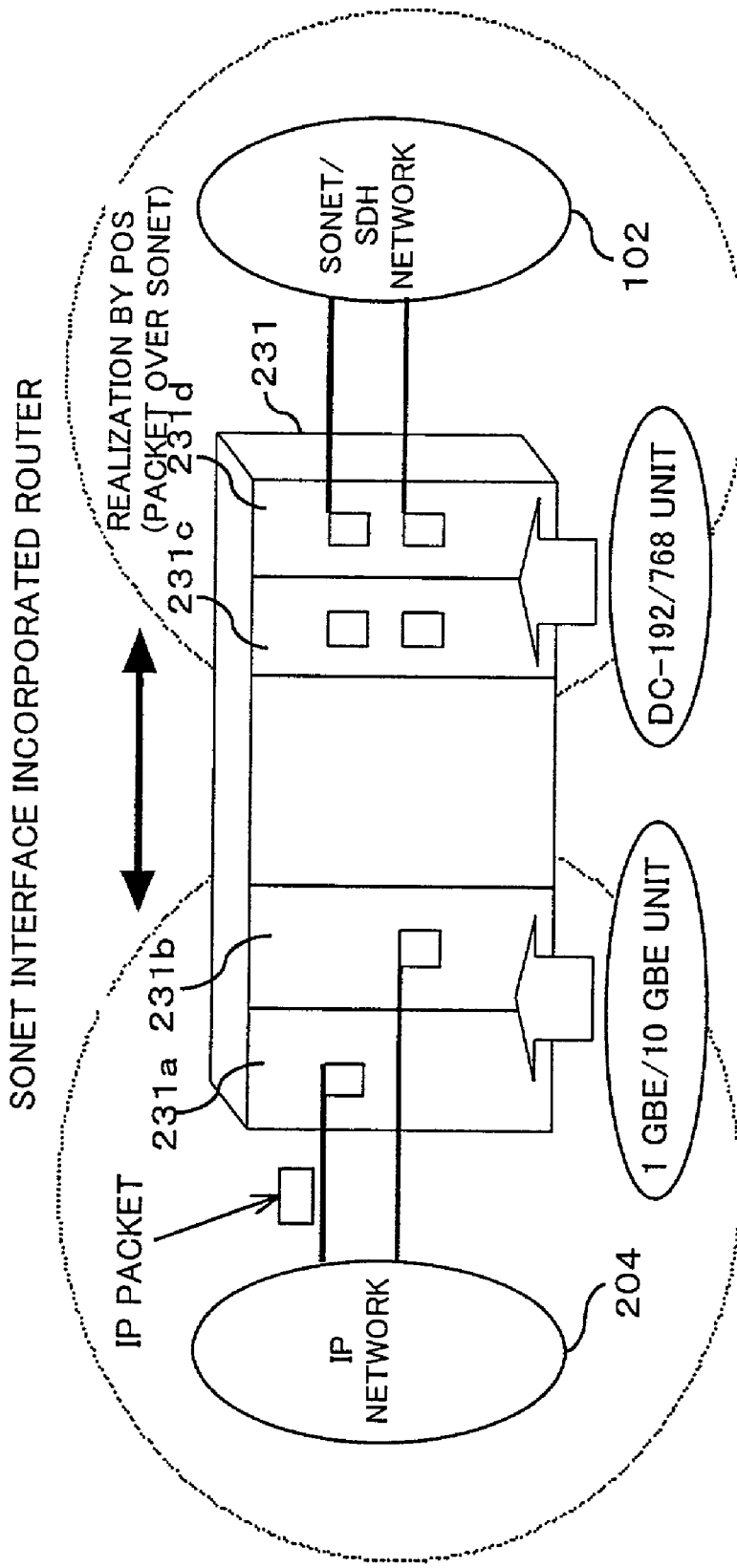
FIG. 39 is a diagram used to explain a SONET/SDH transmitter (with a POS function)
Figure 41:
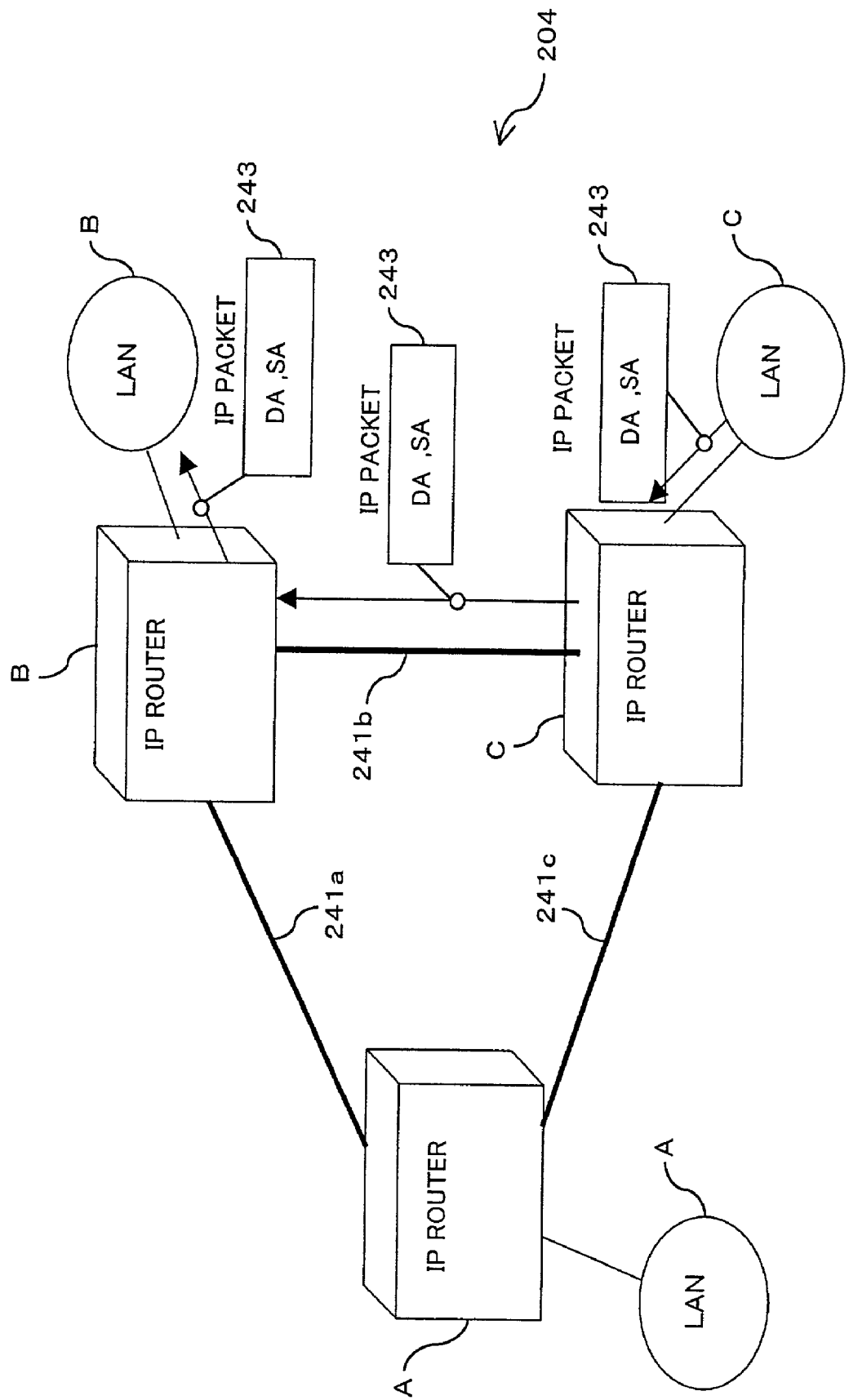
FIG. 41 is a diagram used to explain normal operation of routers when there is one transmission line between the routers.
Figure 43:
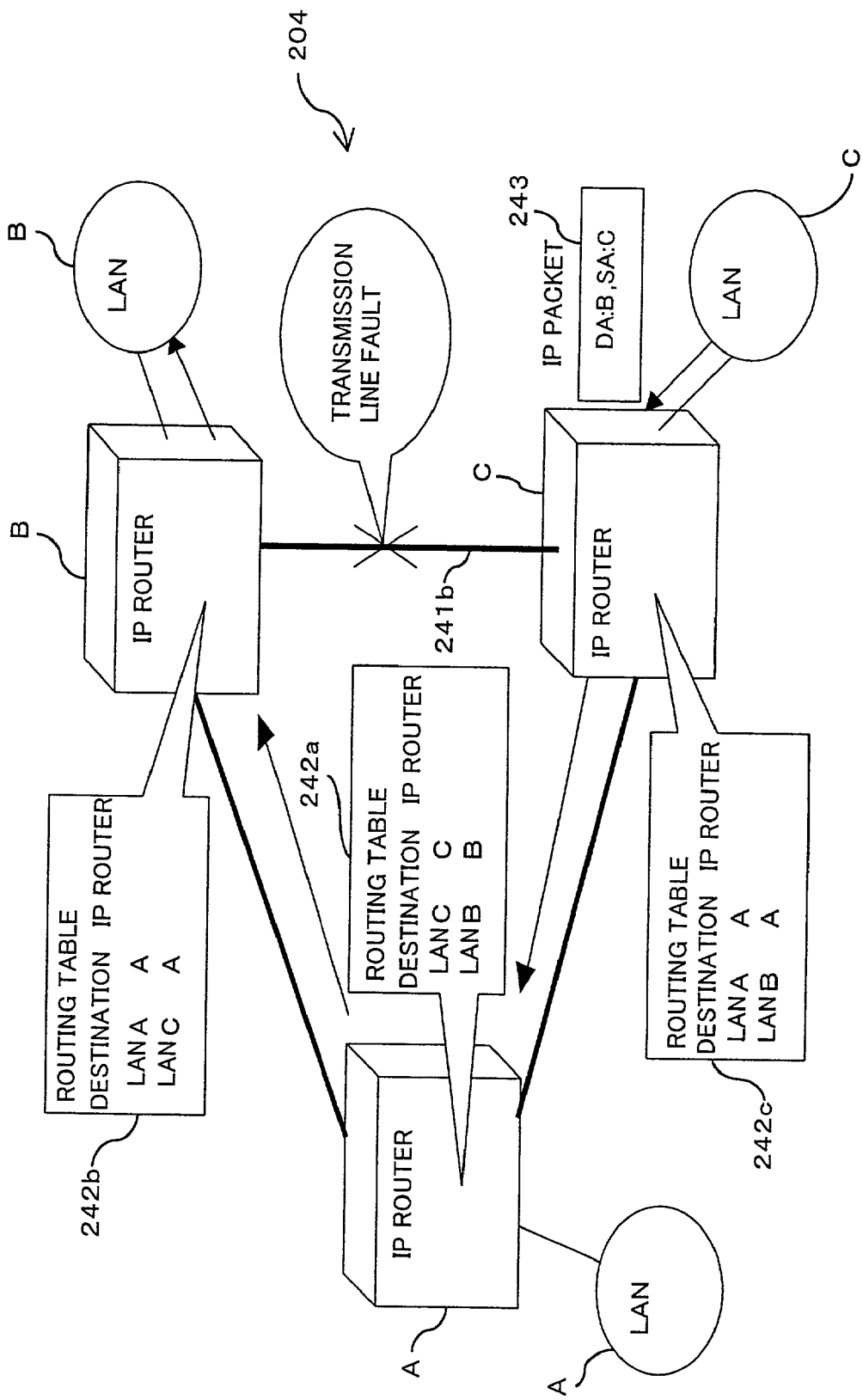
FIG. 43 is a diagram used to explain how routers are operated when a fault occurs at a single transmission line between the routers.
Figure 44:
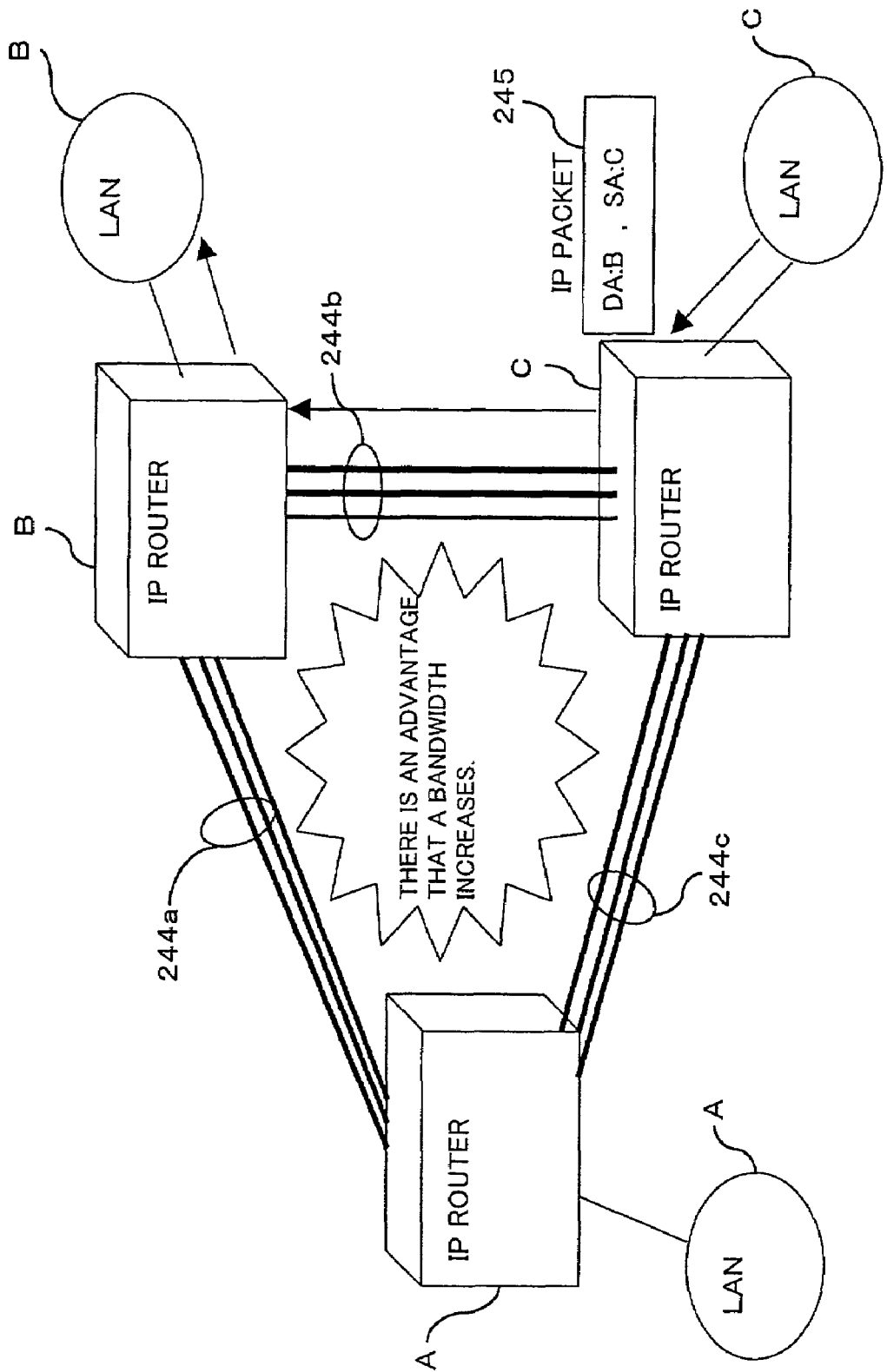
FIG. 44 is a diagram used to explain how routers are operated when there are three transmission lines between the routers.

The second embodiment can be variously modified. A first modification (B1), a second modification (B2), and a third modification (B3) will hereinafter be described with reference to FIGS. 28 to 30. Unless otherwise noted, transmission systems in the modifications are the same as the transmission system 100a shown in FIG. 23 and the transmission system 100 of FIG. 1. In FIGS. 28 to 30, the same reference numerals denote the same parts as the aforementioned parts.

(B1) Example Where the Line Redundancy Function is realized by a Single Line Card FIG. 28 schematically shows a transmission system 100a having a redundancy structure according to a first modification of the second embodiment of the present invention. In an IP router 40 shown in the figure, the fundamental function of this card is the same as that described in the first embodiment. The IP router 40 has both the routing function and the line redundancy function of 1 Gbps/10 Gbps Ethernet and can make line redundancy possible via a single 1 Gbps/10 Gbps Ethernet card 40b.

The 1 Gbps/10 Gbps Ethernet card 40b has the selecting function and the distributing function and is constructed so that a line is healed by performing transmission-line switching when a transmission line fault occurs.

During normal operation, the 1 Gbps/10 Gbps Ethernet card 40b transmits IP packets onto packet transmission lines 39b, 39c (WK and PT) through ports 45a, 45b.

(B2) Example Where the Line Redundancy Function is realized by two 1 Gbps/10 Gbps Ethernet Cards The 1 Gbps/10 Gbps interface (Ethernet card), described in the first modification, can be provided for each of the packet transmission lines 39b, 39c (WK and PT).

FIG. 29 schematically shows a transmission system that has a redundancy structure according to a second modification of the second embodiment of the present invention. The second modification is equipped with an IP router 41 having both the routing function and the APS function, and a SONET/SDH transmitter (with 1 Gbps/10 Gbps Ethernet cards) 30.

1 Gbps/10 Gbps Ethernet cards 40c, 40d are both provided with the function of the 1 Gbps Ethernet card of the IP router 41 and the line redundancy function. The 1 Gbps/10 Gbps Ethernet cards 40c, 40d also have ports 45a, 45b that have the same IP address.

With such a constitution, during normal operation, the 1 Gbps/10 Gbps Ethernet cards 40c, 40d function as PT and WK, respectively. For example, if a fault occurs at WK, then the transmission line on the side of the 1 Gbps/10 Gbps Ethernet card 40c is selected.

Thus, in the second modification, the 1 Gbps/10 Gbps Ethernet cards are individually provided. Therefore, the second modification, in addition to the advantages of the second embodiment, is capable of exhibiting both the line redundancy function of the IP router 41 and the function of the IP router 20.

(B3) Example in Which Transmission employing the (1:1) Structure is changed to Transmission employing the (1:N) Structure FIG. 30 schematically shows a transmission system that has a redundancy structure according to a third modification of the second embodiment of the present invention. In the third modification, three pairs of packet transmission lines 39b are provided so that high-speed and large-volume IP packets can be transmitted between an IP router 41a and a SONET/SDH apparatus (with 1 Gbps/10 Gbps Ethernet cards) 30. The IP router 41a has the same function as the IP router 41 of the second modification and is equipped with a 1 Gbps/10 Gbps Ethernet card 40a, which is connected with an IP network 204, and 1 Gbps/10 Gbps Ethernet cards 40c, 40e, which have a redundancy structure with respect to the SONET/SDH apparatus (with 1 Gbps/10 Gbps Ethernet cards) 30. If the 1 Gbps/10 Gbps Ethernet cards 40c, 40e employ GbE-APS cards, they have the functions of the APS adapter 15. The 1 Gbps/10 Gbps Ethernet card 40e is equipped with ports (WK) 45c, 45d, 45e, and the 1 Gbps/10 Gbps Ethernet card 40c is equipped with a port (PT) 45a. For example, the ports 45c, 45d, 45e are used as WKs, and when a fault occurs at any one of the three ports, the damaged port is switched to the part (PT) 45a.

A 1 Gbps/10 Gbps Ethernet card 30h within the SONET/SDH apparatus (with 1 Gbps/10 Gbps Ethernet cards) 30 has nearly the same function as the 1 Gbps/10 Gbps Ethernet card 30h (see FIG. 27, etc.) and has three ports 13. These ports 13 are connected with the packet transmission lines 39b, respectively.

With such a constitution, if a fault occurs at any one of the packet transmission lines 39b, data on the damaged transmission line is transmitted by the packet transmission line 39c (PT). This switching is controlled by the aforementioned K-packet.

Thus, even in the case of the (1:N) structure, transmission-line switching is possible. Therefore, even when the quantity of the transmission data is increased, the (1:N) structure can easily cope with signal transmission and high-quality services can be offered to users.

(C) Others

While the invention has been described with relation to the preferred embodiments and modifications, numerous changes in the details of the construction may be made without departing from the scope of the invention hereinafter claimed. For example, various combinations of the detection methods and control methods in the preferred embodiments and modifications may be made without departing from the scope of the invention. There is no possibility that because of different combinations, the advantages of the invention will be lost.

The corresponding relationship between WK (or PT) and units is merely an example. Switching other than the corresponding relationship is also possible.

The redundancy switching section 1a may be constructed so that it transmits a K-packet during a packet gap that a transmission signal is not transmitted. In such a case, high-speed line switching is possible and therefore the stability of the line switching in a network is enhanced.

The packet that is transmitted by the transmission systems 100, 100a can employ an IP packet and a packet which has the same information data but has a different header portion. The packet with a different header portion means, for example, a data packet having a changed transmission format. In this case, the formatting process in the aforementioned unit can be variously changed and carried out.

The invention claimed is:

1. A transmitter of a first network type constituting a transmission system for transmitting and receiving a packetized transmission signal, said transmitter comprising:
   a redundancy transmission line structure comprising a plurality of transmission lines connecting an opposite transmitter of a second network type;
   a generating section for generating transmission-line switching information representing transmission-line switching control information about said transmission lines, packetizing the generated transmission-line switching information in a K-packet that is compatible with the transmitters of the first and second network types, and outputting said K-packet;
   a transmitting section for transmitting said K-packet to the opposite transmitter provided opposite through said transmission lines;
   a receiving section for receiving a received K-packet, which is the transmission-line switching information packetized by said opposite transmitter;
   a packet processing section for detecting the transmission-line switching information from said received K-packet; and
   a redundancy switching section capable of selecting one of said transmission lines according to a status in which the transmission-line switching information in the received K-packet from said opposite transmitter is received.

2. The transmitter as set forth in claim 1, wherein said generating section generates either management data for determining a transmission control right for said K-packet containing said transmission-line switching information, or control data for controlling the start or stop of a process of switching said transmission lines with respect to said opposite transmitter, or generates both said management data and said control data.

3. The transmitter as set forth in claim 1, wherein said generating section inserts management data, for determining a transmission control right for said K-packet containing said transmission-line switching information, into said transmission signal and then packetizes said signal.

4. The transmitter as set forth in claim 1, wherein said generating section inserts data, for the priority of a priority transmitter which can preferentially transmit said K-paeket based on the data, into said transmission signal and then packetizes said signal.

5. The transmitter as set forth in claim 1, wherein said generating section inserts data, for the start or stop of the generating of said K-packet with respect to said opposite transmitter, into said transmission signal and packetizes said signal.

6. The transmitter as set forth in claim 1, wherein said generating section generates said K-packet according to a protocol in which there is no retransmission control.

7. The transmitter as set forth in claim 1, wherein, when a packet has an address of the transmitter of said packet, said generating section performs a formatting process on said packet based on the destination of said packetized transmission signal.

8. The transmitter as set forth in claim 1, further comprising a terminating section for terminating both a data packet and a redundant data packet containing the same information data as contained in said data packet.

9. The transmitter as set forth in claim 8, wherein said terminating section outputs a link status signal representing a line connection or disconnection, at predetermined time intervals and switches said transmission lines.

10. The transmitter as set forth in claim 1, wherein said redundancy switching section transmits said K-packet during a packet gap when said transmission signal is not transmitted.

11. A synchronous optical network/synchronous digital hierarchy (SONET/SDH) transmitter, having a function of transmitting and receiving transmission-line switching control information obtained in a SONET/SDH network, also connected to an Internet protocol (IP) network, and constituting a transmission system for transmitting and receiving a data packet, said SONET/SDH transmitter comprising:

a redundancy transmission line structure connected to said IP network and comprising a plurality of transmission lines connecting an opposite IP transmitter;

a generating section for generating transmission-line switching information representing transmission-line switching control information about said transmission lines, packetizing generated transmission-line switching information in a K-packet tat is compatible with the SONET/SDH and IP transmitters, and outputting said K-packet;

a transmitting section for transmitting said K-packet to the opposite IP transmitter provided opposite through said transmission lines;

a receiving section for receiving a received K-packet, which is the transmission-line switching information packetized by said opposite IP transmitter;

a packet processing section for detecting the transmission-line switching information from said received K-packet; and a redundancy switching section capable of selecting one of said transmission lines according to a status in which the transmission-line switching information in the received K-packet from said opposite transmitter is received.

12. The SONET/SDH transmitter as set forth in claim 11, further comprising means for generating said transmission-line switching control information based on information about a fault that has occurred in said SONET/SDH network, then packetizing said transmission-line switching control information, and transmitting a packet to said IP network.

13. The transmitter as set forth in claim 11, wherein an interface section, connected with said redundancy transmission line structure and said SONET/SDH transmitter, is equipped with a flag data notification section which notifies said generating section of flag data representing information about a fault that has occurred in said SONET/SDH network; and said generating section performs said packetization, based on said flag data, and fault information contained in said transmission-line switching information.

14. An IP transmitter, provided in an IP network and having a function of routing an IP packet and a function of transmitting and receiving a data packet, and also connected to a SONET/SDH network through a SONET/SDH transmitter, said IP transmitter comprising:

an interface section connected with said SONET/SDH transmitter through a redundancy transmission line structure comprising a plurality of transmission lines connecting to an opposite SONET/SDH transmitter onto which data packets are transmitted;

wherein said interface section comprises a generating section for generating transmission-line switching information representing transmission-line switching control information about said transmission lines, packetizing the generated transmission-line switching information in a K-packet that is compatible with the SONET/SDH and IP transmitters, and outputting said K-packet, a transmitting section for transmitting both a first data packet, which is data outputted from said generating section and contains information data to be transmitted, and said packetized transmission-line switching information when generated, to an opposite SONET/SDH transmitter provided opposite through said transmission lines, a receiving section for receiving a received K-packet, which is the transmission-line switching information packetized by said opposite SONET/SDH transmitter;

a packet processing section for detecting the transmission-line switching information from said received K-packet; and a redundancy switching section capable of selecting one of said transmission lines according to a status in which the transmission-line switching information in the received K-packet from said opposite SONET/SDH transmitter is received.

15. The transmitter as set forth in claim 14, wherein said generating section generates either management data for determining a transmission control right for said K-packet containing said transmission-line switching information, or control data for controlling the start or stop of a process of switching said transmission lines with respect to said SONET/SDH transmitter, or generates both said management data and said control data.

16. The transmitter as set forth in claim 14, wherein said generating section generates said K-packet according to a protocol in which there is no retransmission control.

17. The transmitter as set forth in claim 14, wherein, when it is decided that the packetized signal is said K-packet addressed to the transmitter of said K-packet, said generating section performs a formatting process on said K-packet based on the destination of said packetized transmission signal.

18. The transmitter as set forth in claim 14, wherein said interface section has a terminating section for terminating both said data packet and a redundant data packet containing the same information data as contained in said data packet.

19. The transmitter as set forth in claim 18, wherein said terminating section outputs a link status signal representing a line connection or disconnection, at predetermined time intervals and switches said transmission lines.

20. The transmitter as set forth in claim 14, wherein
said interface section is equipped with a flag data notification section which notifies said generating section of flag data representing information about a fault that has occurred in said SONET/SDH network; and
said generating section performs said packetization, based on said flag data, and fault information contained in said transmission-line switching information.

21. The transmitter as set forth in claim 14, wherein said redundancy switching section transmits said K-packet during a packet gap when said transmission signal is not transmitted.

22. A transmission system with a transmitter of a first network type capable of transmitting and receiving a packetized transmission signal, comprising:
a plurality of transmission lines onto which said transmission signal and a redundant transmission signal, containing the same data as information data contained in said transmission signal, are transmitted;
wherein said transmitter comprises
a generating section for generating transmission-line switching information representing transmission-line switching control information about said transmission lines, packetizing the generated transmission-line switching information in a K-packet that is compatible with the transmitter of the first network type and an opposite transmitter of a second network type, and outputting said K-packet,
a transmitting section for transmitting said K-packet to the opposite transmitter of the second network type provided opposite through said transmission lines,
a receiving section for receiving a received K-packet, which is the transmission-line switching information packetized by said opposite transmitter;
a packet processing section for detecting the transmission-line switching information from said received K-packet; and
a redundancy switching section capable of selecting one of said transmission lines according to a status in which the transmission-line switching information in the received K-packet from said opposite transmitter is received.

23. The transmission system as set forth in claim 22, wherein said transmitter is point-to-point connected with said opposite transmitter.

24. The transmission system as set forth in claim 22, wherein said transmitter is connected with an IP network and can transfer said K-paeket containing transmission-line switching information about said transmission lines.

25. The transmission system as set forth in claim 24, wherein said transmitter is equipped with an automatic switching adapter function of switching said transmission lines by employing said K-packet.

26. The transmission system as set forth in claim 22, wherein said transmitter has both a transmission control right for said K-packet containing said transmission-line switching information, and data about the priority of a priority transmitter that can preferentially transmit said K-packet based on the data.

27. The transmission system as set forth in claim 22, wherein
said transmitter has an interface section which is connected with a SONET/SDH transmitter through a redundancy transmission line structure comprising a plurality of transmission lines onto which data packets are transmitted;
said interface section is equipped with a multiplexing/demultiplexing section for multiplexing information data output from said redundancy switching section and then outputting a multiplexed optical signal to a SONET/SDH network, and demultiplexing a multiplexed optical signal output from said SONET/SDH network and then outputting information data.

28. The transmission system as set forth in claim 22, wherein said transmitter is connected to said opposite transmitter through a 1+1 structure or 1:N structure where N is an integer of 2 or greater.

* * * * *